US008466242B2

(12) United States Patent
Geremia et al.

(10) Patent No.: US 8,466,242 B2
(45) Date of Patent: Jun. 18, 2013

(54) POLYMERIC ACID CATALYSTS AND USES THEREOF

(75) Inventors: John M. Geremia, Watertown, MA (US); Brian M. Baynes, Winchester, MA (US); Ashish Dhawan, Lowell, MA (US)

(73) Assignee: Midori Renewables, Inc., Cambridge, MA (US)

( * ) Notice: Subject to any disclaimer, the term of this patent is extended or adjusted under 35 U.S.C. 154(b) by 0 days.

(21) Appl. No.: 13/406,517

(22) Filed: Feb. 27, 2012

(65) Prior Publication Data

US 2012/0220740 A1 Aug. 30, 2012

Related U.S. Application Data

(60) Provisional application No. 61/447,311, filed on Feb. 28, 2011, provisional application No. 61/522,351, filed on Aug. 11, 2011.

(51) Int. Cl.
*C08F 226/06* (2006.01)
*C08F 230/02* (2006.01)

(52) U.S. Cl.
USPC ...... 526/274; 252/182.12; 523/201; 423/488; 423/579; 526/259

(58) Field of Classification Search
USPC .............. 526/274; 252/182.12; 423/488, 579; 523/201
See application file for complete search history.

(56) References Cited

U.S. PATENT DOCUMENTS

| | | | |
|---|---|---|---|
| 2,841,574 A | 7/1958 | Foster et al. | |
| 3,681,021 A | 8/1972 | Miksovsky et al. | |
| 3,691,222 A | 9/1972 | Wendel | |
| 3,954,883 A | 5/1976 | Haag et al. | |
| 4,117,016 A | 9/1978 | Hughes | |
| 4,171,418 A * | 10/1979 | Barua et al. | 526/287 |
| 4,179,402 A | 12/1979 | Kim et al. | |
| 4,266,085 A | 5/1981 | Kim et al. | |
| 4,284,835 A | 8/1981 | Kim et al. | |
| 4,306,085 A | 12/1981 | Kim et al. | |
| 4,317,936 A | 3/1982 | Kim et al. | |
| 4,623,522 A | 11/1986 | Rickelton | |
| 4,677,137 A | 6/1987 | Bany et al. | |
| 4,717,785 A | 1/1988 | Paxson | |
| 4,804,786 A | 2/1989 | Fischer et al. | |
| 4,835,237 A | 5/1989 | Burkhardt et al. | |
| 4,892,955 A | 1/1990 | Wada et al. | |
| 4,933,405 A * | 6/1990 | Evani | 526/240 |
| 5,093,297 A | 3/1992 | Woo et al. | |
| 5,214,182 A | 5/1993 | Knifton | |
| 6,261,757 B1 | 7/2001 | Irving et al. | |
| 6,280,913 B1 | 8/2001 | Irving et al. | |
| 6,316,173 B1 | 11/2001 | Irving et al. | |
| 6,379,876 B1 | 4/2002 | Irving et al. | |
| 8,013,130 B2 | 9/2011 | Yanagawa et al. | |
| 8,017,724 B2 | 9/2011 | Yanagawa et al. | |

| | | | |
|---|---|---|---|
| 2002/0164730 A1 | 11/2002 | Ballesteros et al. | |
| 2006/0247474 A1 | 11/2006 | Tsuda et al. | |
| 2007/0159069 A1 | 7/2007 | Tsuda et al. | |
| 2007/0197801 A1 | 8/2007 | Bolk et al. | |
| 2007/0232783 A1 | 10/2007 | Moad et al. | |
| 2008/0154051 A1 | 6/2008 | Bolk et al. | |
| 2008/0261006 A1 | 10/2008 | McCarty et al. | |
| 2009/0166295 A1 * | 7/2009 | Chen et al. | 210/681 |
| 2009/0263699 A1 | 10/2009 | Sadasue et al. | |
| 2010/0137548 A1 | 6/2010 | Moad et al. | |
| 2010/0211158 A1 | 8/2010 | Haverty et al. | |
| 2010/0279361 A1 | 11/2010 | South et al. | |
| 2010/0285534 A1 | 11/2010 | South et al. | |
| 2010/0297721 A1 | 11/2010 | Hogsett et al. | |
| 2011/0015387 A1 | 1/2011 | Schuth et al. | |
| 2011/0059485 A1 | 3/2011 | Caiazza et al. | |
| 2011/0171709 A1 | 7/2011 | Bardsley | |
| 2011/0281362 A1 | 11/2011 | Olson et al. | |
| 2011/0312054 A1 | 12/2011 | Brevnova et al. | |
| 2012/0003701 A1 | 1/2012 | Brevnova et al. | |
| 2012/0040409 A1 | 2/2012 | Hau et al. | |

FOREIGN PATENT DOCUMENTS

| | | |
|---|---|---|
| AU | 737428 B2 | 8/2001 |
| AU | 2010250802 A1 | 12/2011 |
| CA | 867405 A | 3/1971 |
| CA | 874429 A | 6/1971 |
| CA | 874430 A | 6/1971 |
| CA | 1198475 A | 12/1985 |
| CA | 1285219 C | 6/1991 |
| CA | 2251700 A1 | 11/1997 |
| CA | 2209066 A1 | 2/1998 |
| CA | 2310274 A1 | 6/1999 |
| CA | 2572026 A1 | 6/2007 |
| CA | 2186860 C | 3/2008 |
| CA | 2702737 A1 | 4/2009 |

(Continued)

OTHER PUBLICATIONS

Stach et al. ("Bewertung von Ionen-Austauschern unter bes. Berücksichtigung ihrer Austauschgeschwindigkeiten"; Angewandte Chemie, vol. 63, Issue 11, p. 263-267, Jul. 1951).*
Huang et al. ("Template Imprinting Amphoteric Polymer for the Recognition of Proteins"; Journal of Applied Polymer Science, vol. 95, 358-361 (2005).*
Barbaro et al., "Ion Exchange Resins: Catalyst Recovery and Recycle", Chemical Reviews, vol. 109, No. 2, 2009, pp. 515-529.
Dias et al., "Modified Versions of Sulfated Zirconia as Catalysts for the of Xylose to Furfural", Catalysis Letters, vol. 114, Nos. 3-4, Apr. 2007, pp. 151-160.
Duboc et al., "Palladium Cross-Coupling Reactions on Solid Support using a New Silylated Linker", Journal of Organometallic Chemistry, vol. 643-644, 2002, pp. 512-515.
Dubois et al., "Colorimetric Method for Determination of Sugars and Related Substances", Division of Biochemistry, Analytical Chemistry, vol. 28, No. 3, Mar. 1956, pp. 350-356.

(Continued)

*Primary Examiner* — Ling Choi
*Assistant Examiner* — Chung-Cheng Wang
(74) *Attorney, Agent, or Firm* — Morrison & Foerster LLP

(57) ABSTRACT

Polymers useful as catalysts in non-enzymatic saccharification processes are provided. Provided are also methods for hydrolyzing cellulosic materials into monosaccharides and/or oligosaccharides using these polymeric acid catalysts.

30 Claims, 8 Drawing Sheets

FOREIGN PATENT DOCUMENTS

| | | |
|---|---|---|
| DE | 2501032 A1 | 4/1976 |
| DE | 2719606 A1 | 11/1978 |
| EP | 0002557 A2 | 6/1979 |
| EP | 0824111 A1 | 2/1998 |
| EP | 0757586 B1 | 6/2004 |
| FR | 2752238 B1 | 9/1998 |
| GB | 1236615 A | 6/1971 |
| GB | 1236616 A | 6/1971 |
| JP | 49-3917 A | 1/1974 |
| JP | 62-187424 A | 8/1987 |
| JP | 64-25771 A | 1/1989 |
| JP | 3-86704 A | 4/1991 |
| JP | 2000-95789 A | 4/2000 |
| JP | 2006-45149 A | 2/2006 |
| JP | 2009-163914 A | 7/2009 |
| WO | 95/29005 A1 | 11/1995 |
| WO | 97/42230 A1 | 11/1997 |
| WO | 00/07966 A1 | 2/2000 |
| WO | 00/39055 A1 | 7/2000 |
| WO | 2005/047233 A1 | 5/2005 |
| WO | 20061011899 A1 | 2/2006 |
| WO | 20061011900 A2 | 2/2006 |
| WO | 20061032282 A1 | 3/2006 |
| WO | 2006/110901 A2 | 10/2006 |
| WO | 20061110891 A2 | 10/2006 |
| WO | 2009/050251 A2 | 4/2009 |
| WO | 2010/110998 A1 | 9/2010 |
| WO | 2010/134027 A1 | 11/2010 |

OTHER PUBLICATIONS

Figueiredo et al., "Characterization of Active Sites on Carbon Catalysts", Industrial & Engineering Chemistry Research, vol. 46, No. 2, 2007, pp. 4110-4115.

Gelbard, Georges, "Organic Synthesis by Catalysis with Ion-Exchange Resins", Industrial & Engineering Chemistry Research, vol. 44, 2005, pp. 8468-8498.

Harmer et al., "Solid Acid Catalysis using Ion-Exchange Resins", Applied Catalysis A: General, vol. 221, 2001, pp. 45-62.

Hayes, Daniel J., "An Examination of Biorefining Processes, Catalysts and Challenges", Catalysis Today, vol. 145, 2009, pp. 138-151.

Itsuno et al., "Main-Chain Ionic Chiral Polymers: Synthesis of Optically Active Quaternary Ammonium Sulfonate Polymers and their Application in Asymmetric Catalysis", Journal of the American Chemical Society, vol. 132, 2010, pp. 2864-2865.

Kuznetsov et al., "New Catalytic Processes for a Sustainable Chemistry of Cellulose Production from Wood Biomass", Catalysis Today, vol. 75, 2002, pp. 211-217.

Lavarack et al., "Measured Kinetics of the Acid-Catalysed Hydrolysis of Sugar Cane Bagasse to Produce Xylose", Catalysis Today, vol. 63, 2000, pp. 257-265.

Lotero et al., "Synthesis of Biodiesel via Acid Catalysis", Industrial & Engineering Chemistry Research, vol. 44, 2005, pp. 5353-5363.

Toda et al., "Biodiesel made with Sugar Catalyst", Nature, vol. 438, Nov. 10, 2005, 1 page.

McCarty et al., "Ionic Electrets: Electrostatic Charging of Surfaces by Transferring Mobile Ions upon Contact", Journal of the American Chemical Society, vol. 129, No. 13, 2007, pp. 4075-4088.

Ngaosuwan et al., "Hydrolysis of Triglycerides Using Solid Acid Catalysts", Industrial & Engineering Chemistry Research, vol. 48, 2009, pp. 4757-4767.

Okuhara, Toshio, "Water-Tolerant Solid Acid Catalysts", Chemical Reviews, vol. 102, 2002, pp. 3641-3666.

Onda et al., "Hydrolysis of Cellulose Selectively into Glucose Over Sulfonated Activated-Carbon Catalyst Under Hydrothermal Conditions", Top Catal, vol. 52, 2009, pp. 801-807.

Onda et al., "Selective Hydrolysis of Cellulose into Glucose over Solid Acid Catalysts", Green Chemistry, vol. 10, 2008, pp. 1033-1037.

Purdy et al., "Synthesis, Crystal Structure, and Reactivity of Alkali and Silver Salts of Sulfonated Imidazoles", Polyhedron, vol. 26, 2007, pp. 3930-3938.

Reddy et al., "Polymer-Anchored Palladium Catalyst in Carbonylation of Organic Halides—The First Example of Triphase Catalysis", Indian Journal of Chemistry, vol. 28B, Feb. 1989, pp. 105-106.

Reddy et al., "Sulfated Zirconia as an Efficient Catalyst for Organic Synthesis and Transformation Reactions", Journal of Molecular Catalysis A: Chemical, vol. 237, 2005, pp. 93-100.

Rinaldi et al., "Acid Hydrolysis of Cellulose as the Entry Point into Biorefinery Schemes", ChemSusChem, vol. 2, 2009, pp. 1096-1107.

Rinaldi et al., "Depolymerization of Cellulose Using Solid Catalysts in Ionic Liquids", Angewandte Chemie International Edition, vol. 47, 2008, pp. 8047-8050.

Shaabani et al., "Cellulose Sulfuric Acid as a Bio-Supported and Recyclable Solid Acid Catalyst for the One-Pot Three-Component Synthesis of α-amino Nitriles", Applied Catalysis A: General, vol. 331, 2007, pp. 149-151.

Sheldon, Roger A., "Green Solvents for Sustainable Organic Synthesis: State of the Art", Green Chem, vol. 7, 2005, pp. 267-278.

Suganuma et al., "Hydrolysis of Cellulose by Amorphous Carbon Bearing SO3H, COOH, and OH Groups", Journal of the American Chemical Society, vol. 130, No. 38, 2008, pp. 12787-12793.

Sun et al., "An Extremely Active Solid Acid Catalyst, Nafion Resin/ Silica Composite, for the Friedel-Crafts Benzylation of Benzene and p-Xylene with Benzyl Alcohol", Industrial & Engineering Chemistry Research, vol. 36, 1997, pp. 5541-5544.

Tanabe et al., "Industrial Application of Solid Acid-Base Catalysts", Applied Catalystsis, A: General, vol. 181, 1999, pp. 399-434.

Wang, Shaobin, "Application of Solid Ash Based Catalysts in Heterogeneous Catalysis", Environmental Science & Technology, vol. 42, 2008, pp. 7055-7063.

Yamaguchi et al., "Hydrolysis of Cellulose by a Solid Acid Catalyst under Optimal Reaction Conditions", The Journal of Physical Chemistry C, vol. 113, 2009, pp. 3181-3188.

Zhang et al., "Determination of the Number-Average Degree of Polymerization of Cellodextrins and Cellulose with Application to Enzymatic Hydrolysis", Biomacromolecules, vol. 6, 2005, pp. 1510-1515.

Zhang et al., "Solid Acid and Microwave-Assisted Hydrolysis of Cellulose in Ionic Liquid", Carbohydrate Research, vol. 344, 2009, pp. 2069-2072.

Alexandratos et al., "Bifunctionality as a Means of Enhancing Complexation Kinetics in Selective Ion Exchange Resins", Industrial & Engineering Chemistry Research, vol. 34, No. 1, 1995, pp. 251-254.

Akelah et al., "Preparation of Poly(Vinylbenzyltriphenylphosphonium Perbromide) and its Application in the Bromination of Organic Compounds", Polymer Preprints (American Chemical Society), vol. 24, No. 2, Aug. 1983, pp. 467-468.

Davidescu et al., "Effect of Polymer-Supported Onium Salts on the Phase Transfer and Catalytic Activity of Hydrogen Peroxide in Triphase Catalysis", Chem. Bull. "POLITEHNICA" Univ. (Timisoara), vol. 42, No. 56, 1997, pp. 130-138.

Davidescu et al., "Phosphonium Salts Grafted on Gel-Type Styrene-Divinylbenzene Copolymers. Aspects Concerning the Antibacterial Activity", Chem. Bull. "POLITEHNICA" Univ. (Timisoara), vol. 41, No. 55, 1996, pp. 50-58.

Gao et al., "Chemical Structure and Catalytic Activity of Quaternary Onium Salt-Type Triphase Catalysts Based on CPS Microspheres", Journal of Applied Polymer Science, vol. 123, 2012, pp. 824-832.

Hershberger et al., "Polymer-Supported Palladacycles: Efficient Reagents for Synthesis of Benzopyrans with Palladium Recovery. Relationship among Resin Loading, Pd:P Ratio, and Reactivity of Immobilized Palladacycles", The Journal of Organic Chemistry, vol. 71, No. 1, 2006, pp. 231-235.

Hojabri, Fereidun, "Effect of Phosphine Ligand on the Activity of Palladium / II-Catalysts", Polymer, vol. 17, Jan. 1976, pp. 58-60.

Jayaswal et al., "Effect of Chemical Modifications upon Exchange Capacity of Aminated Macroporous Styrene—Divinyl Benzene (PS-DVB) Copolymer Anion Exchange Resin", Journal of Applied Polymer Science, vol. 79, 2001, pp. 1735-1748.

Kalck et al., "Dinuclear Rhodium Complexes Immobilized on Functionalized Diphenylphosphino-(Styrene—Divinylbenzene) Resins Giving High Selectivities for Linear Aldehydes in Hydroformylation Reactions", Journal of Organometallic Chemistry, vol. 433, 1992, pp. C4-C8.

Mohandasa et al., "Introduction of Bifunctionality into the Phosphinic Acid Ion-Exchange Resin for Enhancing Metal ion Complexation", Desalination, vol. 232, 2008, pp. 3-10.

Popa et al., "Study of Quaternary 'Onium' Salts Grafted on Polymers Antibacterial Activity of Quaternary Phosphonium Salts Grafted on 'Gel-Type' Styrene—Divinylbenzene Copolymers", Reactive and Functional Polymers, vol. 55, 2003, pp. 151-158.

Renaud et al., "31P Spin Lattice Relaxation time Measurements of the Amphiphilic Ligands [Ph2P(CH2)nPMe3]+ in Solution and Tethered to a Solid Cationic Exchange Resin via the Tetra-Alkylphosphonium Groups", Journal of Molecular Catalysis, vol. 80, 1993, pp. 43-48.

Ro et al., "Aqueous Phase Hydroformylation of Propene Catalyzed over Rhodium Complexes Immobilized on the Poly (Styrene-Divinylbenzene) Copolymer Containing -CH2P(C6H4SO3H)2 Groups", Applied Catalysis, vol. 69, 1991, pp. 169-175.

Ro et al., "Catalytic Properties of RhCI3-31-120 Immobilized on the Modified Poly(Styrene-Divinylbenzene) Copolymer in Aqueous Phase Hydroformylation of Propylene", Journal of Catalysis, vol. 145, 1994, pp. 327-334.

Selke et al., "Asymmetric Hydrogenation by Heterogenized Cationic Rhodium Phosphinite Complexes", Journal of Molecular Catalysis, vol. 56, 1989, pp. 315-328.

Stone et al., "Microwave-Assisted Solventless Single and Double Addition of HP (O)Ph2 to Alkynes", Journal of Molecular Catalysis A: Chemical, vol. 226, 2005, pp. 11-21.

Tang et al., "Heterogenization of Homogeneous Catalysts—The Immobilization of Transition Metal Complexes on Ion-Exchange Resins", Journal of Molecular Catalysis, vol. 9, 1980, pp. 313-321.

Wu et al., "Monobromination of Activated Aromatic Compounds with Polyvinylbenzyltriphenylphosphonium Supported Tribromide", Chinese Journal of Chemistry, vol. 19, No. 2, 2001, pp. 173-176.

Butova et al., "Phosphazo Compounds Based on a Chloromethylated Copolymer of Styrene and Divinylbenzene", Zhurnal Obshchei Khimii, vol. 46, No. 4, 1976, pp. 923-924.

Davidescu et al., "Preparation of Polymeric Quaternary Phosphonium Salts by Reaction of Chloromethylated Polymers with Tertiary Phosphines", Revista de Chimie (Bucharest, Romania), vol. 52, No. 10, 2001, pp. 553-558.

Feng et al., "Synthesis of P/Pd Resin and Study on its Catalytic Activity for Hydrogenation", Journal of Tianjin University, vol. 29, No. 4, Jul. 1996, pp. 521-526. (English Abstract Submitted).

He et al., "Studies on the Preparation and Hydrogenation Properties of Polymer Supported Colloidal Palladium Catalysts", Chemical Journal of Chinese Universities, vol. 11, No. 5, 1990, pp. 521-525. (English Abstract Submitted).

Il'Inskii et al., "Study of Kinetics of Phosphination of Chloromethylated Macroporous Copolymers of Styrene and Divinyl Benzene", Vysokomolekulyarnye Soedineniya, Seriya A, vol. 26, No. 5, 1984, pp. 1033-1038. (English Abstract Submitted).

Moreto et al., "Hydrogenation of Olefins using a Wilkinson Catalyst Bound to an Organic Polymer", Anales de Quimica, vol. 70, No. 7-8, 1974, pp. 638-641.

Valceanu et al., "Synthesis of a Triphenylphosphonium Salt Grafted on Gel-type Styrene-Divinylbenzene Copolymers", Revistade Chimie (Bucharest, Romania), vol. 45, No. 7, 1994, pp. 560-566.

Zheng et al., "Study of Supported Liquid Phase Catalyst. I. Hydroformylation of Propylene to Butyl Aldehyde", Journal of Molecular Catalysis, vol. 1, No. 4, Dec. 1987, pp. 243-245. (English Abstract Submitted).

International Search Report and Written Opinion received for PCT Patent Application No. PCT/US2012/026820, mailed on Jun. 19, 2012, 16 pages.

Greene et al., "Purification and Characterization of an Extracellular Endoglucanase from the Marine Shipworm Bacterium", Archives of Biochemistry and Biophysics, vol. 267, No. 1, Nov. 15, 1988, pp. 334-341.

Huang et al., "Template Imprinting Amphoteric Polymer for the Recognition of Proteins", Journal of Applied Polymer Science, vol. 95, 2005, pp. 358-361.

Stach, Ing. H, "Bewertung Von Ionen-Austauschen Unter Bes. Berücksichtigung Ihrer Austauschgeschwindigkeiten", Angewandte Chemie, vol. 63, No. 11, 1951, pp. 263-267.

Alizadeh et al., "Pretreatment of Switchgrass by Ammonia Fiber Explosion (AFEX)", Applied Biochemistry and Biotechnology, vol. 121-124, 2005, pp. 1113-1141.

Ballesteros et al., "Ethanol Production From Steam-Explosion Pretreated Wheat Straw", Applied Biochemistry and Biotechnology, vol. 129-132, 2006, pp. 496-508.

Chandra et al., "Substrate Pretreatment: The Key to Effective Enzymatic Hydrolysis of Lignocellulosics?", Adv Biochem Engin/Biotechnol, vol. 108, 2007, pp. 67-93.

Chundawat et al., "Effect of Particle Size Based Separation of Milled Corn Stover on Afex Pretreatment and Enzymatic Digestibility", Biotechnology and Bioengineering, vol. 96, 2007, pp. 219-231.

Duff et al., "Bioconversion of Forest Products Industry Waste Cellulosics to Fuel Ethanol: A Review", Bioresource Technology, vol. 55, 1996, pp. 1-33.

Ehrman, Tina, "Determination of Acid-Soluble Lignin in Biomass", NREL Laboratory Analytical Procedure, LAP-004, Sep. 25, 1996, 8 pages.

Ehrman, Tina, "Standard Method for Ash in Biomass", NREL Laboratory Analytical Procedure, LAP-005, Apr. 28, 1994, 7 pages.

Evans et al., "Molecular Weight Distribution of Cellulose as its Tricarbanilate by High Performance Size Exclusion Chromatography", Journal of Applied Polymer Science, vol. 37, 1989, pp. 3291-3303.

Fernanda et al., "Optimal Control in Fed-Batch Reactor for the Cellobiose Hydrolysis", Acta Scientiarum. Technology, vol. 25, No. 1, 2003, pp. 33-38.

Galbe et al., "A review of the production of ethanol from softwood", Applied Microbiology and Biotechnology, vol. 59, 2002, pp. 618-628.

Galbe et al., "Pretreatment of Lignocellulosic Materials for Efficient Bioethanol Production", Adv Biochem Engin/Biotechnol, vol. 108, 2007, pp. 41-65.

Ghosh et al., "Physicochemical and Biological Treatments for Enzymatic/Microbial Conversion of Lignocellulosic Biomass", Advances in Applied Microbiology, vol. 39, 1993, pp. 295-333.

Gollapalli et al., "Predicting Digestibility of Ammonia Fiber Explosion (AFEX)-Treated Rice Straw", Applied Biochemistry and Biotechnology, vol. 98-100, 2002, pp. 23-35.

Gong et al., "Ethanol Production from Renewable Resources", Advances in Biochemical Engineering/Biotechnology vol. 65, 1999, pp. 207-241.

Gusakov et al., "Enhancement of Enzymatic Cellulose Hydrolysis Using a Novel Type of Bioreactor with Intensive Stirring Induced by Electromagnetic Field", Applied Biochemistry and Biotechnology, vol. 56, 1996, pp. 141-153.

Gusakov et al., "Kinetics of the Enzymatic Hydrolysis of Cellulose: 1. A Mathematical Model for a Batch Reactor Process", Enz. Microb. Technol., vol. 7, Jul. 1985, pp. 346-352.

Hendriks et al., "Pretreatments to Enhance the Digestibility of Lignocellulosic Biomass", Bioresource Technology, vol. 100, Jan. 2009, pp. 10-18.

Kurabi et al., "Enzymatic Hydrolysis of Steam-Exploded and Ethanol Organosolv-Pretreated Douglas-Fir by Novel and Commercial Fungal Cellulases", Applied Biochemistry and Biotechnology, vol. 121, 2005, pp. 219-230.

Lee et al., "Dilute-Acid Hydrolysis of Lignocellulosic Biomass", Advances in Biochemical Engineering/Biotechnology, vol. 65, 1999, pp. 93-115.

Lynd et al., "Microbial Cellulose Utilization: Fundamentals and Biotechnology", Microbiol Mol. Biol. Rev., vol. 66, No. 3, 2002, pp. 506-577.

Martin et al., "Investigation of Cellulose Convertibility and Ethanolic Fermentation of Sugarcane Bagasse Pretreated by Wet Oxidation and Steam Explosion", Journal of Chemical Technology and Biotechnology, vol. 81, 2006, pp. 1669-1677.

McMillan, James D., "Pretreatment of Lignocellulosic Biomass", Chapter 15, Enzymatic Conversion of Biomass for Fuels Production, Himmel, M. E., Baker, J. O. and Overend, R. P., eds., ACS Symposium Series, vol. 566, 1994, pp. 292-324.

Mosier et al., "Features of promising technologies for pretreatment of lignocellulosic biomass", Bioresource Technology, vol. 96, 2005, pp. 673-686.

Olsson et al., "Fermentation of Lignocellulosic Hydrolysates for Ethanol Production", Enzyme and Microbial Technology, vol. 18, No. 5, Apr. 1996, pp. 312-331.

Palonen et al., "Evaluation of Wet Oxidation Pretreatment for Enzymatic Hydrolysis of Softwood", Applied Biochemistry and Biotechnology, vol. 117, 2004, pp. 1-17.

Pan et al., "Bioconversion of Hybrid Poplar to Ethanol and Co-Products Using an Organosolv Fractionation Process: Optimization of Process Yields", Biotechnology and Bioengineering, vol. 94, No. 5, Aug. 5, 2006, pp. 851-862.

Pan et al., "Biorefining of Softwoods using Ethanol Organosolv Pulping: Preliminary Evaluation of Process Streams for Manufacture of Fuel-Grade Ethanol and Co-Products", Biotechnology and Bioengineering, vol. 90, 2005, pp. 473-481.

Ruiz et al., "Determination of Carbohydrates in Biomass by High Performance Liquid Chromatography", NREL Laboratory Analytical Procedure LAP-002, Aug. 12, 1996, 12 pages.

Ryu et al., "Bioconversion of Waste Cellulose by Using an Attrition Bioreactor", Biotechnology and Bioengineering, vol. 25, 1983, pp. 53-65.

Sassner et al., "Bioethanol Production Based on Simultaneous Saccharification and Fermentation of Steam-Pretreated Salix at High Dry-Matter Content", Enzyme and Microbial Technology, vol. 39, 2006, pp. 756-762.

Schell et al., "A Bioethanol Process Development Unit: Initial Operating Experiences and Results with a Corn Fiber Feedstock", Bioresource Technology, vol. 91, 2004, pp. 179-188.

Schell et al., "Dilute—Sulfuric Acid Pretreatment of Corn Stover in Pilot-Scale Reactor", Applied Biochemistry and Biotechnology, vol. 105-108, 2003, pp. 69-85.

Schmidt et al., "Optimization of Wet Oxidation Pretreatment of Wheat Straw", Bioresource Technology, vol. 64, 1998, pp. 139-151.

Sheehan, , "Enzymes, Energy, and the Environment: A Strategic Perspective on the U.S. Department of Energy's Research and Development Activities for Bioethanol", Biotechnology Progress, vol. 15, 1999, pp. 817-827.

Still et al., "Rapid Chromatographic Technique for Preparative Separations with Moderate Resolution", The Journal of Organic Chemistry, vol. 43, 1978, pp. 2923-2925.

Taherzadeh et al., "Pretreatment of Lignocellulosic Wastes to Improve Ethanol and Biogas Production: A Review", Int. J. Mol. Sci., vol. 9, 2008, pp. 1621-1651.

Templeton et al., "Determination of Acid-Insoluble Lignin in Biomass", NREL Laboratory Analytical Procedure, LAP-03, Jan. 30, 1995, 14 pages.

Teymouri et al., "Optimization of the Ammonia Fiber Explosion (AFEX) Treatment Parameters for Enzymatic Hydrolysis of Corn Stover", Bioresource Technology, vol. 96, 2005, pp. 2014-2018.

Vallander et al., "Production of Ethanol from Lignocellulosic Materials: State of the Art", Advances in Biochemical Engineering/Biotechnology, vol. 42, 1990, pp. 63-95.

Varga et al., "High Solid Simultaneous Saccharification and Fermentation of Wet Oxidized Corn Stover to Ethanol", Biotechnology and Bioengineering, vol. 88, 2004, pp. 567-574.

Varga et al., "Optimization of Steam Pretreatment of Corn Stover to Enhance Enzymatic Digestibility", Applied Biochemistry and Biotechnology, vol. 113-116, 2004, pp. 509-523.

Wyman et al., "Coordinated Development of Leading Biomass Pretreatment Technologies", Bioresource Technology, vol. 96, 2005, pp. 1959-1966.

Yang et al., "Pretreatment: The Key to Unlocking Low-Cost Cellulosic Ethanol", Biofuels Bioproducts and Biorefining (Biofpr), vol. 2, 2008, pp. 26-40.

* cited by examiner

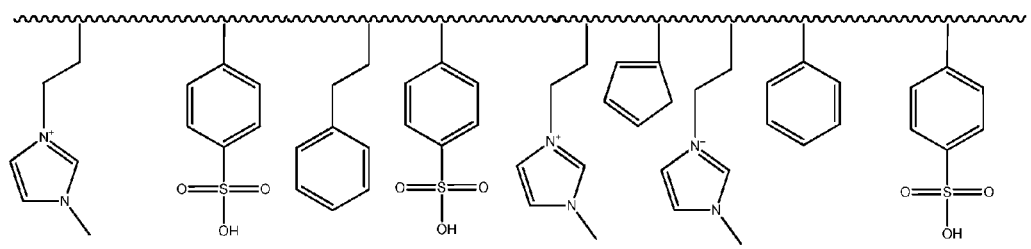
*FIG. 3A*
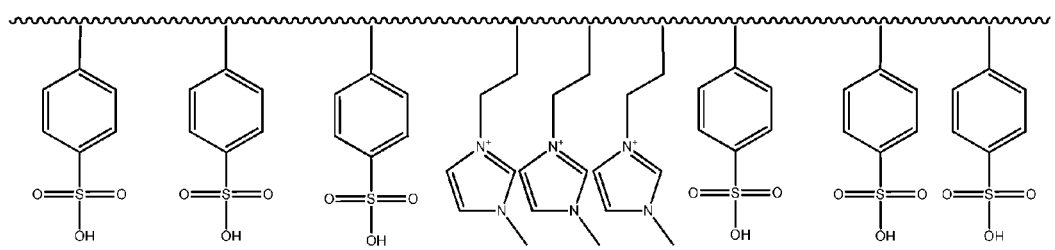
*FIG. 3B*
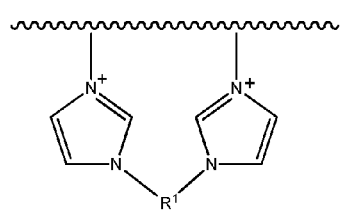 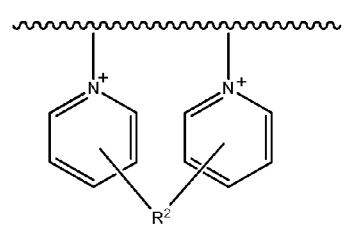
*FIG. 4A*         *FIG. 4B*

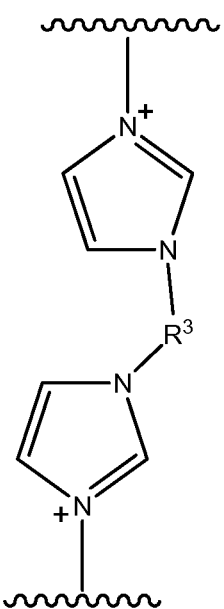
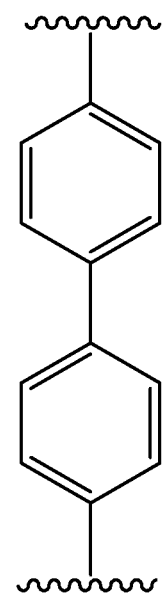
*FIG. 5A*  *FIG. 5B*
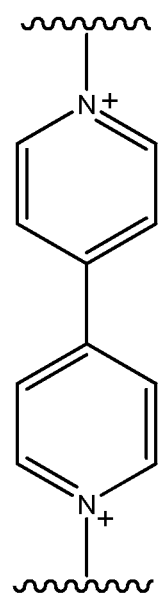
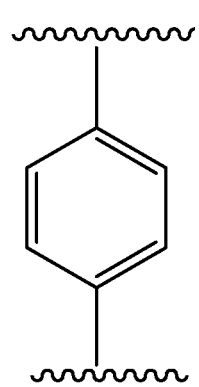
*FIG. 5C*  *FIG. 5D*

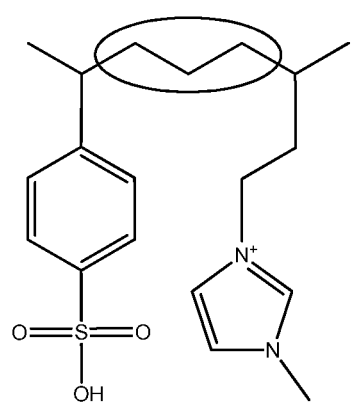
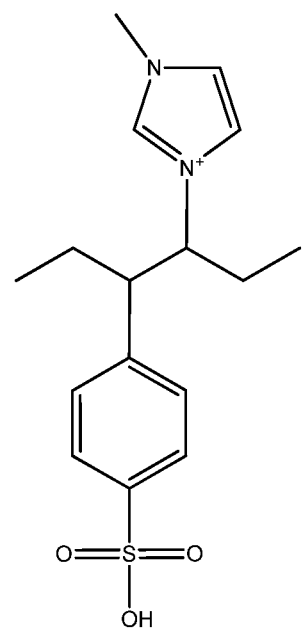
*FIG. 7A*  *FIG. 7B*

POLYMERIC ACID CATALYSTS AND USES THEREOF

CROSS-REFERENCES TO RELATED APPLICATIONS

This application claims priority to U.S. Provisional Patent Application No. 61/447,311 filed Feb. 28, 2011, and U.S. Provisional Patent Application No. 61/522,351 filed Aug. 11, 2011, both of which are incorporated herein by reference in their entireties.

FIELD

The present disclosure relates generally to catalysts that may be used in saccharification of biomass, and more specifically to polymeric acid catalysts that may be used to hydrolyze cellulose and/or hemicellulose.

BACKGROUND

Saccharification of cellulosic materials, particularly biomass waste products of agriculture, forestry and waste treatment are of great economic and environmental relevance. As part of biomass energy utilization, attempts have been made to obtain ethanol (bioethanol) by hydrolyzing cellulose or hemicellulose, which are major constituents of plants. The hydrolysis products, which include sugars and simple carbohydrates, may then be subjected to further biological and/or chemical conversion to produce fuels or other commodity chemicals. For example, ethanol is utilized as a fuel or mixed into a fuel such as gasoline. Major constituents of plants include, for example, cellulose (a polymer glucose, which is a six-carbon sugar), hemicellulose (a branched polymer of five- and six-carbon sugars), lignin, and starch. Current methods for liberating sugars from lignocellulosic materials, however, are inefficient on a commercial scale based on yields, as well as the water and energy used.

Work from the 1980's on the hydrolysis of β-glycosidic bonds using perfluoronated solid superacid microporous resins, such as Dupont Nafion®, attempted to develop catalytic methods for use in digesting cellulose. Batch reactors and continuous-flow fixed-bed tube reactors were used to demonstrate hydrolysis of cello-oligosaccharides to monomeric sugars; however, these processes were unable to achieve appreciable digestion of cellulose or hemicellulose, and in particular, the crystalline domains of cellulose.

As such, there is an ongoing need for new catalysts that can efficiently generate sugar and sugar-containing products from biomass on a commercially-viable scale.

BRIEF SUMMARY

The present disclosure addresses this need by providing polymeric materials that can be used to digest the hemicellulose and cellulose, including the crystalline domains of cellulose, in biomass. Specifically, the polymeric materials can hydrolyze the cellulose and/or hemicellulose into monosaccharides and/or oligosaccharides.

In one aspect, provided is a polymer having acidic monomers and ionic monomers that are connected to form a polymeric backbone, in which each acidic monomer has at least one Bronsted-Lowry acid, and each ionic monomer independently has at least one nitrogen-containing cationic group or phosphorous-containing cationic group. In some embodiments, each acidic monomer has one Bronsted-Lowry acid. In other embodiments, some of the acidic monomers have one Bronsted-Lowry acid, while others have two Bronsted-Lowry acids. In some embodiments, each ionic monomer has one nitrogen-containing cationic group or phosphorous-containing cationic group. In other embodiments, some of the ionic monomers have one nitrogen-containing cationic group or phosphorous-containing cationic group, while others have two nitrogen-containing cationic groups or phosphorous-containing cationic groups.

In some embodiments, the Bronsted-Lowry acid at each occurrence is independently selected from sulfonic acid, phosphonic acid, acetic acid, isophthalic acid, boronic acid, and perfluorinated acid. In certain embodiments, the Bronsted-Lowry acid at each occurrence is independently sulfonic acid or phosphonic acid. In one embodiment, the Bronsted-Lowry acid at each occurrence is sulfonic acid.

In some embodiments, the one or more of the acidic monomers are directly connected to the polymeric backbone. In other embodiments, the one or more of the acidic monomers each further include a linker connecting the Bronsted-Lowry acid to the polymeric backbone. In certain embodiments, some of the Bronsted-Lowry acids are directly connected to the polymeric backbone, while other the Bronsted-Lowry acids are connected to the polymeric backbone by a linker.

In those embodiments where the Bronsted-Lowry acid is connected to the polymeric backbone by a linker, the linker at each occurrence is independently selected from unsubstituted or substituted alkylene, unsubstituted or substituted cycloalkylene, unsubstituted or substituted alkenylene, unsubstituted or substituted arylene, unsubstituted or substituted heteroarylene, unsubstituted or substituted alkylene ether, unsubstituted or substituted alkylene ester, and unsubstituted or substituted alkylene carbamate. In certain embodiments, the linker is unsubstituted or substituted arylene, unsubstituted or substituted heteroarylene. In certain embodiments, the linker is unsubstituted or substituted arylene. In one embodiment, the linker is phenylene. In another embodiment, the linker is hydroxyl-substituted phenylene.

In those embodiments where the Bronsted-Lowry acid is connected to the polymeric backbone by a linker, the Bronsted-Lowry acid and the linker form a side chain. In some embodiments, each side chain may independently be selected from:

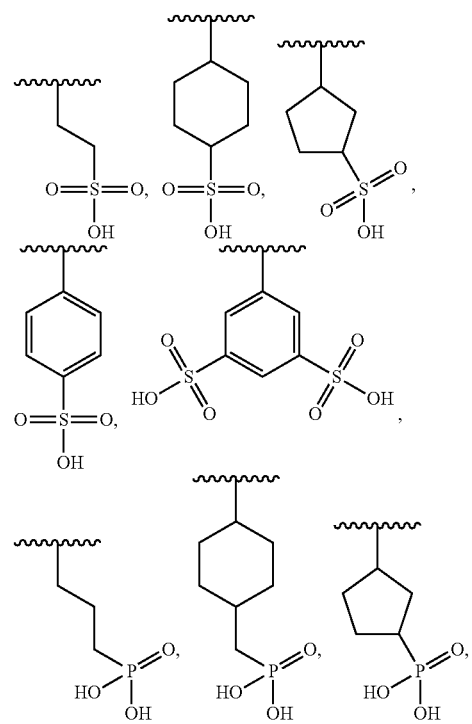

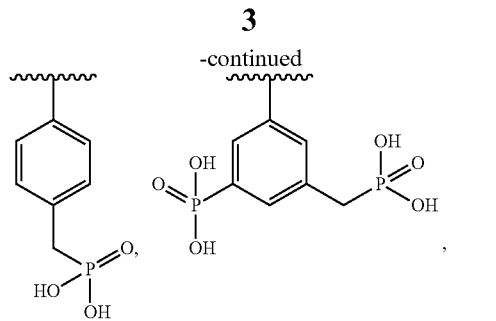

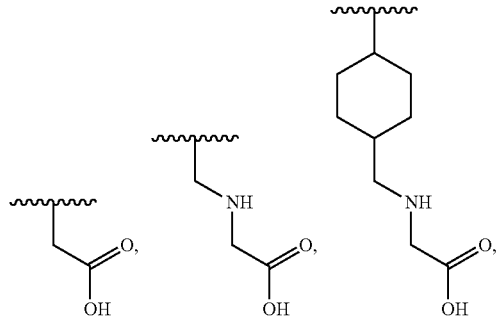

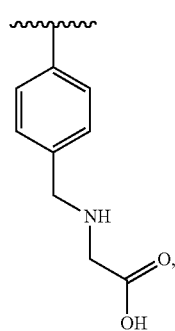

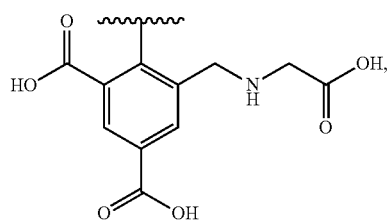

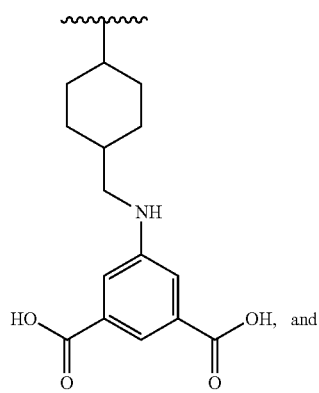

-continued

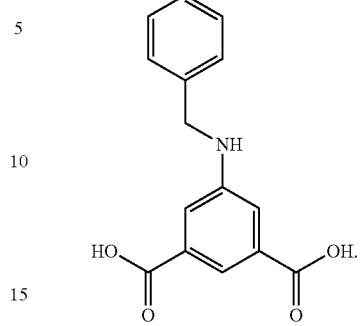

In some embodiments, the nitrogen-containing cationic group at each occurrence is independently selected from pyrrolium, imidazolium, pyrazolium, oxazolium, thiazolium, pyridinium, pyrimidinium, pyrazinium, pyradizimium, thiazinium, morpholinium, piperidinium, piperizinium, and pyrollizinium. In one embodiment, the nitrogen-containing cationic group is imidazolium.

In some embodiments, the phosphorous-containing cationic group at each occurrence is independently selected from triphenyl phosphonium, trimethyl phosphonium, triethyl phosphonium, tripropyl phosphonium, tributyl phosphonium, trichloro phosphonium, and trifluoro phosphonium. In one embodiment, the phosphorous-containing cationic group is triphenyl phosphonium.

In some embodiments, the one or more of the ionic monomers are directly connected to the polymeric backbone. In other embodiments, the one or more of the ionic monomers each further include a linker connecting the nitrogen-containing cationic group or the phosphorous-containing cationic group to the polymeric backbone. In certain embodiments, some of the cationic groups are directly connected to the polymeric backbone, while other cationic groups are connected to the polymeric backbone by a linker.

In those embodiments where the nitrogen-containing cationic group is linked to the polymeric backbone by a linker, the nitrogen-containing cationic group and the linker form a side chain. In some embodiments, each side chain may independently be selected from:

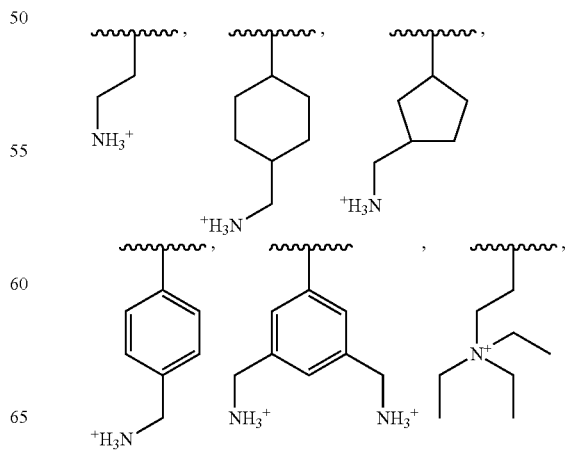

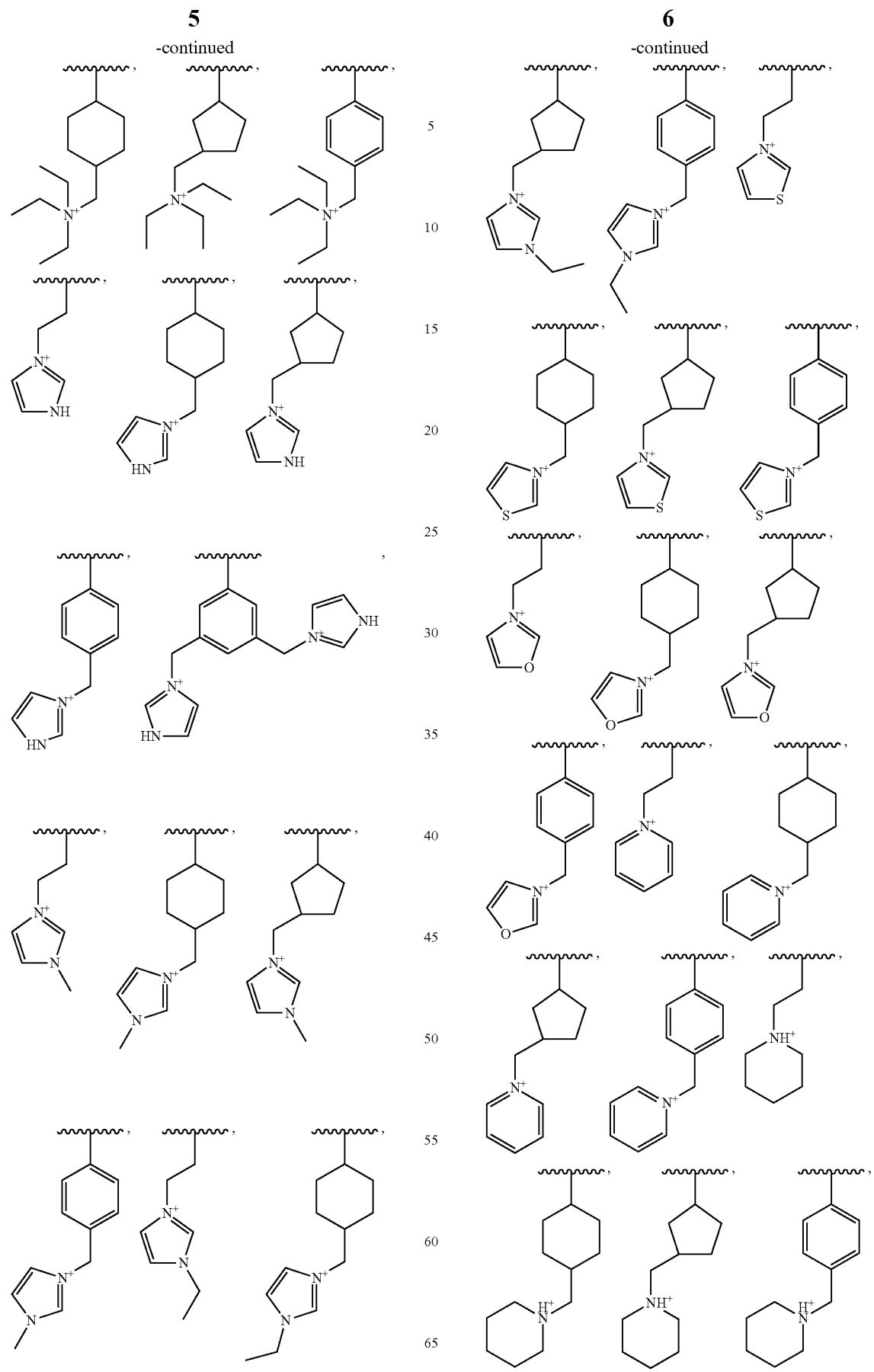

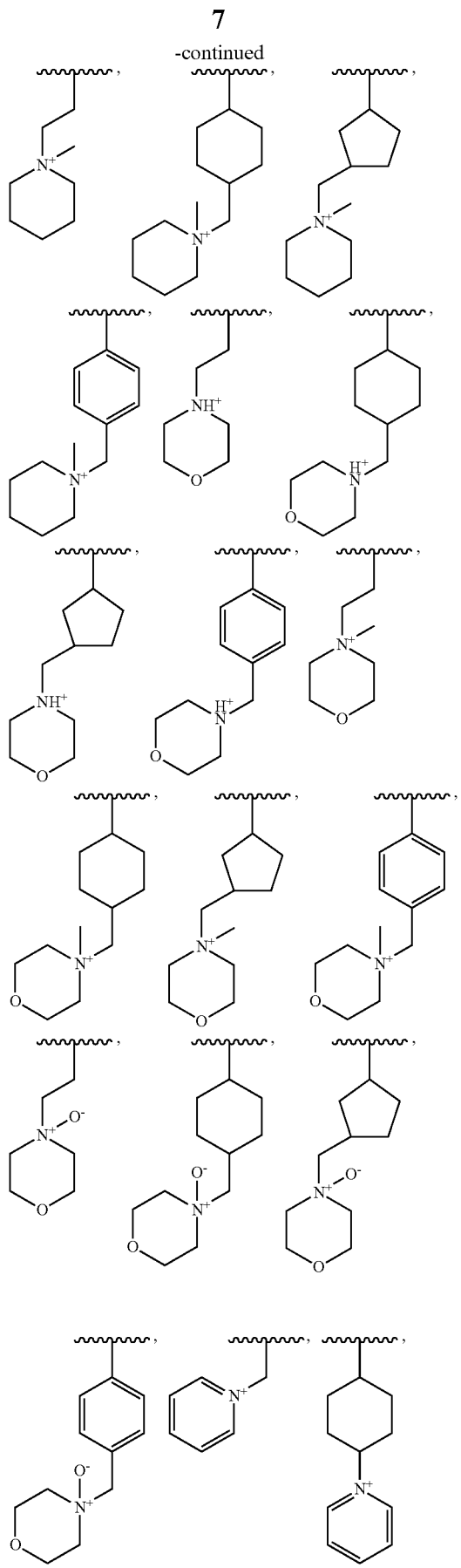

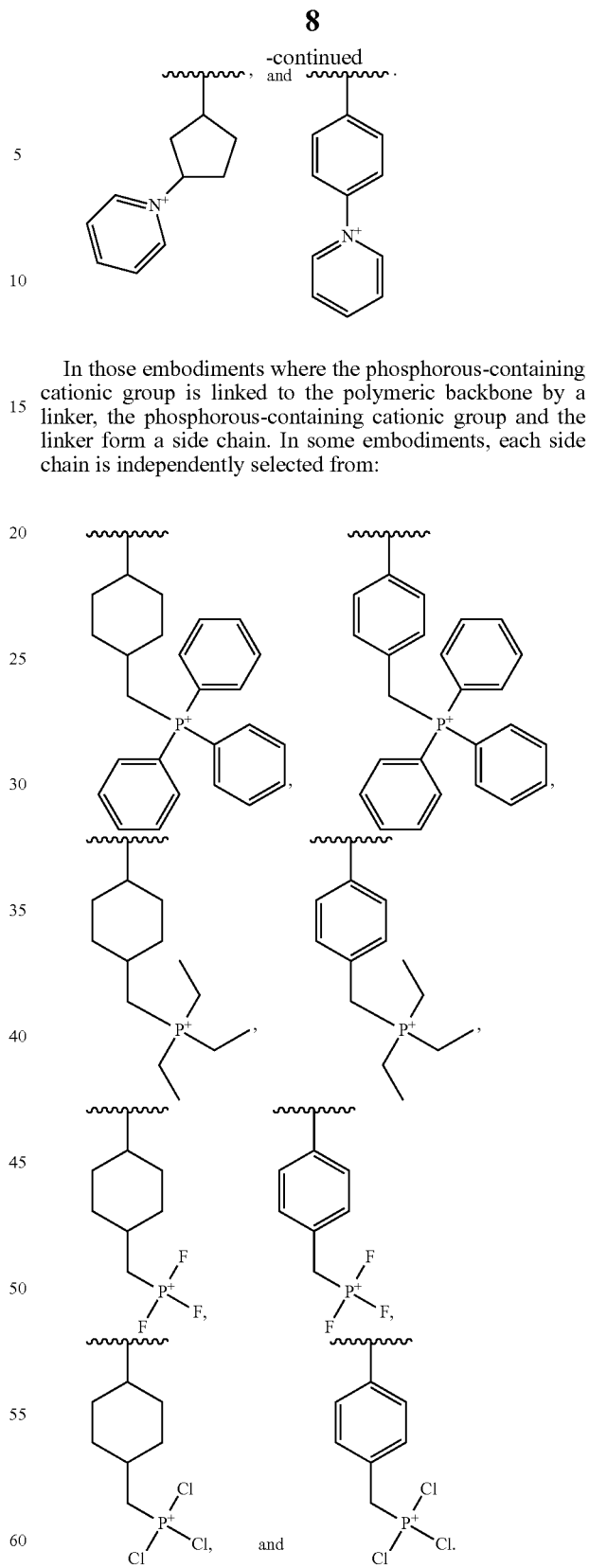

In those embodiments where the phosphorous-containing cationic group is linked to the polymeric backbone by a linker, the phosphorous-containing cationic group and the linker form a side chain. In some embodiments, each side chain is independently selected from:

In those embodiments where the cationic group is connected to the polymeric backbone by a linker, the linker at each occurrence is independently selected from unsubstituted or substituted alkylene, unsubstituted or substituted cycloalkylene, unsubstituted or substituted alkenylene, unsubstituted or substituted arylene, unsubstituted or substituted heteroarylene, unsubstituted or substituted alkylene ether, unsubstituted or substituted alkylene ester, and unsubstituted or substituted alkylene carbamate. In certain embodiments, the linker is unsubstituted or substituted arylene, unsubstituted or substituted heteroarylene. In certain embodiments, the linker is unsubstituted or substituted arylene. In one embodiment, the linker is phenylene. In another embodiment, the linker is hydroxyl-substituted phenylene.

In some embodiments, the polymeric backbone is selected from polyethylene, polypropylene, polyvinyl alcohol, polystyrene, polyurethane, polyvinyl chloride, polyphenol-aldehyde, polytetrafluoroethylene, polybutylene terephthalate, polycaprolactam, and poly(acrylonitrile butadiene styrene).

In certain embodiments, the polymeric backbone is polyethylene or polypropylene. In one embodiment, the polymeric backbone is polyethylene. In another, the polymeric backbone is polyvinyl alcohol. In yet another embodiment, the polymeric backbone is polystyrene.

In other embodiments, the polymeric backbone is selected from polyalkyleneammonium, polyalkylenediammonium, polyalkylenepyrrolium, polyalkyleneimidazolium, polyalkylenepyrazolium, polyalkyleneoxazolium, polyalkylenethiazolium, polyalkylenepyridinium, polyalkylenepyrimidinium, polyalkylenepyrazinium, polyalkylenepyradizimium, polyalkylenethiazinium, polyalkylenemorpholinium, polyalkylenepiperidinium, polyalkylenepiperizinium, polyalkylenepyrollizinium, polyalkylenetriphenylphosphonium, polyalkylenetrimethylphosphonium, polyalkylenetriethylphosphonium, polyalkylenetripropylphosphonium, polyalkylenetributylphosphonium, polyalkylenetrichlorophosphonium, polyalkylenetrifluorophosphonium, and polyalkylenediazolium.

In other embodiments, the polymeric backbone is alkyleneimidazolium, which refers to an alkylene moiety, in which one or more of the methylene units of the alkylene moiety has been replaced with imidazolium. In one embodiment, the polymeric backbone is polyethyleneimidazolium, polyproyleneimidazolium, polybutyleneimidazolium. It should further be understood that, in other embodiments of the polymeric backbone, when a nitrogen-containing cationic group or a phosphorous-containing cationic group follows the term "alkylene", one or more of the methylene units of the alkylene moiety is replaced with that particular nitrogen-containing cationic group or phosphorous-containing cationic group.

In some embodiments, the polymer is cross-linked. In certain embodiments, at least 20%, 30%, 40%, 50%, 60%, 70%, 80%, 90% or 99% of the polymer is cross-linked.

In some embodiments, the acidic monomers and the ionic monomers are randomly arranged in an alternating sequence. In other embodiments, the acidic monomers and the ionic monomers are arranged in blocks of monomers. In certain embodiments where the acidic monomers and the ionic monomers are arranged in blocks of monomers, each block has no more than 20, 19, 18, 17, 16, 15, 14, 13, 12, 11, 10, 9, 8, 7, 6, 5, 4, or 3 monomers.

In some embodiments, the polymer further includes hydrophobic monomers connected to the polymeric backbone, in which each hydrophobic monomer has a hydrophobic group. In some embodiments, the hydrophobic group at each occurrence is independently selected from an unsubstituted or substituted alkyl, an unsubstituted or substituted cycloalkyl, an unsubstituted or substituted aryl, or an unsubstituted or substituted heteroaryl. In certain embodiments, the hydrophobic group at each occurrence is an unsubstituted or substituted aryl, or an unsubstituted or substituted heteroaryl. In one embodiment, the hydrophobic group at each occurrence is phenyl.

In some embodiments, the hydrophobic group is directly connected to the polymeric backbone.

In some embodiments, the polymer further includes acidic-ionic monomers connected to the polymeric backbone, in which each acidic-ionic monomer has a Bronsted-Lowry acid and a cationic group. In some embodiments, the cationic group is a nitrogen-containing cationic group or a phosphorous-containing cationic group.

In certain embodiments, the Bronsted-Lowry acid at each occurrence in the acidic-ionic monomer is independently selected from sulfonic acid, phosphonic acid, acetic acid, isophthalic acid, boronic acid, and perfluorinated acid. In certain embodiments, the Bronsted-Lowry acid at each occurrence is independently sulfonic acid or phosphonic acid. In one embodiment, the Bronsted-Lowry acid at each occurrence is sulfonic acid In some embodiments, the nitrogen-containing cationic group at each occurrence in the acidic-ionic monomer is independently selected from pyrrolium, imidazolium, pyrazolium, oxazolium, thiazolium, pyridinium, pyrimidinium, pyrazinium, pyradizimium, thiazinium, morpholinium, piperidinium, piperizinium, and pyrollizinium. In one embodiment, the nitrogen-containing cationic group is imidazolium.

In some embodiments, the phosphorous-containing cationic group at each occurrence in the acidic-ionic monomer is independently selected from triphenyl phosphonium, trimethyl phosphonium, triethyl phosphonium, tripropyl phosphonium, tributyl phosphonium, trichloro phosphonium, and trifluoro phosphonium. In one embodiment, the phosphorous-containing cationic group is triphenyl phosphonium.

In some embodiments, the one or more of the acidic-ionic monomers each further includes a linker connecting the Bronsted-Lowry acid or the cationic group to the polymeric backbone. In those embodiments where the Bronsted-Lowry acid or the cationic group is connected to the polymeric backbone by a linker in the acidic-ionic monomer, the linker at each occurrence is independently selected from unsubstituted or substituted alkylene, unsubstituted or substituted cycloalkylene, unsubstituted or substituted alkenylene, unsubstituted or substituted arylene, unsubstituted or substituted heteroarylene, unsubstituted or substituted alkylene ether, unsubstituted or substituted alkylene ester, and unsubstituted or substituted alkylene carbamate. In certain embodiments, the linker is unsubstituted or substituted arylene, unsubstituted or substituted heteroarylene. In certain embodiments, the linker is unsubstituted or substituted arylene. In one embodiment, the linker is phenylene. In another embodiment, the linker is hydroxyl-substituted phenylene.

In those embodiments, where the Bronsted-Lowry acid and/or the cationic group of the acidic-ionic monomer is linked to the polymeric backbone by a linker, the Bronsted-Lowry acid and/or the cationic group and the linker form a side chain of the acidic-ionic monomer. In some embodiments, each side chain of the acidic-ionic monomer may independently be selected from:

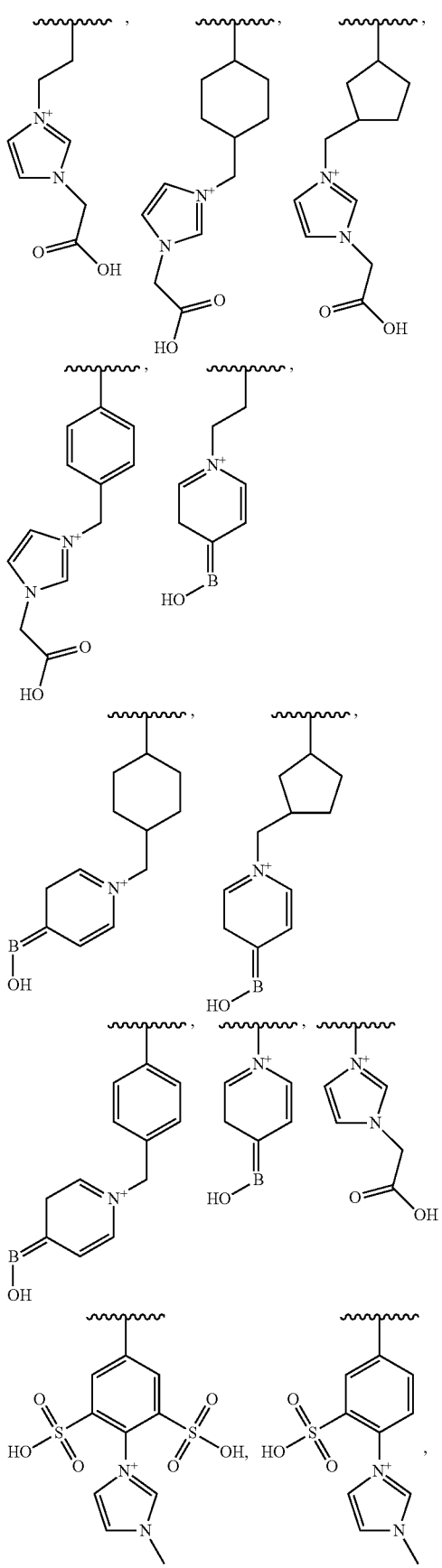

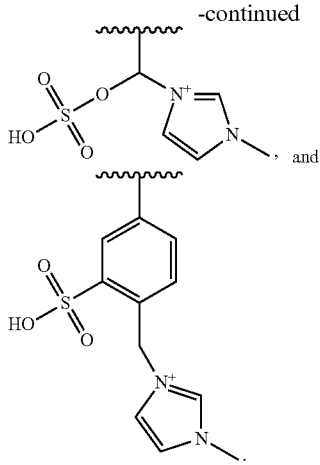

In some embodiments, the polymer has a total amount of Bronsted-Lowry acid of between 0.1 and 20 mmol, between 0.1 and 15 mmol, between 0.01 and 12 mmol, between 0.05 and 10 mmol, between 1 and 8 mmol, between 2 and 7 mmol, between 3 and 6 mmol, between 1 and 5, or between 3 and 5 mmol per gram of the polymer.

In some embodiments, at least a portion of the acidic monomers have sulfonic acid. In those embodiments where at least a portion of the acidic monomers have sulfonic acid, the total amount of sulfonic acid in the polymer is between 0.05 and 10 mmol, between 1 and 8 mmol, or between 2 and 6 mmol per gram of polymer.

In some embodiments, at least a portion of the acidic monomers have phosphonic acid. In those embodiments where at least a portion of the acidic monomers have phosphonic acid in the polymer, the total amount of phosphonic acid in the polymer is between 0.01 and 12 mmol, between 0.05 and 10 mmol, between 1 and 8 mmol, or between 2 and 6 mmol per gram of polymer.

In some embodiments, at least a portion of the acidic monomers have acetic acid. In those embodiments where at least a portion of the acidic monomers have acetic acid, the total amount of acetic acid in the polymer is between 0.01 and 12 mmol, between 0.05 and 10 mmol, between 1 and 8 mmol, or between 2 and 6 mmol per gram of polymer.

In some embodiments, at least a portion of the acidic monomers have isophthalic acid. In those embodiments where at least a portion of the acidic monomers have isophthalic acid, the total amount of isophthalic acid in the polymer is between 0.01 and 5 mmol, between 0.05 and 5 mmol, between 1 and 4 mmol, or between 2 and 3 mmol per gram of polymer.

In some embodiments, at least a portion of the acidic monomers have boronic acid. In those embodiments where at least a portion of the acidic monomers have boronic acid, the total amount of boronic acid in the polymer is between 0.01 and 20 mmol, between 0.05 and 10 mmol, between 1 and 8 mmol, or between 2 and 6 mmol per gram of polymer.

In some embodiments, at least a portion of the acidic monomers have perfluorinated acid. In those embodiments where at least a portion of the acidic monomers have perfluorinated acid, the total amount of perfluorinated acid in the polymer is between 0.01 and 5 mmol, between 0.05 and 5 mmol, between 1 and 4 mmol, or between 2 and 3 mmol per gram of polymer.

In some embodiments, each ionic monomer further includes a counterion for each nitrogen-containing cationic group or phosphorous-containing cationic group. In certain embodiments, the counterion at each occurrence is independently selected from halide, nitrate, sulfate, formate, acetate, or organosulfonate. In some embodiments, the counterion is fluoride, chloride, bromide, or iodide. In one embodiment, the counterion is chloride. In another embodiment, the counterion is sulfate. In yet another embodiment, the counterion is acetate.

In some embodiments, the polymer has a total amount of nitrogen-containing cationic groups and counterions or a total amount of phosphorous-containing cationic groups and counterions of between 0.01 and 10 mmol, between 0.05 and 10 mmol, between 1 and 8 mmol, between 2 and 6 mmol, or between 3 and 5 mmol per gram of polymer.

In some embodiments, at least a portion of the ionic monomers have imidazolium. In those embodiments where at least a portion of the ionic monomers have imidazolium, the total amount of imidazolium and counterions in the polymer is between 0.01 and 8 mmol, between 0.05 and 8 mmol, between 1 and 6 mmol, or between 2 and 5 mmol per gram of polymer.

In some embodiments, at least a portion of the ionic monomers have pyridinium. In those embodiments where at least a portion of thionic monomers have pyridinium, the total amount of pyridinium and counterions in the polymer is between 0.01 and 8 mmol, between 0.05 and 8 mmol, between 1 and 6 mmol, or between 2 and 5 mmol per gram of polymer.

In some embodiments, at least a portion of the ionic monomers have triphenyl phosphonium. In those embodiments where at least a portion of the ionic monomers have triphenyl phosphonium, the total amount of triphenyl phosphonium and counterions in the polymer is between 0.01 and 5 mmol, between 0.05 and 5 mmol, between 1 and 4 mmol, or between 2 and 3 mmol per gram of polymer.

Provided are also polymers selected from:
poly[styrene-co-4-vinylbenzenesulfonic acid-co-3-methyl-1-(4-vinylbenzyl)-3H-imidazol-1-ium chloride-co-divinylbenzene];
poly[styrene-co-4-vinylbenzenesulfonic acid-co-3-methyl-1-(4-vinylbenzyl)-3H-imidazol-1-ium bisulfate-co-divinylbenzene];
poly[styrene-co-4-vinylbenzenesulfonic acid-co-3-methyl-1-(4-vinylbenzyl)-3H-imidazol-1-ium acetate-co-divinylbenzene];
poly[styrene-co-4-vinylbenzenesulfonic acid-co-3-methyl-1-(4-vinylbenzyl)-3H-imidazol-1-ium nitrate-co-divinylbenzene];
poly[styrene-co-4-vinylbenzenesulfonic acid-co-3-ethyl-1-(4-vinylbenzyl)-3H-imidazol-1-ium chloride-co-divinylbenzene];
poly[styrene-co-4-vinylbenzenesulfonic acid-co-3-ethyl-1-(4-vinylbenzyl)-3H-imidazol-1-ium bisulfate-co-divinylbenzene];
poly[styrene-co-4-vinylbenzenesulfonic acid-co-3-ethyl-1-(4-vinylbenzyl)-3H-imidazol-1-ium acetate-co-divinylbenzene];
poly[styrene-co-4-vinylbenzenesulfonic acid-co-3-ethyl-1-(4-vinylbenzyl)-3H-imidazol-1-ium nitrate-co-divinylbenzene];
poly[styrene-co-4-vinylbenzenesulfonic acid-co-1-(4-vinylbenzyl)-3H-imidazol-1-ium chloride-co-divinylbenzene];
poly[styrene-co-4-vinylbenzenesulfonic acid-co-1-(4-vinylbenzyl)-3H-imidazol-1-ium iodide-co-divinylbenzene];
poly[styrene-co-4-vinylbenzenesulfonic acid-co-1-(4-vinylbenzyl)-3H-imidazol-1-ium bromide-co-divinylbenzene];
poly[styrene-co-4-vinylbenzenesulfonic acid-co-1-(4-vinylbenzyl)-3H-imidazol-1-ium bisulfate-co-divinylbenzene];
poly[styrene-co-4-vinylbenzenesulfonic acid-co-1-(4-vinylbenzyl)-3H-imidazol-1-ium acetate-co-divinylbenzene];
poly[styrene-co-4-vinylbenzenesulfonic acid-co-3-methyl-1-(4-vinylbenzyl)-3H-benzoimidazol-1-ium chloride-co-divinylbenzene];
poly[styrene-co-4-vinylbenzenesulfonic acid-co-3-methyl-1-(4-vinylbenzyl)-3H-benzoimidazol-1-ium bisulfate-co-divinylbenzene];
poly[styrene-co-4-vinylbenzenesulfonic acid-co-3-methyl-1-(4-vinylbenzyl)-3H-benzoimidazol-1-ium acetate-co-divinylbenzene];
poly[styrene-co-4-vinylbenzenesulfonic acid-co-3-methyl-1-(4-vinylbenzyl)-3H-benzoimidazol-1-ium formate-co-divinylbenzene];
poly[styrene-co-4-vinylbenzenesulfonic acid-co-1-(4-vinylbenzyl)-pyridinium-chloride-co-divinylbenzene];
poly[styrene-co-4-vinylbenzenesulfonic acid-co-1-(4-vinylbenzyl)-pyridinium-bisulfate-co-divinylbenzene];
poly[styrene-co-4-vinylbenzenesulfonic acid-co-1-(4-vinylbenzyl)-pyridinium-acetate-co-divinylbenzene];
poly[styrene-co-4-vinylbenzenesulfonic acid-co-1-(4-vinylbenzyl)-pyridinium-nitrate-co-divinylbenzene];
poly[styrene-co-4-vinylbenzenesulfonic acid-co-1-(4-vinylbenzyl)-pyridinium-chloride-co-3-methyl-1-(4-vinylbenzyl)-3H-imidazol-1-ium bisulfate-co-divinylbenzene];
poly[styrene-co-4-vinylbenzenesulfonic acid-co-1-(4-vinylbenzyl)-pyridinium-bromide-co-3-methyl-1-(4-vinylbenzyl)-3H-imidazol-1-ium bisulfate-co-divinylbenzene];
poly[styrene-co-4-vinylbenzenesulfonic acid-co-1-(4-vinylbenzyl)-pyridinium-iodide-co-3-methyl-1-(4-vinylbenzyl)-3H-imidazol-1-ium bisulfate-co-divinylbenzene];
poly[styrene-co-4-vinylbenzenesulfonic acid-co-1-(4-vinylbenzyl)-pyridinium-bisulfate-co-3-methyl-1-(4-vinylbenzyl)-3H-imidazol-1-ium bisulfate-co-divinylbenzene];
poly[styrene-co-4-vinylbenzenesulfonic acid-co-1-(4-vinylbenzyl)-pyridinium-acetate-co-3-methyl-1-(4-vinylbenzyl)-3H-imidazol-1-ium bisulfate-co-divinylbenzene];
poly[styrene-co-4-vinylbenzenesulfonic acid-co-4-methyl-4-(4-vinylbenzyl)-morpholin-4-ium chloride-co-divinylbenzene];
poly[styrene-co-4-vinylbenzenesulfonic acid-co-4-methyl-4-(4-vinylbenzyl)-morpholin-4-ium bisulfate-co-divinylbenzene];
poly[styrene-co-4-vinylbenzenesulfonic acid-co-4-methyl-4-(4-vinylbenzyl)-morpholin-4-ium acetate-co-divinylbenzene];
poly[styrene-co-4-vinylbenzenesulfonic acid-co-4-methyl-4-(4-vinylbenzyl)-morpholin-4-ium formate-co-divinylbenzene];
poly[styrene-co-4-vinylbenzenesulfonic acid-co-triphenyl-(4-vinylbenzyl)-phosphonium chloride-co-divinylbenzene];
poly[styrene-co-4-vinylbenzenesulfonic acid-co-triphenyl-(4-vinylbenzyl)-phosphonium bisulfate-co-divinylbenzene];
poly[styrene-co-4-vinylbenzenesulfonic acid-co-triphenyl-(4-vinylbenzyl)-phosphonium acetate-co-divinylbenzene];
poly[styrene-co-4-vinylbenzenesulfonic acid-co-1-methyl-1-(4-vinylbenzyl)-piperidin-1-ium chloride-co-divinylbenzene];
poly[styrene-co-4-vinylbenzenesulfonic acid-co-1-methyl-1-(4-vinylbenzyl)-piperidin-1-ium bisulfate-co-divinylbenzene];

poly[styrene-co-4-vinylbenzenesulfonic acid-co-1-methyl-1-(4-vinylbenzyl)-piperidin-1-ium acetate-co-divinylbenzene];
poly[styrene-co-4-vinylbenzenesulfonic acid-co-4-(4-vinylbenzyl)-morpholine-4-oxide-co-divinyl benzene];
poly[styrene-co-4-vinylbenzenesulfonic acid-co-triethyl-(4-vinylbenzyl)-ammonium chloride-co-divinylbenzene];
poly[styrene-co-4-vinylbenzenesulfonic acid-co-triethyl-(4-vinylbenzyl)-ammonium bisulfate-co-divinylbenzene];
poly[styrene-co-4-vinylbenzenesulfonic acid-co-triethyl-(4-vinylbenzyl)-ammonium acetate-co-divinylbenzene];
poly[styrene-co-3-methyl-1-(4-vinylbenzyl)-3H-imidazol-1-ium chloride-co-4-boronyl-1-(4-vinylbenzyl)-pyridinium chloride-co-divinylbenzene];
poly[styrene-co-3-methyl-1-(4-vinylbenzyl)-3H-imidazol-1-ium chloride-co-1-(4-vinylphenyl)methylphosphonic acid-co-divinylbenzene];
poly[styrene-co-3-methyl-1-(4-vinylbenzyl)-3H-imidazol-1-ium bisulfate-co-1-(4-vinylphenyl)methylphosphonic acid-co-divinylbenzene];
poly[styrene-co-3-methyl-1-(4-vinylbenzyl)-3H-imidazol-1-ium acetate-co-1-(4-vinylphenyl)methylphosphonic acid-co-divinylbenzene];
poly[styrene-co-3-methyl-1-(4-vinylbenzyl)-3H-imidazol-1-ium nitrate-co-1-(4-vinylphenyl)methylphosphonic acid-co-divinylbenzene];
poly[styrene-co-4-vinylbenzenesulfonic acid-co-vinylbenzylchloride-co-1-methyl-2-vinyl-pyridinium chloride-co-divinylbenzene];
poly[styrene-co-4-vinylbenzenesulfonic acid-co-vinylbenzylchloride-co-1-methyl-2-vinyl-pyridinium bisulfate-co-divinylbenzene];
poly[styrene-co-4-vinylbenzenesulfonic acid-co-vinylbenzylchloride-co-1-methyl-2-vinyl-pyridinium acetate-co-divinylbenzene];
poly[styrene-co-4-vinylbenzenesulfonic acid-co-4-(4-vinylbenzyl)-morpholine-4-oxide-co-divinyl benzene];
poly[styrene-co-4-vinylphenylphosphonic acid-co-3-methyl-1-(4-vinylbenzyl)-3H-imidazol-1-ium chloride-co-divinylbenzene];
poly[styrene-co-4-vinylphenylphosphonic acid-co-3-methyl-1-(4-vinylbenzyl)-3H-imidazol-1-ium bisulfate-co-divinylbenzene];
poly[styrene-co-4-vinylphenylphosphonic acid-co-3-methyl-1-(4-vinylbenzyl)-3H-imidazol-1-ium acetate-co-divinylbenzene];
poly[styrene-co-3-carboxymethyl-1-(4-vinylbenzyl)-3H-imidazol-1-ium chloride-co-divinylbenzene];
poly[styrene-co-3-carboxymethyl-1-(4-vinylbenzyl)-3H-imidazol-1-ium bisulfate-co-divinylbenzene];
poly[styrene-co-3-carboxymethyl-1-(4-vinylbenzyl)-3H-imidazol-1-ium acetate-co-divinylbenzene];
poly[styrene-co-5-(4-vinylbenzylamino)-isophthalic acid-co-3-methyl-1-(4-vinylbenzyl)-3H-imidazol-1-ium chloride-co-divinylbenzene];
poly[styrene-co-5-(4-vinylbenzylamino)-isophthalic acid-co-3-methyl-1-(4-vinylbenzyl)-3H-imidazol-1-ium bisulfate-co-divinylbenzene];
poly[styrene-co-5-(4-vinylbenzylamino)-isophthalic acid-co-3-methyl-1-(4-vinylbenzyl)-3H-imidazol-1-ium acetate-co-divinylbenzene];
poly[styrene-co-(4-vinylbenzylamino)-acetic acid-co-3-methyl-1-(4-vinylbenzyl)-3H-imidazol-1-ium chloride-co-divinylbenzene];
poly[styrene-co-(4-vinylbenzylamino)-acetic acid-co-3-methyl-1-(4-vinylbenzyl)-3H-imidazol-1-ium bisulfate-co-divinylbenzene];
poly[styrene-co-(4-vinylbenzylamino)-acetic acid-co-3-methyl-1-(4-vinylbenzyl)-3H-imidazol-1-ium acetate-co-divinylbenzene];
poly(styrene-co-4-vinylbenzenesulfonic acid-co-vinylbenzylmethylimidazolium chloride-co-vinylbenzylmethylmorpholinium chloride-co-vinylbenzyltriphenyl phosphonium chloride-co-divinylbenzene);
poly(styrene-co-4-vinylbenzenephosphonic acid-co-vinylbenzylmethylimidazolium chloride-co-vinylbenzylmethylmorpholinium chloride-co-vinylbenzyltriphenyl phosphonium chloride-co-divinylbenzene);
poly(styrene-co-4-vinylbenzenesulfonic acid-co-vinylbenzylmethylimidazolium bisulfate-co-vinylbenzylmethylmorpholinium bisulfate-co-vinylbenzyltriphenyl phosphonium bisulfate-co-divinylbenzene);
poly(styrene-co-4-vinylbenzenephosphonic acid-co-vinylbenzylmethylimidazolium bisulfate-co-vinylbenzylmethylmorpholinium bisulfate-co-vinylbenzyltriphenyl phosphonium bisulfate-co-divinylbenzene);
poly(styrene-co-4-vinylbenzenesulfonic acid-co-vinylbenzylmethylimidazolium acetate-co-vinylbenzylmethylmorpholinium acetate-co-vinylbenzyltriphenyl phosphonium acetate-co-divinylbenzene);
poly(styrene-co-4-vinylbenzenephosphonic acid-co-vinylbenzylmethylimidazolium acetate-co-vinylbenzylmethylmorpholinium acetate-co-vinylbenzyltriphenyl phosphonium acetate-co-divinylbenzene);
poly(styrene-co-4-vinylbenzenesulfonic acid-co-vinylbenzylmethylmorpholinium chloride-co-vinylbenzyltriphenylphosphonium chloride-co-divinylbenzene);
poly(styrene-co-4-vinylbenzenephosphonic acid-co-vinylbenzylmethylmorpholinium chloride-co-vinylbenzyltriphenylphosphonium chloride-co-divinylbenzene);
poly(styrene-co-4-vinylbenzenesulfonic acid-co-vinylbenzylmethylmorpholinium bisulfate-co-vinylbenzyltriphenylphosphonium bisulfate-co-divinylbenzene);
poly(styrene-co-4-vinylbenzenephosphonic acid-co-vinylbenzylmethylmorpholinium bisulfate-co-vinylbenzyltriphenylphosphonium bisulfate-co-divinylbenzene);
poly(styrene-co-4-vinylbenzenesulfonic acid-co-vinylbenzylmethylmorpholinium acetate-co-vinylbenzyltriphenylphosphonium bisulfate-co-divinylbenzene);
poly(styrene-co-4-vinylbenzenephosphonic acid-co-vinylbenzylmethylmorpholinium acetate-co-vinylbenzyltriphenylphosphonium bisulfate-co-divinylbenzene)
poly(styrene-co-4-vinylbenzenesulfonic acid-co-vinylmethylimidazolium chloride-co-divinylbenzene);
poly(styrene-co-4-vinylbenzenesulfonic acid-co-vinylmethylimidazolium bisulfate-co-divinylbenzene);
poly(styrene-co-4-vinylbenzenesulfonic acid-co-vinylmethylimidazolium acetate-co-divinylbenzene);
poly(styrene-co-4-vinylbenzenesulfonic acid-co-vinylmethylimidazolium nitrate-co-divinylbenzene);
poly(styrene-co-4-vinylbenzenephosphonic acid-co-vinylmethylimidazolium chloride-co-divinylbenzene);
poly(styrene-co-4-vinylbenzenephosphonic acid-co-vinylmethylimidazolium bisulfate-co-divinylbenzene);
poly(styrene-co-4-vinylbenzenephosphonic acid-co-vinylmethylimidazolium acetate-co-divinylbenzene);
poly(styrene-co-4-vinylbenzenesulfonic acid-co-vinylbenzyltriphenylphosphonium chloride-co-divinylbenzene);
poly(styrene-co-4-vinylbenzenesulfonic acid-co-vinylbenzyltriphenylphosphonium bisulfate-co-divinylbenzene);
poly(styrene-co-4-vinylbenzenesulfonic acid-co-vinylbenzyltriphenylphosphonium acetate-co-divinylbenzene);

poly(styrene-co-4-vinylbenzenephosphonic acid-co-vinylbenzyltriphenylphosphonium chloride-co-divinylbenzene);

poly(styrene-co-4-vinylbenzenephosphonic acid-co-vinylbenzyltriphenylphosphonium bisulfate-co-divinylbenzene);

poly(styrene-co-4-vinylbenzenephosphonic acid-co-vinylbenzyltriphenylphosphonium acetate-co-divinylbenzene);

poly(styrene-co-4-vinylbenzenesulfonic acid-co-vinylbenzylmethylimidazolium chloride-co-divinylbenzene);

poly(styrene-co-4-vinylbenzenesulfonic acid-co-vinylbenzylmethylimidazolium bisulfate-co-divinylbenzene);

poly(styrene-co-4-vinylbenzenesulfonic acid-co-vinylbenzylmethylimidazolium acetate-co-divinylbenzene);

poly(styrene-co-4-vinylbenzenephosphonic acid-co-vinylbenzylmethylimidazolium chloride-co-divinylbenzene);

poly(styrene-co-4-vinylbenzenephosphonic acid-co-vinylbenzylmethylimidazolium bisulfate-co-divinylbenzene);

poly(styrene-co-4-vinylbenzenephosphonic acid-co-vinylbenzylmethylimidazolium acetate-co-divinylbenzene);

poly(styrene-co-4-vinylbenzenesulfonic acid-co-vinylbenzyltriphenylphosphonium chloride-co-divinylbenzene);

poly(styrene-co-4-vinylbenzenesulfonic acid-co-vinylbenzyltriphenylphosphonium bisulfate-co-divinylbenzene);

poly(styrene-co-4-vinylbenzenesulfonic acid-co-vinylbenzyltriphenylphosphonium acetate-co-divinylbenzene);

poly(styrene-co-4-vinylbenzenephosphonic acid-co-vinylbenzyltriphenylphosphonium chloride-co-divinylbenzene);

poly(styrene-co-4-vinylbenzenephosphonic acid-co-vinylbenzyltriphenylphosphonium bisulfate-co-divinylbenzene);

poly(styrene-co-4-vinylbenzenephosphonic acid-co-vinylbenzyltriphenylphosphonium acetate-co-divinylbenzene);

poly(butyl-vinylimidazolium chloride-co-butylimidazolium bisulfate-co-4-vinylbenzenesulfonic acid);

poly(butyl-vinylimidazolium bisulfate-co-butylimidazolium bisulfate-co-4-vinylbenzenesulfonic acid);

poly(benzyl alcohol-co-4-vinylbenzylalcohol sulfonic acid-co-vinylbenzyltriphenylphosphonium chloride-co-divinylbenzyl alcohol);

poly(benzyl alcohol-co-4-vinylbenzylalcohol sulfonic acid-co-vinylbenzyltriphenylphosphonium bisulfate-co-divinylbenzyl alcohol).

In some embodiments, the polymer is:
poly[styrene-co-4-vinylbenzenesulfonic acid-co-3-methyl-1-(4-vinylbenzyl)-3H-imidazol-1-ium bisulfate-co-divinylbenzene];

poly[styrene-co-4-vinylbenzenesulfonic acid-co-3-methyl-1-(4-vinylbenzyl)-3H-imidazol-1-ium chloride-co-divinylbenzene]; or poly[styrene-co-4-vinylbenzenesulfonic acid-co-3-methyl-1-(4-vinylbenzyl)-3H-imidazol-1-ium acetate-co-divinylbenzene].

In other embodiments, the polymer is:
poly[styrene-co-4-vinylbenzenesulfonic acid-co-3-ethyl-1-(4-vinylbenzyl)-3H-imidazol-1-ium bisulfate-co-divinylbenzene];

poly[styrene-co-4-vinylbenzenesulfonic acid-co-3-ethyl-1-(4-vinylbenzyl)-3H-imidazol-1-ium chloride-co-divinylbenzene].

poly[styrene-co-4-vinylbenzenesulfonic acid-co-1-(4-vinylbenzyl)-3H-imidazol-1-ium bisulfate-co-divinylbenzene]; or poly[styrene-co-4-vinylbenzenesulfonic acid-co-3-methyl-1-(4-vinylbenzyl)-3H-benzoimidazol-1-ium bisulfate-co-divinylbenzene].

In other embodiments, the polymer is:
poly[styrene-co-4-vinylbenzenesulfonic acid-co-3-methyl-1-(4-vinylbenzyl)-3H-imidazol-1-ium chloride-co-divinylbenzene].

In other embodiments, the polymer is:
poly[styrene-co-4-vinylphenylphosphonic acid-co-3-methyl-1-(4-vinylbenzyl)-3H-imidazol-1-ium chloride-co-divinylbenzene]; or poly[styrene-co-3-methyl-1-(4-vinylbenzyl)-3H-imidazol-1-ium chloride-co-1-(4-vinylphenyl)methylphosphonic acid-co-divinylbenzene].

In other embodiments, the polymer is:
poly[styrene-co-4-vinylbenzenesulfonic acid-co-1-(4-vinylbenzyl)-pyridinium-bisulfate-co-divinylbenzene];

poly[styrene-co-4-vinylbenzenesulfonic acid-co-1-(4-vinylbenzyl)-pyridiniumchloride-co-3-methyl-1-(4-vinylbenzyl)-3H-imidazol-1-ium bisulfate-co-divinylbenzene]; or poly[styrene-co-4-vinylbenzenesulfonic acid-co-vinylbenzylchloride-co-1-methyl-2-vinyl-pyridinium chloride-co-divinylbenzene].

In yet other embodiments, the polymer is:
poly[styrene-co-4-vinylbenzenesulfonic acid-co-4-methyl-4-(4-vinylbenzyl)-morpholin-4-ium bisulfate-co-divinylbenzene];

poly[styrene-co-4-vinylbenzenesulfonic acid-co-4-(4-vinylbenzyl)-morpholine-co-divinyl benzene]; or poly[styrene-co-4-vinylbenzenesulfonic acid-co-4-(4-vinylbenzyl)-morpholine-4-oxide-co-divinyl benzene].

In yet other embodiments, the polymer is:
poly[styrene-co-4-vinylbenzenesulfonic acid-co-triphenyl-(4-vinylbenzyl)-phosphonium bisulfate-co-divinylbenzene].

In yet other embodiments, the polymer is:
poly[styrene-co-4-vinylbenzenesulfonic acid-co-1-(4-vinylbenzyl)-piperidine-co-divinyl benzene]; or poly[styrene-co-4-vinylbenzenesulfonic acid-co-1-methyl-1-(4-vinylbenzyl)-piperidin-1-ium chloride-co-divinyl benzene].

In yet other embodiments, the polymer is:
poly[styrene-co-4-vinylbenzenesulfonic acid-co-triethyl-(4-vinylbenzyl)-ammonium chloride-co-divinylbenzene].

In yet other embodiments, the polymer is:
poly[styrene-co-4-vinylbenzenesulfonic acid-co-4-(4-vinylbenzyl)-morpholine-4-oxide-co-divinyl benzene].

In yet other embodiments, the polymer is:
poly[styrene-co-5-(4-vinylbenzylamino)-isophthalic acid-co-3-methyl-1-(4-vinylbenzyl)-3H-imidazol-1-ium chloride-co-divinylbenzene].

In yet other embodiments, the polymer is:
poly[styrene-co-(4-vinylbenzylamino)-acetic acid-co-3-methyl-1-(4-vinylbenzyl)-3H-imidazol-1-ium chloride-co-divinylbenzene].

In some embodiments, the polymer is:
poly(styrene-co-4-vinylbenzenesulfonic acid-co-vinylbenzylmethylimidazolium bisulfate-co-vinylbenzylmethylmorpholinium bisulfate-co-vinylbenzyltriphenyl phosphonium bisulfate-co-divinylbenzene); or poly(styrene-co-4-vinylbenzenesulfonic acid-co-vinylbenzylmethylmorpholinium bisulfate-co-vinylbenzyltriphenylphosphonium bisulfate-co-divinylbenzene).

In other embodiments, the polymer is:
poly(benzyl alcohol-co-4-vinylbenzylalcohol sulfonic acid-co-vinylbenzyltriphenylphosphonium chloride-co-divinylbenzyl alcohol).

In some embodiments, the polymer is:
poly(styrene-co-4-vinylbenzylalcohol sulfonic acid-co-vinylmethylimidazolium bisulfate-co-divinylbenzene);

poly(styrene-co-4-vinylbenzylalcohol sulfonic acid-co-vinylbenzyltriphenyl phosphonium bisulfate-co-divinylbenzene);

poly(styrene-co-4-vinylbenzylalcohol sulfonic acid-co-vinylbenzylmethylimidazolium bisulfate-co-divinylbenzene);

poly(styrene-co-4-vinylbenzylalcohol sulfonic acid-co-vinylbenzyltriphenyl phosphonium bisulfate-co-divinylbenzene); or poly(styrene-co-4-vinylbenzylalcohol sulfonic acid-co-vinylbenzyltriphenylphosphonium bisulfate-co-divinylbenzene).

In yet other embodiments, the polymer is:
poly(butyl-vinylimidazolium bisulfate-co-4-vinylbenzenesulfonic acid-co-butylimidazolium bisulfate-co-styrene).

In some embodiments, the polymer described herein has one or more catalytic properties selected from:

a) disruption of a hydrogen bond in cellulosic materials;

b) intercalation of the polymer into crystalline domains of cellulosic materials; and c) cleavage of a glycosidic bond in cellulosic materials.

In some embodiments, the polymer has a greater specificity for cleavage of a glycosidic bond than dehydration of a monosaccharide in cellulosic materials.

In some embodiments, the polymer is capable of degrading biomass into one or more sugars at a first-order rate constant of at least 0.001 per hour. In other embodiments, the polymer is capable of degrading biomass to produce the sugars at a first-order rate constant of at least 0.1, at least 0.15, at least 0.2, at least 0.25, at least 0.3 or at least 0.5 per hour.

In some embodiments, the polymer is capable of converting biomass into one or more sugars and residual biomass, wherein the residual biomass has a degree of polymerization of less than 300. In other embodiments, the polymer is capable of converting biomass into one or more sugars and residual biomass, wherein the residual biomass has a degree of polymerization of less than 100, less than 90, less than 80, less than 70, less than 60, or less than 50.

In some embodiments, the polymer is substantially insoluble in water or an organic solvent.

Provided is also a solid particle that includes a solid core and any of the polymers described herein, in which the polymer is coated on the surface of the solid core. In some embodiments, the solid core is made up of an inert material or a magnetic material. In one embodiment, the solid core is made up of iron.

In some embodiments, the solid particle is substantially free of pores.

In other embodiments, the solid particle has catalytic activity. In certain embodiments, at least about 50%, at least 60%, at least 70%, at least 80%, at least 90% of the catalytic activity of the solid particle is present on or near the exterior surface of the solid particle.

Provided is also a composition that includes biomass and any of the polymers described herein. In some embodiments, the composition further includes a solvent. In one embodiment, the composition further includes water. In some embodiments, the biomass has cellulose, hemicellulose, or a combination thereof. In yet other embodiments, the biomass also has lignin.

Provided is also a chemically-hydrolyzed biomass composition that includes any of the polymers described herein, one or more sugars, and residual biomass. In some embodiments, the one or more sugars are one or more monosaccharides, one or more oligosaccharides, or a mixture thereof. In other embodiments, the one or more sugars are two or more sugars that include at least one C4-C6 monosaccharide and at least one oligosaccharide. In yet other embodiments, the one or more sugars are selected from glucose, galactose, fructose, xylose, and arabinose.

Provided is also a saccharification intermediate that includes any of the polymer described herein hydrogen-bonded to biomass. In certain embodiments of the saccharification intermediate, the ionic moiety of the polymer is hydrogen-bonded to the carbohydrate alcohol groups present in cellulose, hemicellulose, and other oxygen-containing components of biomass. In certain embodiments of the saccharification intermediate, the acidic moiety of the polymer is hydrogen-bonded to the carbohydrate alcohol groups present in cellulose, hemicellulose, and other oxygen-containing components of lignocellulosic biomass, including the glycosidic linkages between sugar monomers. In some embodiments, the biomass has cellulose, hemicellulose or a combination thereof.

Provided is also a method for degrading biomass into one or more sugars, by: a) providing biomass; b) contacting the biomass with any of the polymers described herein and a solvent for a period of time sufficient to produce a degraded mixture, in which the degraded mixture has a liquid phase and a solid phase, and the liquid phase includes one or more sugars, and the solid phase includes residual biomass; c) isolating at least a portion of the liquid phase from the solid phase; and d) recovering the one or more sugars from the isolated liquid phase.

In some embodiments, the isolating of at least a portion of the liquid phase from the solid phase produces a residual biomass mixture, and the method further includes: i) providing a second biomass; ii) contacting the second biomass with the residual biomass mixture for a period of time sufficient to produce a second degraded mixture, in which the second degraded mixture has a second liquid phase and a second solid phase, and the second liquid phase includes one or more second sugars, and wherein the second solid phase includes second residual biomass; iii) isolating at least a portion of the second liquid phase from the second solid phase; and iv) recovering the one or more second sugars from the isolated second liquid phase.

In some embodiments, the method further includes contacting the second biomass and the residual biomass mixture with a second polymer, in which the second polymer can be any of the polymers described herein. In other embodiments, the method further includes contacting the second biomass and the residual biomass mixture with a second solvent. In some embodiments, the method further includes recovering the polymer after isolating at least a portion of the second liquid phase. In certain embodiments of the method, the solvent includes water.

In some embodiments of the method, the biomass has cellulose and hemicellulose, and the biomass is contacted with the polymer and the solvent at a temperature and/or at a pressure suitable to preferentially hydrolyze the cellulose or suitable to preferentially hydrolyze the hemicellulose.

In some embodiments of the method, the one or more sugars are selected from one or more monosaccharides, one or more oligosaccharides, or a combination thereof. In certain embodiments, the one or more monosaccharides are one or more C4-C6 monosaccharides. In certain embodiments, the one or more sugars are selected from glucose, galactose, fructose, xylose, and arabinose.

In some embodiments, the method further includes pretreating the biomass before contacting the biomass with the polymer. In certain embodiments, the pretreatment of the biomass is selected from washing, solvent-extraction, solvent-swelling, comminution, milling, steam pretreatment, explosive steam pretreatment, dilute acid pretreatment, hot water pretreatment, alkaline pretreatment, lime pretreatment, wet oxidation, wet explosion, ammonia fiber explosion, organosolvent pretreatment, biological pretreatment, ammonia percolation, ultrasound, electroporation, microwave, supercritical $CO_2$, supercritical $H_2O$, ozone, and gamma irradiation, or a combination thereof.

In some embodiments of the method, the residual biomass has a degree of polymerization of less than 300. In other embodiments of the methods, the residual biomass has a degree of polymerization of less than 100, less than 90, less than 80, less than 70, less than 60, or less than 50.

In some embodiments of the method, the degrading of the biomass to produce the sugars occurs at a first-order rate constant of at least 0.001 per hour. In other embodiments of the method, the degrading of the biomass to produce the sugars occurs at a first-order rate constant of at least 0.1, at least 0.15, at least 0.2, at least 0.25, at least 0.3 or at least 0.5 per hour.

Provided is also a method for pretreating biomass before hydrolysis of the biomass to produce one or more sugars, by: a) providing biomass; b) contacting the biomass with any of the polymers described herein and a solvent for a period of time sufficient to partially degrade the biomass; and c) pretreating the partially degraded biomass before hydrolysis to produce one or more sugars. In some embodiments, the biomass has cellulose, hemicellulose, or a combination thereof. In other embodiments, the biomass also has lignin. In some embodiments, the pretreatment of the partially degraded biomass mixture is selected from washing, solvent-extraction, solvent-swelling, comminution, milling, steam pretreatment, explosive steam pretreatment, dilute acid pretreatment, hot water pretreatment, alkaline pretreatment, lime pretreatment, wet oxidation, wet explosion, ammonia fiber explosion, organosolvent pretreatment, biological pretreatment, ammonia percolation, ultrasound, electroporation, microwave, supercritical $CO_2$, supercritical $H_2O$, ozone, and gamma irradiation, or a combination thereof.

Provided is also a method of hydrolyzing pretreated biomass to produce one or more sugars, by: a) providing biomass pretreated according any of the pretreatment methods described herein; and b) hydrolyzing the pretreated biomass to produce one or more sugars. In some embodiments, the pretreated biomass is chemically hydrolyzed or enzymatically hydrolyzed. In some embodiments, the one or more sugars are selected from the group consisting of glucose, galactose, fructose, xylose, and arabinose.

Provided is also a use of any of the polymers described herein for degrading biomass into one or more monosaccharides, one or more oligosaccharides, or a combination thereof. In some embodiments, the one or more monosaccharides are one or more C4-C6 monosaccharides. In other embodiments, the one or more sugars are selected from glucose, galactose, fructose, xylose, and arabinose. In some embodiments, the biomass has cellulose, hemicellulose, or a combination thereof. In yet other embodiments, the biomass also has lignin.

Provided is also a use of any of the polymers described herein for pretreating biomass before further treatment using one or more methods selected from washing, solvent-extraction, solvent-swelling, comminution, milling, steam pretreatment, explosive steam pretreatment, dilute acid pretreatment, hot water pretreatment, alkaline pretreatment, lime pretreatment, wet oxidation, wet explosion, ammonia fiber explosion, organosolvent pretreatment, biological pretreatment, ammonia percolation, ultrasound, electroporation, microwave, supercritical $CO_2$, supercritical $H_2O$, ozone, and gamma irradiation.

Provided is also a sugar composition obtained by any of the methods for degrading biomass into one or more sugars described herein that employs any of the polymers described herein.

Provided is also a sugar composition obtained by contacting biomass with any of the polymers described herein for a period of time sufficient to hydrolyze the biomass into one or more sugars. In some embodiments, the sugar composition has at least 0.1%, at least 0.2%, at least 0.3%, at least 0.4%, at least 0.5%, at least 0.6%, at least 0.7%, at least 0.8% or at least 0.9% by weight a mixture of sugars, wherein the mixture of sugars comprises one or more C4-C6 monosaccharides and one or more oligosaccharides. In certain embodiments of the sugar composition, the one or more C4-C6 monosaccharides are selected from glucose, galactose, fructose, xylose, and arabinose.

Provided is also a biofuel composition derived from any of the sugar compositions described herein. In certain embodiments, the biofuel composition includes butanol, ethanol, or a mixture thereof.

Provided is also a method of preparing any of the polymers described herein, by: a) providing a starting polymer; b) reacting the starting polymer with a nitrogen-containing or phosphorous-containing compound to produce an ionic polymer; and c) reacting the ionic polymer with an acid to produce any of the polymers described herein. In some embodiments, the starting polymer is selected from polyethylene, polypropylene, polyvinyl alcohol, polycarbonate, polystyrene, polyurethane, or a combination thereof. In certain embodiments, the starting polymer is a polystyrene. In certain embodiments, the starting polymer is poly(styrene-co-vinylbenzylhalide-co-divinylbenzene). In another embodiment, the starting polymer is poly(styrene-co-vinylbenzylchloride-co-divinylbenzene).

In some embodiments of the method to prepare any of the polymers described herein, the nitrogen-containing compound is selected from a pyrrolium compound, an imidazolium compound, a pyrazolium compound, an oxazolium compound, a thiazolium compound, a pyridinium compound, a pyrimidinium compound, a pyrazinium compound, a pyradizimium compound, a thiazinium compound, a morpholinium compound, a piperidinium compound, a piperizinium compound, and a pyrollizinium compound. In certain embodiments, the nitrogen-containing compound is an imidazolium compound.

In some embodiments of the method to prepare any of the polymers described herein, the acid is selected from sulfuric acid, phosphoric acid, hydrochloric acid, acetic acid and boronic acid. In one embodiment, the acid is sulfuric acid.

Provided is also a method of preparing any of the polymers described herein having a polystyrene backbone, by: a) providing a polystyrene; b) reacting the polystyrene with a nitrogen-containing compound to produce an ionic polymer; and c) reacting the ionic polymer with an acid to produce a polymer. In certain embodiments, the polystyrene is poly(styrene-co-vinylbenzylhalide-co-divinylbenzene). In one embodiment, the polystyrene is poly(styrene-co-vinylbenzylchloride-co-divinylbenzene).

In some embodiments of the method to prepare any of the polymers described herein having a polystyrene backbone, the nitrogen-containing compound is selected from a pyrrolium compound, an imidazolium compound, a pyrazolium compound, an oxazolium compound, a thiazolium compound, a pyridinium compound, a pyrimidinium compound, a pyrazinium compound, a pyradizimium compound, a thiazinium compound, a morpholinium compound, a piperidinium compound, a piperizinium compound, and a pyrollizinium compound. In certain embodiments, the nitrogen-containing compound is an imidazolium compound.

In some embodiments of the method to prepare any of the polymers described herein having a polystyrene backbone, the acid is selected from sulfuric acid, phosphoric acid, hydrochloric acid, acetic acid and boronic acid. In one embodiment, the acid is sulfuric acid.

Provided is also a polymer prepared according to any of the methods described above. In certain embodiments, the polymer has one or more catalytic properties selected from:
  a) disruption of a hydrogen bond in cellulosic materials;
  b) intercalation of the polymer into crystalline domains of cellulosic materials; and
  c) cleavage of a glycosidic bond in cellulosic materials.

Provided is also a use of a polymer prepared according to any of the methods described above for degrading biomass into one or more monosaccharides, one or more oligosaccharides, or a combination thereof.

Provided is also a use a polymer prepared according to any of the methods described above for partially digesting biomass before pretreatment using one or more methods selected from the group consisting of washing, solvent-extraction, solvent-swelling, comminution, milling, steam pretreatment, explosive steam pretreatment, dilute acid pretreatment, hot water pretreatment, alkaline pretreatment, lime pretreatment, wet oxidation, wet explosion, ammonia fiber explosion, organosolvent pretreatment, biological pretreatment, ammonia percolation, ultrasound, electroporation, microwave, supercritical $CO_2$, supercritical $H_2O$, ozone, and gamma irradiation.

Provided are also polymeric acid catalysts that are polymers having a plurality of monomers, in which at least one monomer has an acidic moiety, and at least one monomer includes an ionic moiety (e.g., a covalently-attached cationic group that can be coordinated to an exchangeable counterion). An exemplary polymer is provided in Formula (I):

(I)

in which A represents monomer that have an acidic moiety and B represents monomers that have an ionic moiety (e.g., a cationic moiety, a basic moiety or a salt). The acidic moiety includes a Brønsted-Lowry acid, and the ionic moiety includes a nitrogen-containing functional group. Moreover, a and b are stoichiometric coefficients, such that a and b together make up a substantial portion of the co-monomer subunits of the polymer. For example, a and b together make up at least about 30%, at least about 40%, at least about 50%, at least about 60%, at least about 70%, at least about 80%, at least about 90%, at least about 95%, at least about 99% or substantially all of the co-monomer subunits of the polymer.

In some embodiments, the polymer of Formula (I) is a polymer of Formula (Ia):

(Ia), which includes monomers C that are covalently bound to and are cross-linked with other monomers in the polymer, and c is a stochiometic coefficient.

In other embodiments, the polymer of formula (I) is a polymer of Formula (Ib):

(Ib), which includes monomers D that are covalently bound to other monomers in the polymer, and d is a stochoimetric coefficient.

In other embodiments, the polymer of formula (I) is a polymer of Formula (Ic):

(Ic).

In certain embodiments, monomers D are non-functionalized moieties, such as hydrophobic moieties (e.g., phenyl).

Another exemplary polymer is provided in Formula (II):

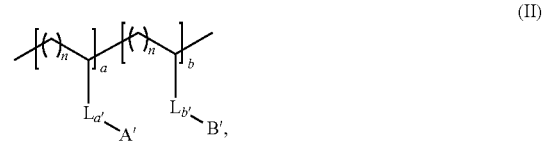
(II)

in which each of $L_{a'}$ and $L_{b'}$ is independently for each occurrence a linker or absent; each A' for each occurrence is an acidic moiety; each B' for each occurrence is an ionic (e.g., cationic) moiety; each n is independently for each occurrence 0, 1, 2, 3, 4, 5, or 6; and a and b are stoichiometric coefficients together make up a substantial portion of the co-monomer subunits of the polymer. For example, a and b together make up at least about 30%, at least about 40%, at least about 50%, at least about 60%, at least about 70%, at least about 80%, at least about 90%, at least about 95%, at least about 99% or substantially all of the monomers of the polymer. Each of $L_{a'}$ and $L_{b'}$ can independently have a plurality of A' moieties and B' moieties, respectively.

Another exemplary polymer is provided in Formula (III):

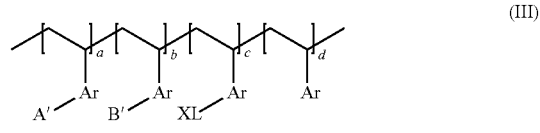
(III)

in which each Ar is independently for each occurrence an aryl or heteroaryl moiety; each A' for each occurrence is an acidic moiety; each B' for each occurrence is an ionic moiety (e.g., a cationic moiety); each XL for each occurrence is a cross-linking moiety; and a, b, c, and d are stochoimetric coefficients, such that when taken together make up a substantial portion of the co-monomer subunits of the polymer. For example, a, b, c, and d together make up at least about 30%, at least about 40%, at least about 50%, at least about 60%, at least about 70%, at least about 80%, at least about 90%, at least about 95%, at least about 99% or substantially all of the co-monomer subunits of the polymer. Each Ar can independently have a plurality of A' moieties, B' moieties, and XL moieties, respectively.

Another exemplary polymer is provided in Formula (IV):

(IV)

in which each of $L_{ab}$ is independently for each occurrence a linker or absent; each AB for each occurrence is a moiety that includes an acidic and an ionic moiety (e.g., a cationic moiety); each n is independently for each occurrence 0, 1, 2, 3, 4, 5, or 6; and ab is a stoichiometric coefficient, such that ab makes up a substantial portion of the co-monomer subunits of the polymer. For example, ab makes up at least about 30%, at least about 40%, at least about 50%, at least about 60%, at least about 70%, at least about 80%, at least about 90%, at least about 95%, at least about 99% or substantially all of the co-monomer subunits of the polymer. Each of $L_{ab}$ can independently have a plurality of acidic moieties and ionic moieties (e.g., cationic moieties), respectively.

Where polymers such as Formula (I), (Ia), (Ib), (Ic), (II), (III), or (IV) are depicted herein, the connectivity as shown above does not require a block polymer, but can also include other configurations of the A and B monomers, including random polymers. Moreover, the depiction of attachment of the monomers, such as that of A to B, does not limit the nature of the attachment of the monomers, such as A to B by way of a carbon-carbon bond, but can also include other attachments such as a carbon-heteroatom bond.

In certain embodiments, the polymer of Formula (I), (Ia), (Ib), (Ic), (II), (III), or (IV) can catalyze the break-down of polysaccharides such as cellulose, and hemicellulose, for example, through cleavage of the glycosidic bond between sugar moieties. In general, it is the acidic moiety on the polymer of Formula (I), (Ia), (Ib), (Ic), (II), (III), or (IV) that catalyzes the cleavage of the glycosidic bonds. However, polymer of Formula (I), (Ia), (Ib), (Ic), (II), (III), or (IV) also includes an ionic moiety (e.g., a cationic moiety), which is generally present as a nitrogen containing salt. This salt functionality of the polymer of Formula (I), (Ia), (Ib), (Ic), (II), (III), or (IV) can promote the break-down of the tertiary structure of the polysaccharides described herein, such as cellulosic materials. For example, the ionic moiety can disrupt inter- and intra-molecular hydrogen bonding in polysaccharide materials (e.g., disrupting the tertiary structure of the material), which can allow the acidic moiety of the polymer to access more readily the glycosidic bonds of the polysaccharides. Accordingly, the combination of the two functional moieties on a single polymer can provide for a catalyst that is effective in the break-down of polysaccharides using relatively mild conditions as compared to those methods that employ a more corrosive acid, or methods that employ harsh conditions such as high temperatures or pressure.

DESCRIPTION OF THE FIGURES

The following description sets forth exemplary compositions, methods, parameters and the like. It should be recognized, however, that such description is not intended as a limitation on the scope of the present disclosure but is instead provided as a description of exemplary embodiments.

FIG. 3A illustrates a portion of an exemplary polymer, in which the monomers are randomly arranged in an alternating sequence.

FIG. 3B illustrates a portion of an exemplary polymer, in which the monomers are arranged in blocks of monomers, and the block of acidic monomers alternates with the block of ionic monomers.

FIGS. 4A and 4B illustrate a portion of exemplary polymers with cross-linking within a given polymeric chain.

FIGS. 5A, 5B, 5C and 5D illustrate a portion of exemplary polymers with cross-linking between two polymeric chains.

FIG. 7A illustrates two side chains in an exemplary polymer, in which there are three carbon atoms between the side chain with the Bronsted-Lowry acid and the side chain with the cationic group.

FIG. 7B illustrates two side chains in another exemplary polymer, in which there are zero carbons between the side chain with the Bronsted-Lowry acid and the side chain with the cationic group.

DETAILED DESCRIPTION

Figure 1:
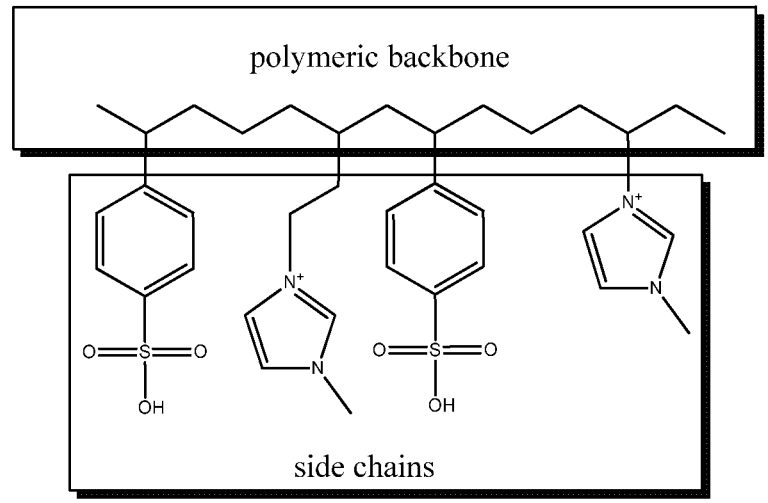
FIG. 1 illustrates a portion of an exemplary polymer that has a polymeric backbone and side chains.

The following description sets forth exemplary methods, parameters and the like. It should be recognized, however, that such description is not intended as a limitation on the scope of the present disclosure but is instead provided as a description of exemplary embodiments.

Described herein are polymers that can be used, in some embodiments, as an acid catalyst to hydrolyze cellulosic materials to produce monosaccharides, as well as oligosaccharides. Such polymers are herein referred to as "polymeric acid catalysts". In particular, the polymeric acid catalysts provided herein can disrupt the hydrogen bond superstructure typically found in natural cellulosic materials, allowing the acidic pendant groups of the polymer to come into chemical contact with the interior glycosidic bonds in the crystalline domains of cellulose.

Unlike traditional catalysts known in the art used to hydrolyze cellulosic materials (e.g., enzymes, concentrated acids or dilute aqueous acids), the polymeric acid catalysts described herein provide effective cellulose digestion, as well as ease of recycle and reuse. The ability to recycle and reuse the catalyst presents several advantages, including reducing the cost of converting lignocellulose into industrially important chemicals, such as sugars, oligosaccharides, organic acids, alcohols and aldehydes. Unlike enzymes and dilute aqueous acids, the polymeric catalysts described herein can penetrate deeply into the crystalline structure of cellulose, resulting in higher yields and faster kinetics for hydrolyzing cellulosic materials to produce monosaccharides and/or oligosaccharides. Unlike concentrated acids, which require costly, energy-intensive solvent extraction and/or distillation processes to recover the acid catalyst following lignocellulose digestion, the polymeric catalysts described herein are less corrosive, more easily handled, and can be easily recovered because they naturally phase separate from aqueous products. Further, the use of the polymeric acid catalysts provided herein does not require solubilization of the cellulosic material in a solvent such as molten metal halides, ionic liquids, or acid/organic solvent mixtures. Thus, provided herein are stable, recyclable, polymeric catalysts that can efficiently digest cellulosic materials on a commercially-viable scale.

DEFINITIONS

As used herein, "alkyl" includes saturated straight-chain or branched-chain monovalent hydrocarbon radicals, and combinations of these, which contain only C and H when unsubstituted. Examples include methyl, ethyl, propyl, butyl and pentyl. When an alkyl residue having a specific number of carbons is named, all geometric isomers having that number of carbons are intended to be encompassed and described; thus, for example, "butyl" is meant to include n-butyl, sec-butyl, iso-butyl, and tert-butyl; "propyl" includes n-propyl, and iso-propyl. The total number of carbon atoms in each such group is sometimes described herein. For example, when the group can contain up to ten carbon atoms it can be represented as 1-10C or as C1-C10 or C1-C10. In some embodiments, alkyl may be substituted. Suitable alkyl substituents may include, for example, hydroxy, amino, and halo.

As used herein, "alkylene" refers to the same residues as alkyl, but having bivalency. Examples of alkylene include methylene (—$CH_2$—), ethylene (—$CH_2CH_2$—), propylene (—$CH_2CH_2CH_2$—), butylene (—$CH_2CH_2CH_2CH_2$—).

As used herein, "alkylene carbamate" refers to an alkylene moiety, in which one or more of the methylene units of the alkylene moiety has been replaced with a carbamate moiety (—C(O)—O—NR— or —O—C(O)—NR—, where R can be, for example, alkyl or aryl). In some embodiments, alkylene carbamate may be substituted. Suitable alkylene carbamate substituents may include, for example, hydroxyl, amino, and halo.

As used herein, "alkylene ester" refers to an alkylene moiety, in which one or more of the methylene units of the alkylene moiety has been replaced with an ester moiety (—C(O)—O— or —O—C(O)—). In some embodiments, alkylene ester may be substituted, further bearing one or more substituents. Suitable alkylene ester substituents may include, for example, hydroxyl, amino, and halo.

As used herein, "alkylene ether" refers to an alkylene moiety, in which one or more of the methylene units of the alkylene moiety has been replaced with an ether moiety (—C(O)—). In some embodiments, alkylene ether may be substituted, further bearing one or more substituents. Suitable alkylene ether substituents may include, for example, hydroxyl, amino, and halo.

As used herein, "alkenyl" refers to an unsaturated hydrocarbon group having at least one site of olefinic unsaturation (i.e., having at least one moiety of the formula C=C). Alkenyl contains only C and H when unsubstituted. When an alkenyl residue having a specific number of carbons is named, all geometric isomers having that number of carbons are intended to be encompassed and described; thus, for example, "butenyl" is meant to include n-butenyl, sec-butenyl, and iso-butenyl. Examples of alkenyl may include —CH=$CH_2$, —$CH_2$—CH=$CH_2$ and —$CH_2$—CH=CH—CH=$CH_2$. In some embodiments, alkenyl may be substituted. Suitable alkyenyl substituents may include, for example, hydroxy, amino, and halo.

As used herein, "alkenylene" refers to the same residues as alkenyl, but having bivalency. Examples of alkenylene include ethylene (—CH=CH—), propylene (—$CH_2$—CH=CH—) and butylene (—$CH_2$—CH=CH—$CH_2$—).

As used herein, "alkynyl" refers to "an unsaturated hydrocarbon group having at least one site of acetylenic unsaturation (i.e., having at least one moiety of the formula Alkynyl contains only C and H when unsubstituted. When an alkynyl residue having a specific number of carbons is named, all geometric isomers having that number of carbons are intended to be encompassed and described; thus, for example, "pentynyl" is meant to include n-pentynyl, sec-pentynyl, iso-pentynyl, and tert-pentynyl. Examples of alkynyl may include —C≡CH or —C≡C—$CH_3$. In some embodiments, alkynyl may be substituted. Suitable alkynyl substituents may include, for example, hydroxy, amino, and halo.

As used herein, "aryl" refers to an unsaturated aromatic carbocyclic group having a single ring (e.g., phenyl) or multiple condensed rings (e.g., naphthyl or anthryl), which condensed rings may or may not be aromatic. Aryl contains only C and H when unsubstituted. An aryl group having more than one ring where at least one ring is non-aromatic may be connected to the parent structure at either an aromatic ring position or at a non-aromatic ring position. In one variation, an aryl group having more than one ring where at least one ring is non-aromatic is connected to the parent structure at an aromatic ring position. Examples of aryl may include phenyl, phenol, and benzyl. In some embodiments, aryl may be substituted. Suitable aryl substituents may include, for example, alkyl, alkenyl, alkynyl, hydroxy, amino, and halo.

As used herein, "arylene" refers to the same residues as aryl, but having bivalency.

As used herein, "cycloalkyl" includes a carbocyclic, non-aromatic group that is connected via a ring carbon atom, which contains only C and H when unsubstituted. The cycloalkyl can consist of one ring, such as cyclohexyl, or multiple rings, such as adamantyl. A cycloalkyl with more than one ring may be fused, spiro or bridged, or combinations thereof. Examples of cycloalkyl groups include cyclopropyl, cyclobutyl, cyclopentyl, cyclohexyl, adamantyl, and decahydronaphthalenyl. In some embodiments, cycloalkyl may be substituted. Suitable cycloalkyl substituents may include, for example, alkyl, hydroxy, amino, and halo.

As used herein, "cycloalkylene" refers to the same residues as cycloalkyl, but having bivalency.

As used herein, "heteroaryl" refers to an unsaturated aromatic carbocyclic group having from 1 to 10 annular carbon atoms and at least one annular heteroatom, including but not limited to heteroatoms such as nitrogen, oxygen and sulfur. A heteroaryl group may have a single ring (e.g., pyridyl, pyridinyl, imidazolyl) or multiple condensed rings (e.g., indolizinyl, benzothienyl) which condensed rings may or may not be aromatic. A heteroaryl group having more than one ring where at least one ring is non-aromatic may be connected to the parent structure at either an aromatic ring position or at a non-aromatic ring position. In one variation, a heteroaryl group having more than one ring where at least one ring is non-aromatic is connected to the parent structure at an aromatic ring position. Examples of heteroaryls may include pyridyl, pyridinyl, imidazolyl, and thiazolyl. In some embodiments, heteroaryl may be substituted. Suitable heteroaryl substituents may include, for example, alkyl, alkenyl, alkynyl, hydroxy, amino, and halo.

As used herein, "heteroarylene" refers to the same residues as heteroaryl, but having bivalency.

It should be understood that the alkyl, cycloalkyl, alkenyl, alkynyl, aryl, heteroaryl, ether, ester, and carbamate may be substituted, where the particular group or groups being described may have no non-hydrogen substituents, or the group or groups may have one or more non-hydrogen substituents. If not otherwise specified, the total number of such substituents that may be present is equal to the number of H atoms present on the unsubstituted form of the group being described.

Polymeric Acid Catalysts

In one aspect, the polymeric acid catalysts provided herein are polymers made up of acidic monomers and ionic monomers (which are also known as "ionomers") connected to form a polymeric backbone. Each acidic monomer includes at least one Bronsted-Lowry acid, and each ionic monomer includes at least one nitrogen-containing cationic group or phosphorous-containing cationic group. Some of the acidic and ionic monomers may also include a linker that connects the Bronsted-Lowry acid and cationic group, respectively, to the polymeric backbone. For the acidic monomers, the Bronsted-Lowry acid and the linker together form a side chain. Similarly, for the ionic monomers, the cationic group and the linker together form a side chain. With reference to the portion of the exemplary polymer depicted in FIG. 1, the side chains are pendant from the polymeric backbone.

a) Acidic and Ionic Monomers

The polymers described herein contain monomers that have at least one Bronsted-Lowry acid and at least one cationic group. The Bronsted-Lowry acid and the cationic group may be on different monomers or on the same monomer.

In some embodiments, the acidic monomers may have one Bronsted-Lowry acid. In other embodiments, the acidic monomers may have two or more Bronsted-Lowry acids, as is chemically feasible. When the acidic monomers have two or more Bronsted-Lowry acids, the acids may be the same or different.

Suitable Bronsted-Lowry acids may include any Bronsted-Lowry acid that can form a covalent bond with a carbon. The Bronsted-Lowry acids may have a pK value of less than about 7, less than about 6, less than about 5, less than about 4, less than about 3, less than about 2, less than about 1, or less than zero. In some embodiments, the Bronsted-Lowry acid at each occurrence may be independently selected from sulfonic acid, phosphonic acid, acetic acid, isophthalic acid, boronic acid, and perfluorinated acid.

The acidic monomers in the polymer may either all have the same Bronsted-Lowry acid, or may have different Bronsted-Lowry acids. In an exemplary embodiment, each Bronsted-Lowry acid in the polymer is sulfonic acid. In another exemplary embodiment, each Bronsted-Lowry acid in the polymer is phosphonic acid. In yet another exemplary embodiment, the Bronsted-Lowry acid in some monomers of the polymer is sulfonic acid, while the Bronsted-Lowry acid in other monomers of the polymer is phosphonic acid.

In some embodiments, the ionic monomers may have one cationic group. In other embodiments, the ionic monomers may have two or more cationic groups, as is chemically feasible. When the ionic monomers have two or more cationic groups, the cationic groups may be the same or different.

Suitable cationic groups may include any nitrogen-containing cationic group or a phosphorus-containing cationic group. In some embodiments, the nitrogen-containing cationic group at each occurrence may be independently selected from ammonium, pyrrolium, imidazolium, pyrazolium, oxazolium, thiazolium, pyridinium, pyrimidinium, pyrazinium, pyradizimium, thiazinium, morpholinium, piperidinium, piperizinium, and pyrollizinium. In other embodiments, the phosphorous-containing cationic group at each occurrence may be independently selected from triphenyl phosphonium, trimethyl phosphonium, triethyl phosphonium, tripropyl phosphonium, tributyl phosphonium, trichloro phosphonium, and trifluoro phosphonium.

The ionic monomers may either all have the same cationic group, or may have different cationic groups. In some embodiments, each cationic group in the polymer is a nitrogen-containing cationic group. In other embodiments, each cationic group in the polymer is a phosphorous-containing cationic group. In yet other embodiments, the cationic group in some monomers of the polymer is a nitrogen-containing cationic group, whereas the cationic group in other monomers of the polymer is a phosphorous-containing cationic group. In an exemplary embodiment, each cationic group in the polymer is imidazolium. In another exemplary embodiment, the cationic group in some monomers of the polymer is imidazolium, while the cationic group in other monomers of the polymer is pyridinium. In yet another exemplary embodiment, each cationic group in the polymer is a substituted phosphonium. In yet another exemplary embodiment, the cationic group in some monomers of the polymer is triphenyl phosphonium, while the cationic group in other monomers of the polymer is imidazolium.

In some embodiments, the cationic group may coordinate with a counterion. For example, the counterion may be a halide (e.g., bromide, chloride, iodide, and fluoride), nitrate ($NO_3^-$), sulfate ($SO_4^{2-}$), formate ($HCOO^-$), acetate ($H_3COO^-$), or an organosulfonate ($R-SO_3^-$; where R is an organic functional group, e.g., methyl, phenyl).

In other embodiments, the cationic group may coordinate with a Bronsted-Lowry acid in the polymer. At least a portion of the Bronsted-Lowry acids and the cationic groups in the polymer may form inter-monomer ionic associations. Inter-monomeric ionic associations result in salts forming between monomers in the polymer, rather than with external counterions. In some exemplary embodiments, the ratio of acidic monomers engaged in inter-monomer ionic associations to the total number of acidic monomers may be at most 90% internally-coordinated, at most 80% internally-coordinated, at most 70% internally-coordinated, at most 60% internally-coordinated, at most 50% internally-coordinated, at most 40% internally-coordinated, at most 30% internally-coordinated, at most 20% internally-coordinated, at most 10% internally-coordinated, at most 5% internally-coordinated, at most 1% internally-coordinated, or less than 1% internally-coordinated. It should be understood that internally-coordinates sites are less likely to exchange with an ionic solution that is brought into contact with the polymer.

Some of the monomers in the polymer contain both the Bronsted-Lowry acid and the cationic group in the same monomer. Such monomers are referred to as "acidic-ionic monomers". In exemplary embodiments, a side chain of an acidic-ionic monomer may contain imidazolium and acetic acid, or pyridinium and boronic acid.

Figure 2:
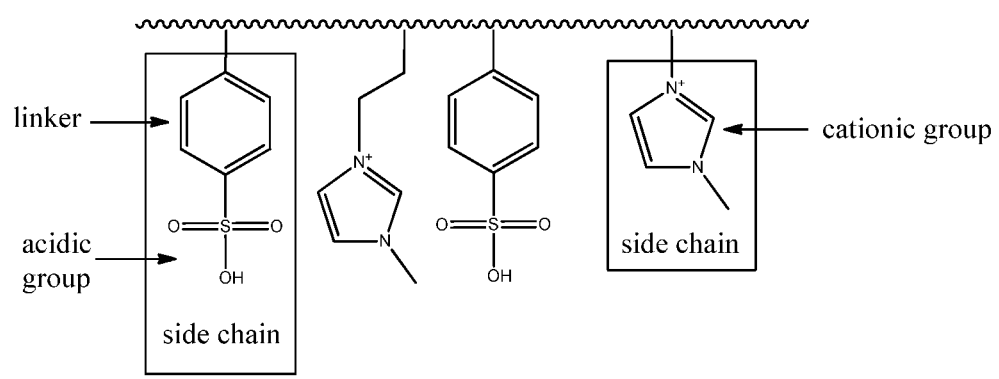
FIG. 2 illustrates a portion of an exemplary polymer, in which a side chain with the acidic group is connected to the polymeric backbone by a linker and in which a side chain with the cationic group is connected directly to the polymeric backbone.

With reference to the portion of an exemplary polymer depicted in FIG. 2, the Bronsted-Lowry acid and the cationic group in the side chains of the monomers may be directly connected to the polymeric backbone or connected to the polymeric backbone by a linker.

Suitable linkers may include, for example, unsubstituted or substituted alkylene, unsubstituted or substituted cycloalkylene, unsubstituted or substituted alkenylene, unsubstituted or substituted arylene, unsubstituted or substituted heteroarylene, unsubstituted or substituted alkylene ether, unsubstituted or substituted alkylene ester, and unsubstituted or substituted alkylene carbamate. In some embodiments, the linker is an unsubstituted or substituted C5 or C6 arylene. In certain embodiments, the linker is an unsubstituted or substituted phenylene. In one exemplary embodiment, the linker is unsubstituted phenylene. In another exemplary embodiment, the linker is substituted phenylene (e.g., hydroxy-substituted phenylene).

Further, it should be understood that some or all of the acidic monomers connected to the polymeric backbone by a linker may have the same linker, or independently have different linkers. Similarly, some or all of the ionic monomers connected to the polymeric backbone by a linker may have the same linker, or independently have different linkers. Further, some or all of the acidic monomers connected to the polymeric backbone by a linker may have the same or different linkers as some or all of the ionic monomers connected to the polymeric backbone by a linker.

In certain embodiments, the acidic monomers may have a side chain with a Bronsted-Lowry acid that is connected to the polymeric backbone by a linker. Side chains with one or more Bronsted-Lowry acids connected by a linker may include, for example,

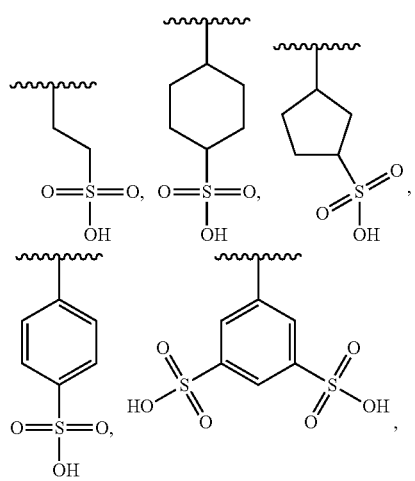

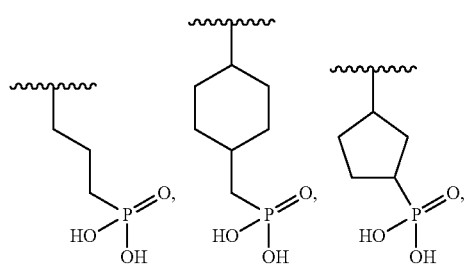

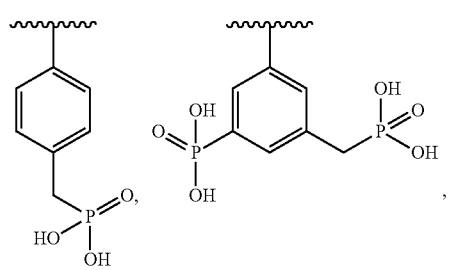

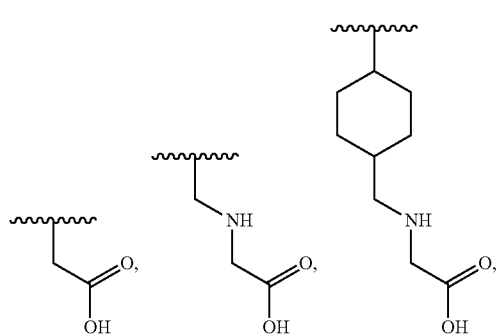

-continued

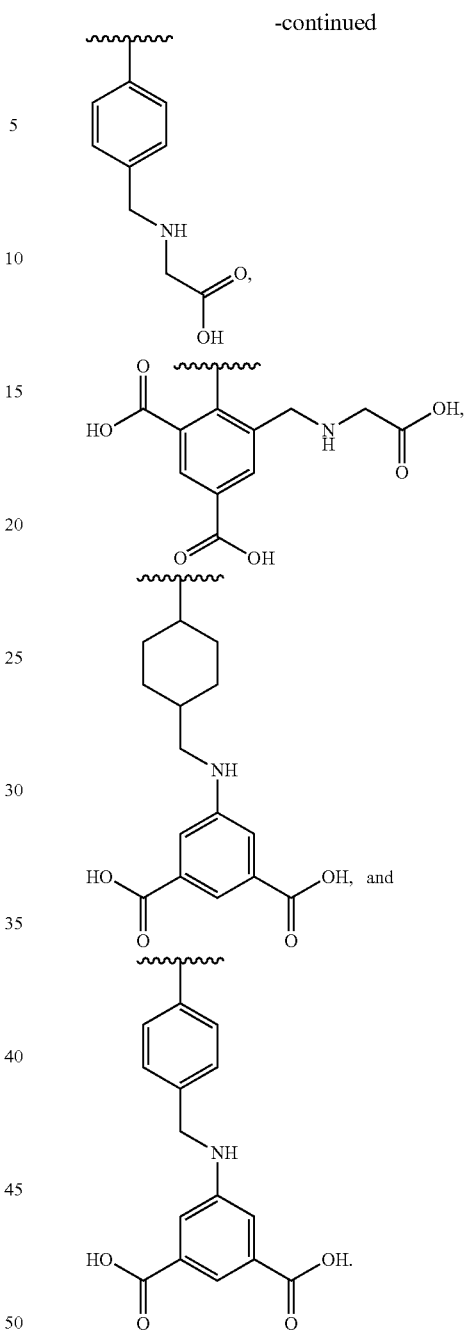

As used herein, ⁓⁓⁓ denotes the point of attachment to the polymeric backbone.

In other embodiments, the acidic monomers may have a side chain with a Bronsted-Lowry acid that is directly connected to the polymeric backbone. Side chains with a Bronsted-Lowry acid directly connected to the polymer backbone may include, for example,

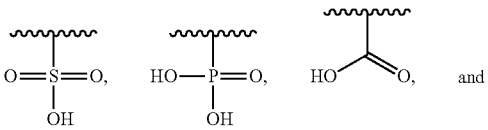

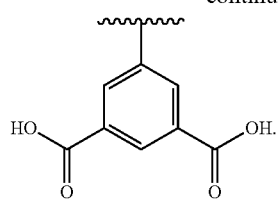
In certain embodiments, the ionic monomers may have a side chain with a cationic group that is connected to the polymeric backbone by a linker. Side chains with one or more cationic groups connected by a linker may include, for example,
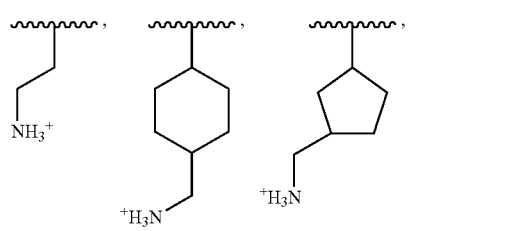
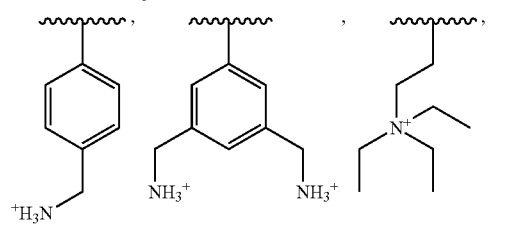
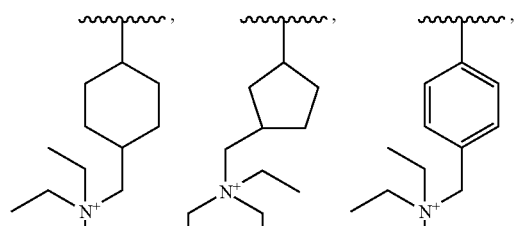
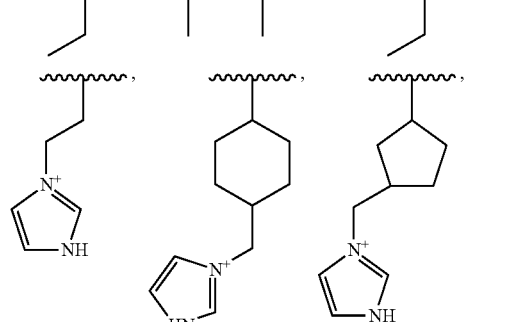
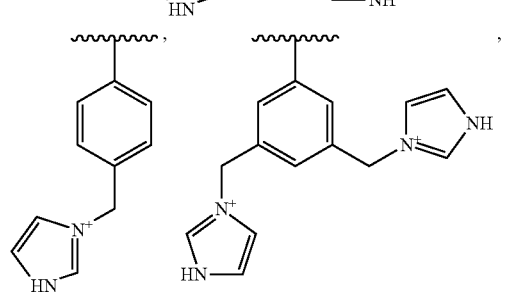
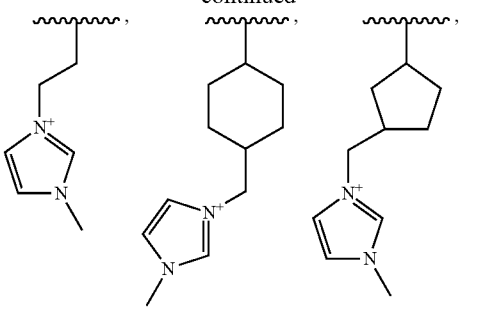
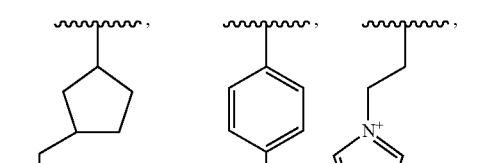
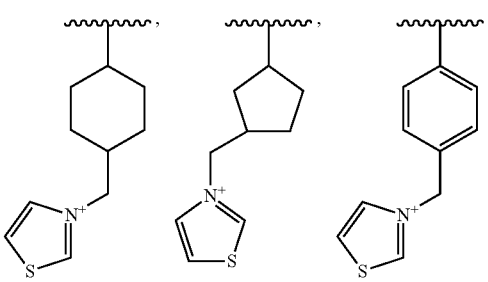
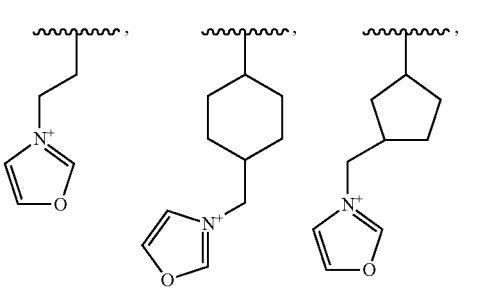

35
-continued
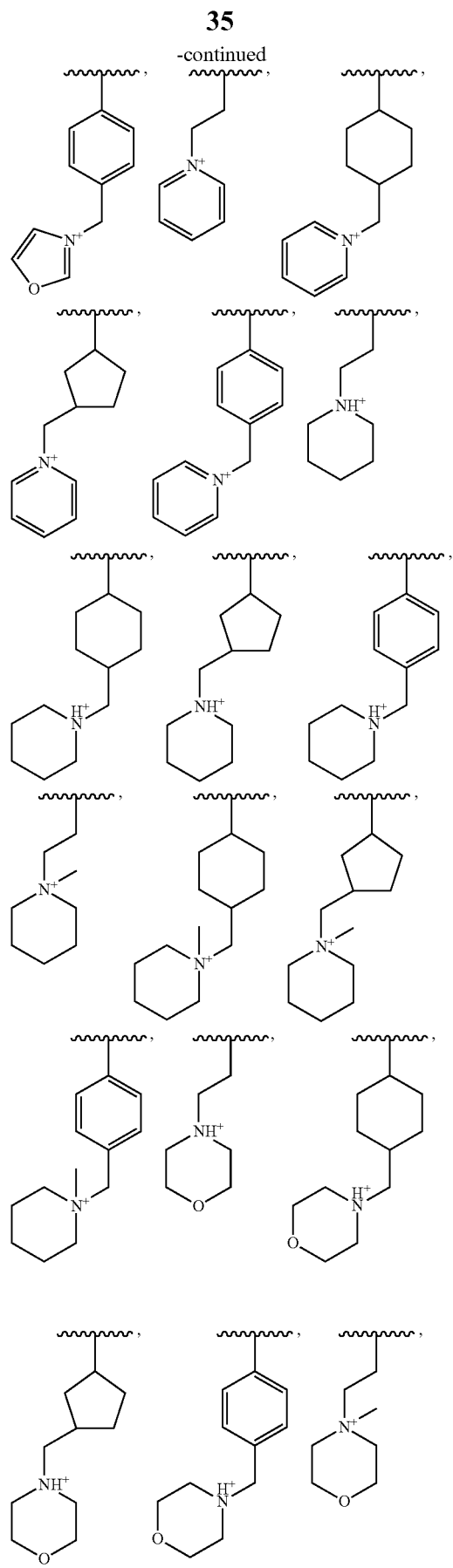
36
-continued
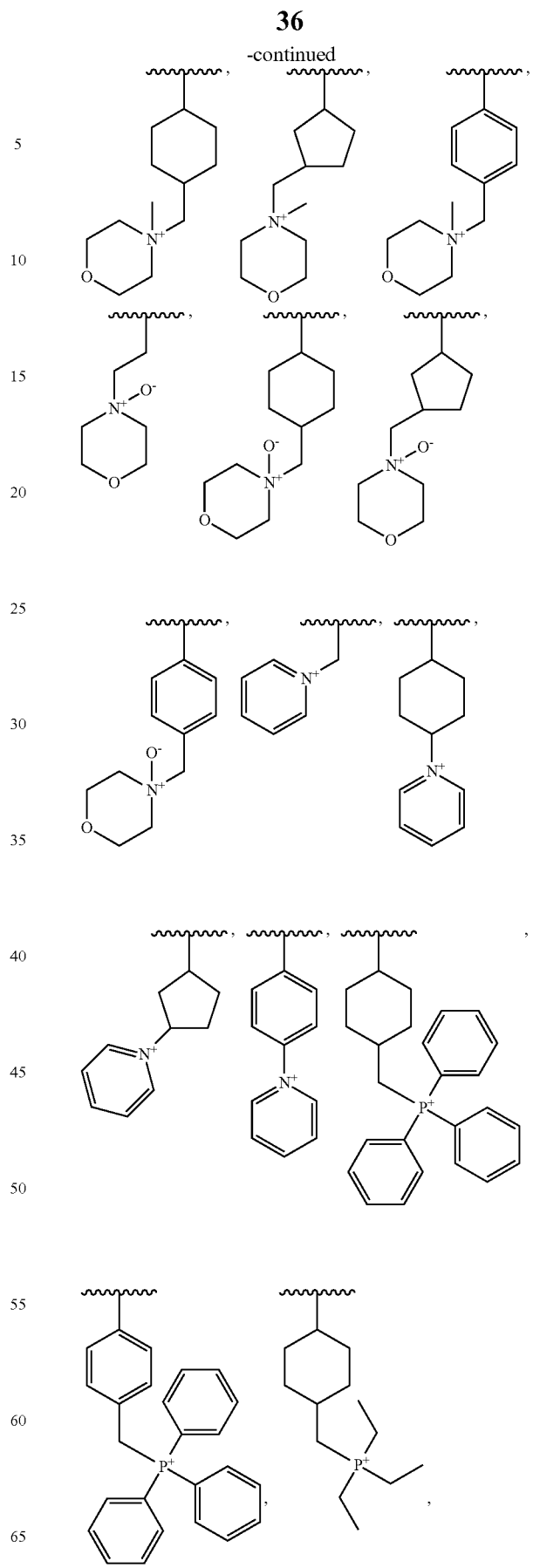

-continued

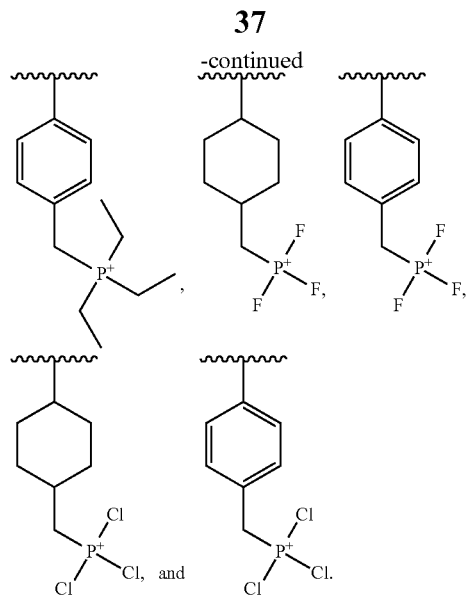

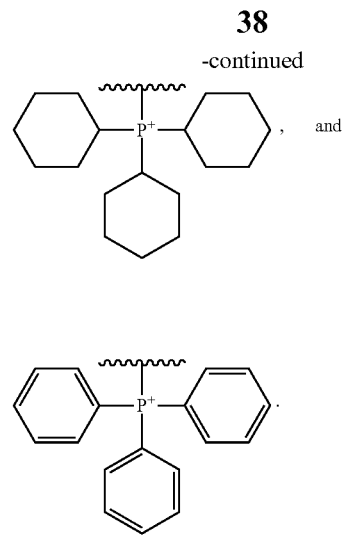

In other embodiments, the ionic monomers may have a side chain with a cationic group that is directly connected to the polymeric backbone. Side chains with a nitrogen-containing cationic group directly connected to the polymeric backbone may include, for example,

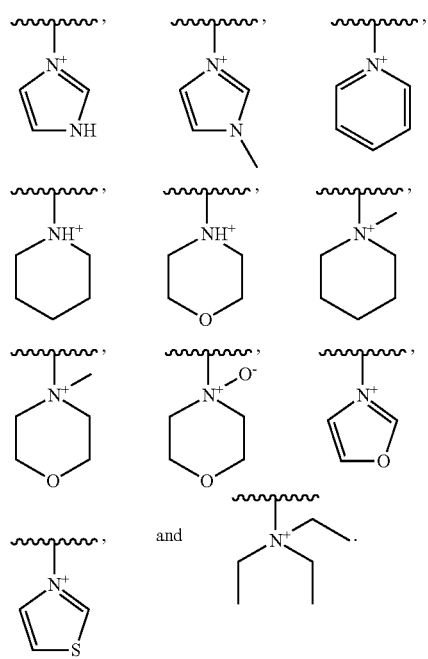

Side chains with a phosphorous-containing cationic group directly connected to the polymeric backbone may include, for example,

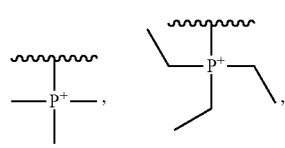

In other embodiments, the monomers may have a side chain containing both a Bronsted-Lowry acid and a cationic group, where either the Bronsted-Lowry acid is connected to the polymeric backbone by a linker or the cationic group is connected to the polymeric backbone by a linker. Monomers that have side chains containing both a Bronsted-Lowry acid and a cationic group may also be called "acidic ionomers". Such side chains in acidic-ionic monomers that are connected by a linker may include, for example,

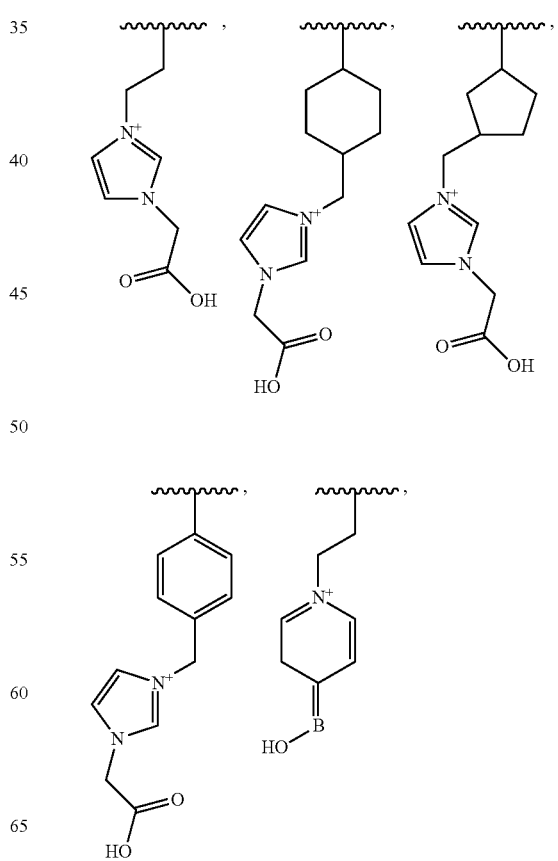

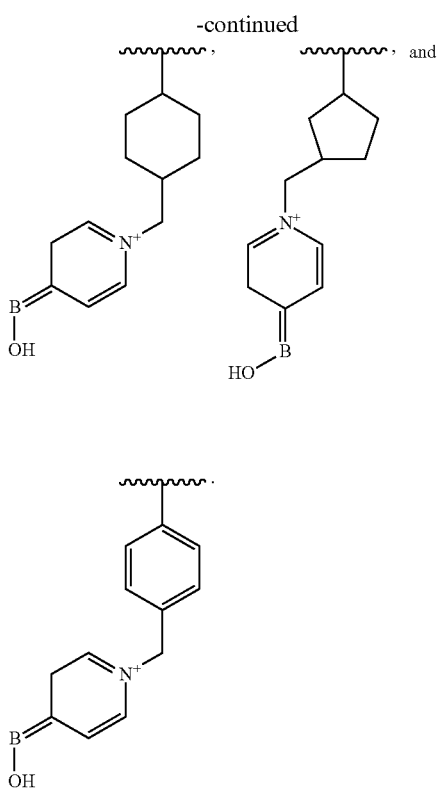

In other embodiments, the monomers may have a side chain containing both a Bronsted-Lowry acid and a cationic group, where the Bronsted-Lowry acid is directly connected to the polymeric backbone, the cationic group is directly connected to the polymeric backbone, or both the Bronsted-Lowry acid and the cationic group are directly connected to the polymeric backbone. Such side chains in acidic-ionic monomers may include, for example,

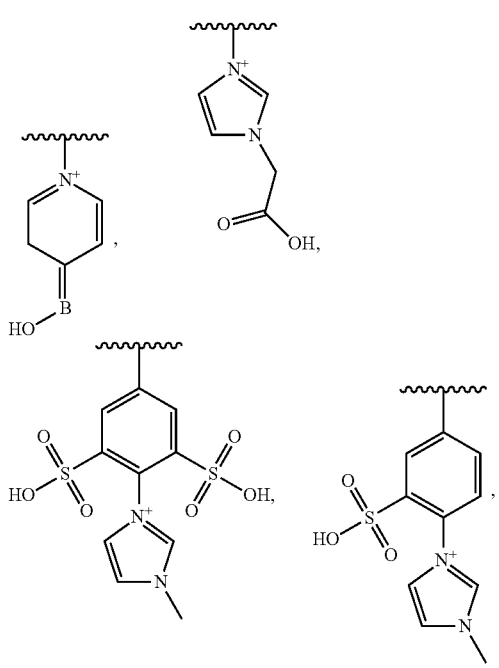

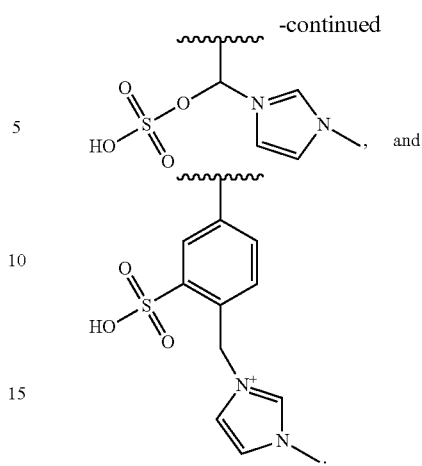

In some embodiments, the acidic and ionic monomers make up a substantial portion of the polymer. In certain embodiments, the acidic and ionic monomers make up at least about 30%, at least about 40%, at least about 50%, at least about 60%, at least about 70%, at least about 80%, at least about 90%, at least about 95%, or at least about 99% of the monomers of the polymer, based on the ratio of the number of acidic and ionic monomers to the total number of monomers present in the polymer.

The ratio of the total number of acidic monomers to the total number of ionic monomers may be varied to tune the strength of the acid catalyst. In some embodiments, the total number of acidic monomers exceeds the total number of ionic monomers in the polymer. In other embodiments, the total number of acidic monomers is at least 2, at least 3, at least 4, at least 5, at least 6, at least 7, at least 8, at least 9 or at least 10 times the total number of ionic monomers in the polymer. In certain embodiments, the ratio of the total number of acidic monomers to the total number of ionic monomers is 1:1, 2:1, 3:1, 4:1, 5:1, 6:1, 7:1, 8:1, 9:1 or 10:1.

In some embodiments, the total number of ionic monomers exceeds the total number of acidic monomers in the polymer. In other embodiments, the total number of ionic monomers is at least 2, at least 3, at least 4, at least 5, at least 6, at least 7, at least 8, at least 9 or at least 10 times the total number of acidic monomers in the polymer. In certain embodiments, the ratio of the total number of ionic monomers to the total number of acidic monomers is 1:1, 2:1, 3:1, 4:1, 5:1, 6:1, 7:1, 8:1, 9:1 or 10:1.

The polymers described herein may be characterized by the chemical functionalization of the polymer. In some embodiments, the polymer may have between 0.1 and 20 mmol, between 0.1 and 15 mmol, between 0.01 and 12 mmol, between 0.01 and 10 mmol, between 1 and 8 mmol, between 2 and 7 mmol, between 3 and 6 mmol, between 1 and 5, or between 3 and 5 mmol of the Bronsted-Lowry acid per gram of the polymer. In particular embodiments where the polymer has at least some monomers with side chains having sulfonic acid as the Bronsted-Lowry acid, the polymer may have between 0.05 to 10 mmol of the sulfonic acid per gram of the polymer. In other embodiments where the polymer has at least some monomers with side chains having phosphonic acid as the Bronsted-Lowry acid, the polymer may have between 0.01 and 12 mmol of the phosphonic acid per gram of the polymer. In other embodiments where the polymer has at least some monomers with side chains having acetic acid as the Bronsted-Lowry acid, the polymer may have between 0.01 and 12 mmol of the acetic acid per gram of the polymer.

In other embodiments where the polymer has at least some monomers with side chains having isophthalic acid as the Bronsted-Lowry acid, the polymer may have between 0.01 and 5 mmol of the isophthalic acid per gram of the polymer. In other embodiments where the polymer has at least some monomers with side chains having boronic acid as the Bronsted-Lowry acid, the polymer may have between 0.01 and 20 mmol of the boronic acid per gram of the polymer. In other embodiments where the polymer has at least some monomers with side chains having perfluorinated acid as the Bronsted-Lowry acid, the polymer may have between 0.01 and 5 mmol of the perfluorinated acid per gram of the polymer.

In some embodiments, the polymer may have between 0.01 and 10 mmol, between 0.01 and 8.0 mmol, between 0.01 and 4 mmol, between 1 and 10 mmol, between 2 and 8 mmol, or between 3 and 6 mmol of the ionic group. In such embodiments, the ionic group includes the cationic group listed, as well as any suitable counterion described herein (e.g., halide, nitrate, sulfate, formate, acetate, or organosulfonate). In particular embodiments where the polymer has at least some monomers with side chains having imidazolium as part of the ionic group, the polymer may have between 0.01 and 8 mmol of the ionic group per gram of the polymer. In other embodiments where the polymer has at least some monomers with side chains having pyridinium as part of the ionic group, the polymer may have between 0.01 and 8 mmol of the ionic group per gram of the polymer. In other embodiments where the polymer has at least some monomers with side chains having triphenyl phosphonium as part of the ionic group, the polymer may have between 0.01 and 4 mmol of the ionic group per gram of the polymer.

b) Hydrophobic Monomers

The polymers described herein may further include monomers having a side chain containing a non-functional group, such as a hydrophobic group. In some embodiments, the hydrophobic group is connected directly to the polymeric backbone. Suitable hydrophobic groups may include, for example, unsubstituted or substituted alkyl, unsubstituted or substituted cycloalkyl, unsubstituted or substituted aryl, or unsubstituted or substituted heteroaryl. In some embodiments, the hydrophobic group is unsubstituted or substituted C5 or C6 aryl. In certain embodiments, the hydrophobic group is unsubstituted or substituted phenyl. In one exemplary embodiment, the hydrophobic group is unsubstituted phenyl. Further, it should be understood that the hydrophobic monomers may either all have the same hydrophobic group, or may have different hydrophobic groups.

c) Arrangement of Monomers

In some embodiments, the acidic monomers, the ionic monomers, the acidic-ionic monomers and the hydrophobic monomers, where present, may be arranged in alternating sequence or in a random order as blocks of monomers. In some embodiments, each block has not more than twenty, fifteen, ten, six, or three monomers.

In some embodiments, the polymer is randomly arranged in an alternating sequence. With reference to the portion of the exemplary polymer depicted in FIG. 3A, the monomers are randomly arranged in an alternating sequence.

In other embodiments, the polymer is randomly arranged as blocks of monomers. With reference to the portion of the exemplary polymer depicted in FIG. 3B, the monomers are arranged in blocks of monomers.

The polymers described herein may also be cross-linked. Such cross-linked polymers may be prepared by introducing cross-linking groups. In some embodiments, cross-linking may occur within a given polymeric chain, with reference to the portion of the exemplary polymers depicted in FIGS. 4A and 4B. In other embodiments, cross-linking may occur between two or more polymeric chains, with reference to the portion of the exemplary polymers in FIGS. 5A, 5B, 5C and 5D.

With reference to FIGS. 4A, 4B and 5A, it should be understood that $R^1$, $R^2$ and $R^3$, respectively, are exemplary cross linking groups. Suitable cross-linking groups that may be used to form a cross-linked polymer with the polymers described herein include, for example, substituted or unsubstituted divinyl alkanes, substituted or unsubstituted divinyl cycloalkanes, substituted or unsubstituted divinyl aryls, substituted or unsubstituted heteroaryls, dihaloalkanes, dihaloalkenes, dihaloalkynes. For example, cross-linking groups may include divinylbenzene, diallylbenzene, dichlorobenzene, divinylmethane, dichloromethane, divinylethane, dichloroethane, divinylpropane, dichloropropane, divinylbutane, dichlorobutane, ethylene glycol, and resorcinol.

d) Polymeric Backbone

The polymeric backbone described herein may include, for example, polyalkylenes, polyalkenyl alcohols, polycarbonate, polyarylenes, polyaryletherketones, and polyamide-imides. In certain embodiments, the polymeric backbone may be selected from polyethylene, polypropylene, polyvinyl alcohol, polystyrene, polyurethane, polyvinyl chloride, polyphenol-aldehyde, polytetrafluoroethylene, polybutylene terephthalate, polycaprolactam, and poly(acrylonitrile butadiene styrene).

Figure 6A:
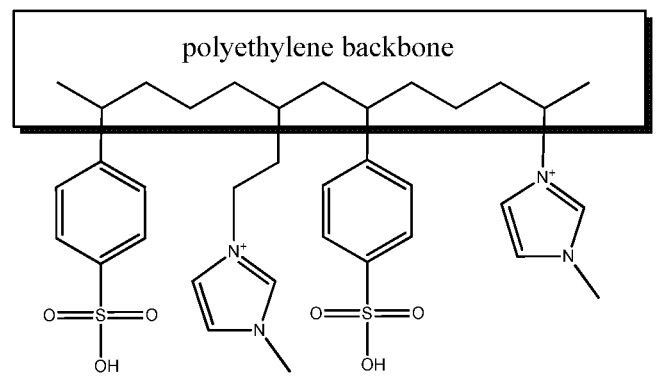
FIG. 6A illustrates a portion of an exemplary polymer with a polyethylene backbone.
Figure 6B:
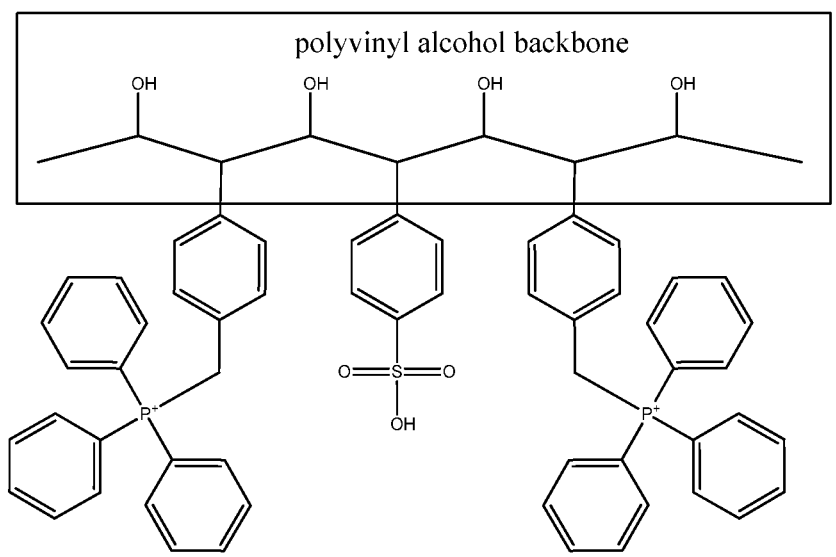
FIG. 6B illustrates a portion of an exemplary polymer with a polyvinylalcohol backbone.

With reference to FIG. 6A, in one exemplary embodiment, the polymeric backbone is polyethylene. With reference to FIG. 6B, in another exemplary embodiment, the polymeric backbone is polyvinyl alcohol.

The polymeric backbone described herein may also include an ionic group integrated as part of the polymeric backbone. Such polymeric backbones may also be called "ionomeric backbones". In certain embodiments, the polymeric backbone may be selected from polyalkyleneammonium, polyalkylenediammonium, polyalkylenepyrrolium, polyalkyleneimidazolium, polyalkylenepyrazolium, polyalkyleneoxazolium, polyalkylenethiazolium, polyalkylenepyridinium, polyalkylenepyrimidinium, polyalkylenepyrazinium, polyalkylenepyradizimium, polyalkylenethiazinium, polyalkylenemorpholinium, polyalkylenepiperidinium, polyalkylenepiperizinium, polyalkylenepyrollizinium, polyalkylenetriphenylphosphonium, polyalkylenetrimethylphosphonium, polyalkylenetriethylphosphonium, polyalkylenetripropylphosphonium, polyalkylenetributylphosphonium, polyalkylenetrichlorophosphonium, polyalkylenetrifluorophosphonium, and polyalkylenediazolium.

Figure 6C:
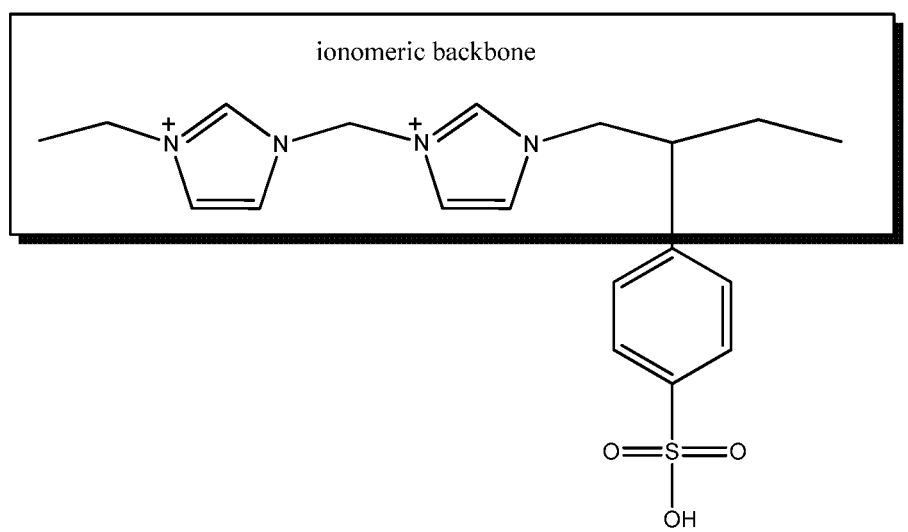
FIG. 6C illustrates a portion of an exemplary polymer with an ionomeric backbone.

With reference to FIG. 6C, in yet another exemplary embodiment, the polymeric backbone is a polyalkyleneimidazolium.

Further, the number of atoms between side chains in the polymeric backbone may vary. In some embodiments, there are between zero and twenty atoms, zero and ten atoms, or zero and six atoms, or zero and three atoms between side chains attached to the polymeric backbone. With reference to FIG. 7A, in one exemplary embodiment, there are three carbon atoms between the side chain with the Bronsted-Lowry acid and the side chain with the cationic group. In another example, with reference to FIG. 7B, there are zero atoms between the side chain with the acidic moiety and the side chain with the ionic moiety.

It should be understood that the polymers may include any of the Bronsted-Lowry acids, cationic groups, counterions, linkers, hydrophobic groups, cross-linking groups, and polymeric backbones described herein, as if each and every combination were listed separately. For example, in one embodiment, the polymer may include benzenesulfonic acid (i.e., a sulfonic acid with a phenyl linker) connected to a polystyrene backbone, and an imidazolium chloride connected directly to the polystyrene backbone. In another embodiment, the polymer may include boronyl-benzyl-pyridinium chloride (i.e., a boronic acid and pyridinium chloride in the same monomer unit with a phenyl linker) connected to a polystyrene backbone. In yet another embodiment, the polymer may include benzenesulfonic acid and an imidazolium sulfate moiety each individually connected to a polyvinyl alcohol backbone.

Exemplary polymers described herein include:
poly[styrene-co-4-vinylbenzenesulfonic acid-co-3-methyl-1-(4-vinylbenzyl)-3H-imidazol-1-ium chloride-co-divinylbenzene];
poly[styrene-co-4-vinylbenzenesulfonic acid-co-3-methyl-1-(4-vinylbenzyl)-3H-imidazol-1-ium bisulfate-co-divinylbenzene];
poly[styrene-co-4-vinylbenzenesulfonic acid-co-3-methyl-1-(4-vinylbenzyl)-3H-imidazol-1-ium acetate-co-divinylbenzene];
poly[styrene-co-4-vinylbenzenesulfonic acid-co-3-methyl-1-(4-vinylbenzyl)-3H-imidazol-1-ium nitrate-co-divinylbenzene];
poly[styrene-co-4-vinylbenzenesulfonic acid-co-3-ethyl-1-(4-vinylbenzyl)-3H-imidazol-1-ium chloride-co-divinylbenzene];
poly[styrene-co-4-vinylbenzenesulfonic acid-co-3-ethyl-1-(4-vinylbenzyl)-3H-imidazol-1-ium bisulfate-co-divinylbenzene];
poly[styrene-co-4-vinylbenzenesulfonic acid-co-3-ethyl-1-(4-vinylbenzyl)-3H-imidazol-1-ium acetate-co-divinylbenzene];
poly[styrene-co-4-vinylbenzenesulfonic acid-co-3-ethyl-1-(4-vinylbenzyl)-3H-imidazol-1-ium nitrate-co-divinylbenzene];
poly[styrene-co-4-vinylbenzenesulfonic acid-co-1-(4-vinylbenzyl)-3H-imidazol-1-ium chloride-co-divinylbenzene];
poly[styrene-co-4-vinylbenzenesulfonic acid-co-1-(4-vinylbenzyl)-3H-imidazol-1-ium iodide-co-divinylbenzene];
poly[styrene-co-4-vinylbenzenesulfonic acid-co-1-(4-vinylbenzyl)-3H-imidazol-1-ium bromide-co-divinylbenzene];
poly[styrene-co-4-vinylbenzenesulfonic acid-co-1-(4-vinylbenzyl)-3H-imidazol-1-ium bisulfate-co-divinylbenzene];
poly[styrene-co-4-vinylbenzenesulfonic acid-co-1-(4-vinylbenzyl)-3H-imidazol-1-ium acetate-co-divinylbenzene];
poly[styrene-co-4-vinylbenzenesulfonic acid-co-3-methyl-1-(4-vinylbenzyl)-3H-benzoimidazol-1-ium chloride-co-divinylbenzene];
poly[styrene-co-4-vinylbenzenesulfonic acid-co-3-methyl-1-(4-vinylbenzyl)-3H-benzoimidazol-1-ium bisulfate-co-divinylbenzene];
poly[styrene-co-4-vinylbenzenesulfonic acid-co-3-methyl-1-(4-vinylbenzyl)-3H-benzoimidazol-1-ium acetate-co-divinylbenzene];
poly[styrene-co-4-vinylbenzenesulfonic acid-co-3-methyl-1-(4-vinylbenzyl)-3H-benzoimidazol-1-ium formate-co-divinylbenzene];
poly[styrene-co-4-vinylbenzenesulfonic acid-co-1-(4-vinylbenzyl)-pyridinium-chloride-co-divinylbenzene];
poly[styrene-co-4-vinylbenzenesulfonic acid-co-1-(4-vinylbenzyl)-pyridinium-bisulfate-co-divinylbenzene];
poly[styrene-co-4-vinylbenzenesulfonic acid-co-1-(4-vinylbenzyl)-pyridinium-acetate-co-divinylbenzene];
poly[styrene-co-4-vinylbenzenesulfonic acid-co-1-(4-vinylbenzyl)-pyridinium-nitrate-co-divinylbenzene];
poly[styrene-co-4-vinylbenzenesulfonic acid-co-1-(4-vinylbenzyl)-pyridinium-chloride-co-3-methyl-1-(4-vinylbenzyl)-3H-imidazol-1-ium bisulfate-co-divinylbenzene];
poly[styrene-co-4-vinylbenzenesulfonic acid-co-1-(4-vinylbenzyl)-pyridinium-bromide-co-3-methyl-1-(4-vinylbenzyl)-3H-imidazol-1-ium bisulfate-co-divinylbenzene];
poly[styrene-co-4-vinylbenzenesulfonic acid-co-1-(4-vinylbenzyl)-pyridinium-iodide-co-3-methyl-1-(4-vinylbenzyl)-3H-imidazol-1-ium bisulfate-co-divinylbenzene];
poly[styrene-co-4-vinylbenzenesulfonic acid-co-1-(4-vinylbenzyl)-pyridinium-bisulfate-co-3-methyl-1-(4-vinylbenzyl)-3H-imidazol-1-ium bisulfate-co-divinylbenzene];
poly[styrene-co-4-vinylbenzenesulfonic acid-co-1-(4-vinylbenzyl)-pyridinium-acetate-co-3-methyl-1-(4-vinylbenzyl)-3H-imidazol-1-ium bisulfate-co-divinylbenzene];
poly[styrene-co-4-vinylbenzenesulfonic acid-co-4-methyl-4-(4-vinylbenzyl)-morpholin-4-ium chloride-co-divinylbenzene];
poly[styrene-co-4-vinylbenzenesulfonic acid-co-4-methyl-4-(4-vinylbenzyl)-morpholin-4-ium bisulfate-co-divinylbenzene];
poly[styrene-co-4-vinylbenzenesulfonic acid-co-4-methyl-4-(4-vinylbenzyl)-morpholin-4-ium acetate-co-divinylbenzene];
poly[styrene-co-4-vinylbenzenesulfonic acid-co-4-methyl-4-(4-vinylbenzyl)-morpholin-4-ium formate-co-divinylbenzene];
poly[styrene-co-4-vinylbenzenesulfonic acid-co-triphenyl-(4-vinylbenzyl)-phosphonium chloride-co-divinylbenzene];
poly[styrene-co-4-vinylbenzenesulfonic acid-co-triphenyl-(4-vinylbenzyl)-phosphonium bisulfate-co-divinylbenzene];
poly[styrene-co-4-vinylbenzenesulfonic acid-co-triphenyl-(4-vinylbenzyl)-phosphonium acetate-co-divinylbenzene];
poly[styrene-co-4-vinylbenzenesulfonic acid-co-1-methyl-1-(4-vinylbenzyl)-piperidin-1-ium chloride-co-divinylbenzene];
poly[styrene-co-4-vinylbenzenesulfonic acid-co-1-methyl-1-(4-vinylbenzyl)-piperidin-1-ium bisulfate-co-divinylbenzene];
poly[styrene-co-4-vinylbenzenesulfonic acid-co-1-methyl-1-(4-vinylbenzyl)-piperidin-1-ium acetate-co-divinylbenzene];
poly[styrene-co-4-vinylbenzenesulfonic acid-co-4-(4-vinylbenzyl)-morpholine-4-oxide-co-divinyl benzene];
poly[styrene-co-4-vinylbenzenesulfonic acid-co-triethyl-(4-vinylbenzyl)-ammonium chloride-co-divinylbenzene];
poly[styrene-co-4-vinylbenzenesulfonic acid-co-triethyl-(4-vinylbenzyl)-ammonium bisulfate-co-divinylbenzene];
poly[styrene-co-4-vinylbenzenesulfonic acid-co-triethyl-(4-vinylbenzyl)-ammonium acetate-co-divinylbenzene];
poly[styrene-co-3-methyl-1-(4-vinylbenzyl)-3H-imidazol-1-ium chloride-co-4-boronyl-1-(4-vinylbenzyl)-pyridinium chloride-co-divinylbenzene];
poly[styrene-co-3-methyl-1-(4-vinylbenzyl)-3H-imidazol-1-ium chloride-co-1-(4-vinylphenyl)methylphosphonic acid-co-divinylbenzene];
poly[styrene-co-3-methyl-1-(4-vinylbenzyl)-3H-imidazol-1-ium bisulfate-co-1-(4-vinylphenyl)methylphosphonic acid-co-divinylbenzene];
poly[styrene-co-3-methyl-1-(4-vinylbenzyl)-3H-imidazol-1-ium acetate-co-1-(4-vinylphenyl)methylphosphonic acid-co-divinylbenzene];

poly[styrene-co-3-methyl-1-(4-vinylbenzyl)-3H-imidazol-1-ium nitrate-co-1-(4-vinylphenyl)methylphosphonic acid-co-divinylbenzene];
poly[styrene-co-4-vinylbenzenesulfonic acid-co-vinylbenzylchloride-co-1-methyl-2-vinyl-pyridinium chloride-co-divinylbenzene];
poly[styrene-co-4-vinylbenzenesulfonic acid-co-vinylbenzylchloride-co-1-methyl-2-vinyl-pyridinium bisulfate-co-divinylbenzene];
poly[styrene-co-4-vinylbenzenesulfonic acid-co-vinylbenzylchloride-co-1-methyl-2-vinyl-pyridinium acetate-co-divinylbenzene];
poly[styrene-co-4-vinylbenzenesulfonic acid-co-4-(4-vinylbenzyl)-morpholine-4-oxide-co-divinyl benzene];
poly[styrene-co-4-vinylphenylphosphonic acid-co-3-methyl-1-(4-vinylbenzyl)-3H-imidazol-1-ium chloride-co-divinylbenzene];
poly[styrene-co-4-vinylphenylphosphonic acid-co-3-methyl-1-(4-vinylbenzyl)-3H-imidazol-1-ium bisulfate-co-divinylbenzene];
poly[styrene-co-4-vinylphenylphosphonic acid-co-3-methyl-1-(4-vinylbenzyl)-3H-imidazol-1-ium acetate-co-divinylbenzene];
poly[styrene-co-3-carboxymethyl-1-(4-vinylbenzyl)-3H-imidazol-1-ium chloride-co-divinylbenzene];
poly[styrene-co-3-carboxymethyl-1-(4-vinylbenzyl)-3H-imidazol-1-ium bisulfate-co-divinylbenzene];
poly[styrene-co-3-carboxymethyl-1-(4-vinylbenzyl)-3H-imidazol-1-ium acetate-co-divinylbenzene];
poly[styrene-co-5-(4-vinylbenzylamino)-isophthalic acid-co-3-methyl-1-(4-vinylbenzyl)-3H-imidazol-1-ium chloride-co-divinylbenzene];
poly[styrene-co-5-(4-vinylbenzylamino)-isophthalic acid-co-3-methyl-1-(4-vinylbenzyl)-3H-imidazol-1-ium bisulfate-co-divinylbenzene];
poly[styrene-co-5-(4-vinylbenzylamino)-isophthalic acid-co-3-methyl-1-(4-vinylbenzyl)-3H-imidazol-1-ium acetate-co-divinylbenzene];
poly[styrene-co-(4-vinylbenzylamino)-acetic acid-co-3-methyl-1-(4-vinylbenzyl)-3H-imidazol-1-ium chloride-co-divinylbenzene];
poly[styrene-co-(4-vinylbenzylamino)-acetic acid-co-3-methyl-1-(4-vinylbenzyl)-3H-imidazol-1-ium bisulfate-co-divinylbenzene];
poly[styrene-co-(4-vinylbenzylamino)-acetic acid-co-3-methyl-1-(4-vinylbenzyl)-3H-imidazol-1-ium acetate-co-divinylbenzene];
poly(styrene-co-4-vinylbenzenesulfonic acid-co-vinylbenzylmethylimidazolium chloride-co-vinylbenzylmethylmorpholinium chloride-co-vinylbenzyltriphenyl phosphonium chloride-co-divinylbenzene);
poly(styrene-co-4-vinylbenzenephosphonic acid-co-vinylbenzylmethylimidazolium chloride-co-vinylbenzylmethylmorpholinium chloride-co-vinylbenzyltriphenyl phosphonium chloride-co-divinylbenzene);
poly(styrene-co-4-vinylbenzenesulfonic acid-co-vinylbenzylmethylimidazolium bisulfate-co-vinylbenzylmethylmorpholinium bisulfate-co-vinylbenzyltriphenyl phosphonium bisulfate-co-divinylbenzene);
poly(styrene-co-4-vinylbenzenephosphonic acid-co-vinylbenzylmethylimidazolium bisulfate-co-vinylbenzylmethylmorpholinium bisulfate-co-vinylbenzyltriphenyl phosphonium bisulfate-co-divinylbenzene);
poly(styrene-co-4-vinylbenzenesulfonic acid-co-vinylbenzylmethylimidazolium acetate-co-vinylbenzylmethylmorpholinium acetate-co-vinylbenzyltriphenyl phosphonium acetate-co-divinylbenzene);
poly(styrene-co-4-vinylbenzenephosphonic acid-co-vinylbenzylmethylimidazolium acetate-co-vinylbenzylmethylmorpholinium acetate-co-vinylbenzyltriphenyl phosphonium acetate-co-divinylbenzene);
poly(styrene-co-4-vinylbenzenesulfonic acid-co-vinylbenzylmethylmorpholinium chloride-co-vinylbenzyltriphenylphosphonium chloride-co-divinylbenzene);
poly(styrene-co-4-vinylbenzenephosphonic acid-co-vinylbenzylmethylmorpholinium chloride-co-vinylbenzyltriphenylphosphonium chloride-co-divinylbenzene);
poly(styrene-co-4-vinylbenzenesulfonic acid-co-vinylbenzylmethylmorpholinium bisulfate-co-vinylbenzyltriphenylphosphonium bisulfate-co-divinylbenzene);
poly(styrene-co-4-vinylbenzenephosphonic acid-co-vinylbenzylmethylmorpholinium bisulfate-co-vinylbenzyltriphenylphosphonium bisulfate-co-divinylbenzene);
poly(styrene-co-4-vinylbenzenesulfonic acid-co-vinylbenzylmethylmorpholinium acetate-co-vinylbenzyltriphenylphosphonium bisulfate-co-divinylbenzene);
poly(styrene-co-4-vinylbenzenephosphonic acid-co-vinylbenzylmethylmorpholinium acetate-co-vinylbenzyltriphenylphosphonium bisulfate-co-divinylbenzene)
poly(styrene-co-4-vinylbenzenesulfonic acid-co-vinylmethylimidazolium chloride-co-divinylbenzene);
poly(styrene-co-4-vinylbenzenesulfonic acid-co-vinylmethylimidazolium bisulfate-co-divinylbenzene);
poly(styrene-co-4-vinylbenzenesulfonic acid-co-vinylmethylimidazolium acetate-co-divinylbenzene);
poly(styrene-co-4-vinylbenzenesulfonic acid-co-vinylmethylimidazolium nitrate-co-divinylbenzene);
poly(styrene-co-4-vinylbenzenephosphonic acid-co-vinylmethylimidazolium chloride-co-divinylbenzene);
poly(styrene-co-4-vinylbenzenephosphonic acid-co-vinylmethylimidazolium bisulfate-co-divinylbenzene);
poly(styrene-co-4-vinylbenzenephosphonic acid-co-vinylmethylimidazolium acetate-co-divinylbenzene);
poly(styrene-co-4-vinylbenzenesulfonic acid-co-vinylbenzyltriphenylphosphonium chloride-co-divinylbenzene);
poly(styrene-co-4-vinylbenzenesulfonic acid-co-vinylbenzyltriphenylphosphonium bisulfate-co-divinylbenzene);
poly(styrene-co-4-vinylbenzenesulfonic acid-co-vinylbenzyltriphenylphosphonium acetate-co-divinylbenzene);
poly(styrene-co-4-vinylbenzenephosphonic acid-co-vinylbenzyltriphenylphosphonium chloride-co-divinylbenzene);
poly(styrene-co-4-vinylbenzenephosphonic acid-co-vinylbenzyltriphenylphosphonium bisulfate-co-divinylbenzene);
poly(styrene-co-4-vinylbenzenephosphonic acid-co-vinylbenzyltriphenylphosphonium acetate-co-divinylbenzene);
poly(styrene-co-4-vinylbenzenesulfonic acid-co-vinylbenzylmethylimidazolium chloride-co-divinylbenzene);
poly(styrene-co-4-vinylbenzenesulfonic acid-co-vinylbenzylmethylimidazolium bisulfate-co-divinylbenzene);
poly(styrene-co-4-vinylbenzenesulfonic acid-co-vinylbenzylmethylimidazolium acetate-co-divinylbenzene);
poly(styrene-co-4-vinylbenzenephosphonic acid-co-vinylbenzylmethylimidazolium chloride-co-divinylbenzene);
poly(styrene-co-4-vinylbenzenephosphonic acid-co-vinylbenzylmethylimidazolium bisulfate-co-divinylbenzene);
poly(styrene-co-4-vinylbenzenephosphonic acid-co-vinylbenzylmethylimidazolium acetate-co-divinylbenzene);
poly(styrene-co-4-vinylbenzenesulfonic acid-co-vinylbenzyltriphenylphosphonium chloride-co-divinylbenzene);
poly(styrene-co-4-vinylbenzenesulfonic acid-co-vinylbenzyltriphenylphosphonium bisulfate-co-divinylbenzene);

poly(styrene-co-4-vinylbenzenesulfonic acid-co-vinylbenzyltriphenylphosphonium acetate-co-divinylbenzene);

poly(styrene-co-4-vinylbenzenephosphonic acid-co-vinylbenzyltriphenylphosphonium chloride-co-divinylbenzene);

poly(styrene-co-4-vinylbenzenephosphonic acid-co-vinylbenzyltriphenylphosphonium bisulfate-co-divinylbenzene);

poly(styrene-co-4-vinylbenzenephosphonic acid-co-vinylbenzyltriphenylphosphonium acetate-co-divinylbenzene);

poly(butyl-vinylimidazolium chloride-co-butylimidazolium bisulfate-co-4-vinylbenzenesulfonic acid);

poly(butyl-vinylimidazolium bisulfate-co-butylimidazolium bisulfate-co-4-vinylbenzenesulfonic acid);

poly(benzyl alcohol-co-4-vinylbenzylalcohol sulfonic acid-co-vinylbenzyltriphenylphosphonium chloride-co-divinylbenzyl alcohol);

poly(benzyl alcohol-co-4-vinylbenzylalcohol sulfonic acid-co-vinylbenzyltriphenylphosphonium bisulfate-co-divinylbenzyl alcohol).

Properties of the Polymeric Acid Catalysts

The polymers described herein have one or more catalytic properties. As used herein, a "catalytic property" of a material is a physical and/or chemical property that increases the rate and/or extent of a reaction involving the material. The catalytic properties may include at least one of the following properties: a) disruption of a hydrogen bond in cellulosic materials; b) intercalation of the polymeric acid catalyst into crystalline domains of cellulosic materials; and c) cleavage of a glycosidic bond in cellulosic materials. In other embodiments, the polymeric acid catalysts that have two or more of the catalytic properties described above, or all three of the catalytic properties described above.

In certain embodiments, the polymeric acid catalysts described herein have the ability to catalyze a chemical reaction by donation of a proton, and may be regenerated during the reaction process.

In some embodiments, the polymers described herein have a greater specificity for cleavage of a glycosidic bond than dehydration of a monosaccharide.

Solid Particles

The polymers described herein may form solid particles. One of skill in the art would recognize the various known techniques and methods to make solid particles. For example, a solid particle may be formed through the procedures of emulsion or dispersion polymerization, which are known to one of skill in the art. In other embodiments, the solid particles may be formed by grinding or breaking the polymer into particles, which are also techniques and methods that are known to one of skill in the art.

In certain embodiments, the solid particles are substantially free of pores. In certain embodiments where the solid particles are substantially free of pores, the solid particles contain no more than 50%, no more than 40%, no more than 30%, no more than 20%, no more than 15%, no more than 10%, no more than 5%, or no more than 1% of pores. Such particles may be advantageous since solvent and soluble species (e.g., sugars) are less likely to permeate into the solid particle.

In other embodiments, the solid particles include a microporous gel resin. In yet other embodiments, the solid particles include a macroporous gel resin.

Other methods known in the art to prepare solid particles include coating the polymers described herein on the surface of a solid core. The solid core can be a non-catalytic support. Suitable materials for the solid core may include an inert material (e.g., aluminum oxide, corn cob, crushed glass, chipped plastic, pumice, silicon carbide, or walnut shell) or a magnetic material. Polymeric coated core particles can be made by techniques and methods that are known to one of skill in the art, for example, by dispersion polymerization to grow a cross-linked polymer shell around the core material, or by spray coating or melting.

The solid particles coated with the polymer described herein have one or more catalytic properties. In some embodiments, at least about 50%, at least 60%, at least 70%, at least 80% or at least 90% of the catalytic activity of the solid particle is present on or near the exterior surface of the solid particle.

This form of the polymeric acid catalysts can be advantageous over other catalysts known in the art due to, for example, ease of handling. The solid nature of the polymeric catalysts can provide for ease of recycling (e.g., by filtering the catalyst), without requiring distillation or extraction methods. For example, the density and size of the particle can be selected such that the catalyst particles can be separated from the materials used in a process for the break-down of biomaterials. Particles can be selected based on sedimentation rate, e.g., relative to materials used or produced in a reaction mixture, particle density, or particle size. Alternatively, solid particles coated with the polymeric acid catalysts that have a magnetically active core can be recovered by electromagnetic methods known to one of skill in the art.

Saccharification Using the Polymeric Acid Catalysts

In one aspect, provided are methods for saccharification of cellulosic materials (e.g., biomass) using the polymeric acid catalysts described herein. Saccharification refers to the hydrolysis of cellulosic materials (e.g., biomass) into one or more sugars, by breaking down the complex carbohydrates of cellulose (and hemicellulose, where present) in the biomass. The one or more sugars may be monosaccharides and/or oligosaccharides. As used herein, "oligosaccharide" refers to a compound containing two or more monosaccharide units linked by glycosidic bonds. In certain embodiments, the one or more sugars are selected from glucose, cellobiose, xylose, xylulose, arabinose, mannose and galactose.

It should be understood that the cellulosic material may be subjected to a one-step or a multi-step hydrolysis process. For example, in some embodiments, the cellulosic material is first contacted with the polymeric acid catalyst, and then the resulting product is contacted with one or more enzymes in a second hydrolysis reaction (e.g., using enzymes).

The one or more sugars obtained from hydrolysis of cellulosic material may be used in a subsequent fermentation process to produce biofuels (e.g., ethanol) and other bio-based chemicals. For example, in some embodiments, the one or more sugars obtained by the methods described herein may undergo subsequent bacterial or yeast fermentation to produce biofuels and other bio-based chemicals.

Further, it should be understood that any method known in the art that includes pretreatment, enzymatic hydrolysis (saccharification), fermentation, or a combination thereof, can be used with the polymeric acid catalysts in the methods described herein. The polymeric acid catalysts may be used before or after pretreatment methods to make the cellulose (and hemicellulose, where present) in the biomass more accessible to hydrolysis.

a) Cellulosic Materials

Cellulosic materials may include any material containing cellulose and/or hemicellulose. In certain embodiments, cellulosic materials may be lignocellulosic materials that contain lignin in addition to cellulose and/or hemicellulose. Cellulose is a polysaccharide that includes a linear chain of beta-(1-4)-D-glucose units. Hemicellulose is also a polysaccharide; however, unlike cellulose, hemicellulose is a branched polymer that typically includes shorter chains of sugar units. Hemicellulose may include a diverse number of sugar monomers including, for example, xylans, xyloglucans, arabinoxylans, and mannans.

Cellulosic materials can typically be found in biomass. In some embodiments, the biomass used with the sold polymeric acid catalysts described herein contains a substantial proportion of cellulosic material, such as 5%, 10%, 15%, 20%, 25%, 50%, 75%, 90% or greater than 90% cellulose. In some embodiments, cellulosic materials may include herbaceous materials, agricultural residues, forestry residues, municipal solid waste, waste paper, and pulp and paper mill residues. In certain embodiments, the cellulosic material is corn stover, corn fiber, or corn cob. In other embodiments, the cellulosic material is bagasse, rice straw, wheat straw, switch grass or miscanthus. In yet other embodiments, cellulosic material may also include chemical cellulose (e.g., Avicel®), industrial cellulose (e.g., paper or paper pulp), bacterial cellulose, or algal cellulose. As described herein and known in the art, the cellulosic materials may be used as obtained from the source, or may be subjected to one or pretreatments. For example, pretreated corn stover ("PCS") is a cellulosic material derived from corn stover by treatment with heat and/or dilute sulfuric acid, and is suitable for use with the polymeric acid catalysts described herein.

Figure 8:
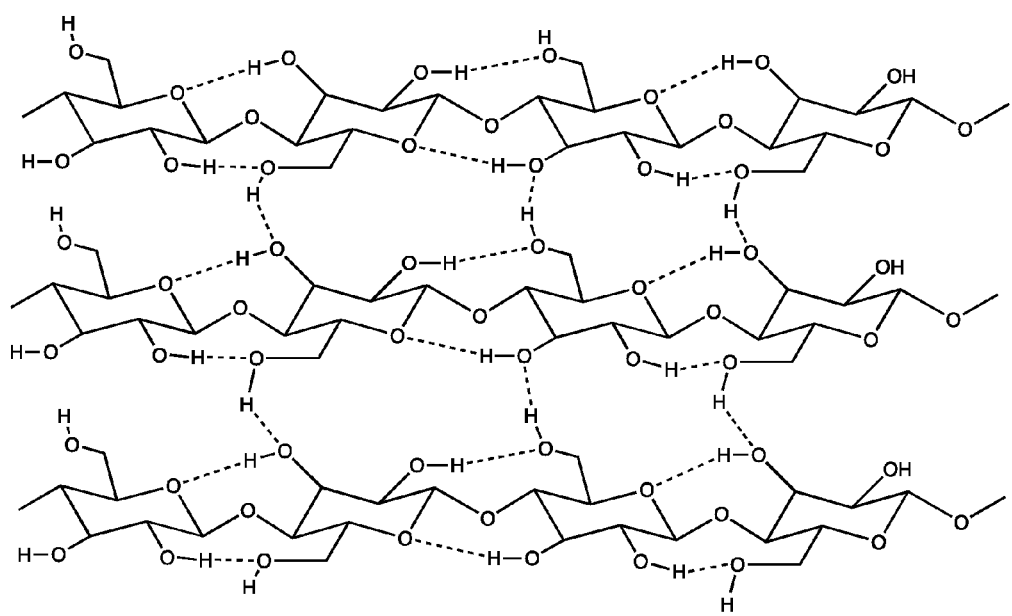
FIG. 8 depicts an exemplary arrangement of the linear beta-(1-4)-glucan chains in crystalline cellulose.

Several different crystalline structures of cellulose are known in the art. For example, with reference to FIG. 8, crystalline cellulose are forms of cellulose where the linear beta-(1-4)-glucan chains may be packed into a three-dimensional superstructure. The aggregated beta-(1-4)-glucan chains are typically held together via inter- and intra-molecular hydrogen bonds. Steric hindrance resulting from the structure of crystalline cellulose may impede access of the reactive species, such as enzymes or chemical catalysts, to the beta-glycosidic bonds in the glucan chains. In contrast, non-crystalline cellulose and amorphous cellulose are forms of cellulose in which individual beta-(1-4)-glucan chains are not appreciably packed into a hydrogen-bonded super-structure, where access of reactive species to the beta-glycosidic bonds in the cellulose is hindered.

One of skill in the art would recognize that natural sources of cellulose may include a mixture of crystalline and non-crystalline domains. The regions of a beta-(1-4)-glucan chain where the sugar units are present in their crystalline form are referred to herein as the "crystalline domains" of the cellulosic material. Generally, the beta-(1-4)-glucan chains present in natural cellulose exhibit a number average degree of polymerization between 1,000 and 4,000 anhydroglucose ("AHG") units (i.e., 1,000-4,000 glucose molecules linked via beta-glycosidic bonds), while the number average degree of polymerization for the crystalline domains is typically between 200 and 300 AHG units. See e.g., R. Rinaldi, R. Palkovits, and F. Schüth, *Angew. Chem. Int. Ed.*, 47, 8047-8050 (2008); Y.-H. P. Zhang and L. R. Lynd, *Biomacromolecules*, 6, 1501-1515 (2005).

Typically, cellulose has multiple crystalline domains that are connected by non-crystalline linkers that may include a small number of anhydroglucose units. One of skill in the art would recognize that traditional methods to digest biomass, such as dilute acidic conditions, may digest the non-crystalline domains of natural cellulose, but not the crystalline domains. Dilute acid treatment does not appreciably disrupt the packing of individual beta-(1-4)-glucan chains into a hydrogen-bonded super-structure, nor does it hydrolyze an appreciable number of glycosidic bonds in the packed beta-(1-4)-glucan chains. Consequently, treatment of natural cellulosic materials with dilute acid reduces the number average degree of polymerization of the input cellulose to approximately 200-300 anhydroglucose units, but does not further reduce the degree of polymerization of the cellulose to below 150-200 anhydroglucose units (which is the typical size of the crystalline domains).

In certain embodiments, the polymeric acid catalysts described herein may be used to digest natural cellulosic materials. The polymeric acid catalysts may be used to digest crystalline cellulose by a chemical transformation in which the average degree of polymerization of cellulose is reduced to a value less than the average degree of polymerization of the crystalline domains. Digestion of crystalline cellulose can be detected by observing reduction of the average degree of polymerization of cellulose. In certain embodiments, the polymeric acid catalysts can reduce the average degree of polymerization of cellulose from at least 300 AGH units to less than 200 AHG units.

It should be understood that the polymeric acid catalysts described herein may be used to digest crystalline cellulose, as well as microcrystalline cellulose. One of skill in the art would recognize that crystalline cellulose typically has a mixture of crystalline and amorphous or non-crystalline domains, whereas microcrystalline cellulose typically refers to a form of cellulose where the amorphous or non-crystalline domains have been removed by chemical processing such that the residual cellulose substantially has only crystalline domains.

b) Pretreatment of Cellulosic Materials

In some embodiments, the polymeric acid catalysts described herein may be used with cellulosic materials that have been pretreated. In other embodiments, the polymeric acid catalysts described herein may be used with cellulosic materials before pretreatment.

Any pretreatment process known in the art can be used to disrupt plant cell wall components of cellulosic material, including, for example, chemical or physical pretreatment processes. See, e.g., Chandra et al., Substrate pretreatment: The key to effective enzymatic hydrolysis of lignocellulosics?, *Adv. Biochem. Engin./Biotechnol.*, 108: 67-93 (2007); Galbe and Zacchi, Pretreatment of lignocellulosic materials for efficient bioethanol production, *Adv. Biochem. Engin./Biotechnol.*, 108: 41-65 (2007); Hendriks and Zeeman, Pretreatments to enhance the digestibility of lignocellulosic biomass, *Bioresource Technol.*, 100: 10-18 (2009); Mosier et al., Features of promising technologies for pretreatment of lignocellulosic biomass, *Bioresource Technol.*, 96: 673-686 (2005); Taherzadeh and Karimi, Pretreatment of lignocellulosic wastes to improve ethanol and biogas production: A review, *Int. J. of Mol. Sci.*, 9: 1621-1651 (2008); Yang and Wyman, Pretreatment: the key to unlocking low-cost cellulosic ethanol, *Biofuels Bioproducts and Biorefining (Biofpr)*, 2: 26-40 (2008). Examples of suitable pretreatment methods are described by Schell et al. (*Appl. Biochem. and Biotechnol.*, 105-108: 69-85 (2003) and Mosier et al. (*Bioresource Technol.*, 96: 673-686 (2005), and in U.S. Patent Application No. 2002/0164730.

In other embodiments, the polymeric acid catalysts described herein may be used with cellulosic materials that have not been pretreated. Further, the cellulosic material can also be subjected to other processes instead of or in addition to pretreatment including, for example, particle size reduction, pre-soaking, wetting, washing, or conditioning.

Moreover, the use of the term "pretreatment" does not imply or require any specific timing of the steps of the methods described herein. For example, the cellulosic material can be pretreated before hydrolysis. Alternatively, the pretreatment can be carried out simultaneously with hydrolysis. In some embodiments, the pretreatment step itself results in some conversion of biomass to sugars (for example, even in the absence of the polymeric acid catalysts described herein).

Several common methods that may be used to pretreat cellulose materials for use with the polymeric acid catalysts are described below.

Steam Pretreatment

Cellulosic material is heated to disrupt the plant cell wall components (e.g., lignin, hemicellulose, cellulose) to make the cellulose and/or hemicellulose more accessible to enzymes. Cellulosic material is typically passed to or through a reaction vessel, where steam is injected to increase the temperature to the required temperature and pressure is retained therein for the desired reaction time.

In certain embodiments where steam pretreatment is employed to pretreat the cellulosic materials, the pretreatment can be performed at a temperature between 140° C. and 230° C., between 160° C. and 200° C., or between 170° C. and 190° C. It should be understood, however, that the optimal temperature range for steam pretreatment may vary depending on the polymeric acid catalyst used.

In certain embodiments, the residence time for the steam pretreatment is 1 to 15 minutes, 3 to 12 minutes, or 4 to 10 minutes. It should be understood, however, that the optimal residence time for steam pretreatment may vary depending on the temperature range and the polymeric acid catalyst used.

In some embodiments, steam pretreatment can be combined with an explosive discharge of the material after the pretreatment, which is known as steam explosion—a rapid flashing to atmospheric pressure and turbulent flow of the material to increase the accessible surface area by fragmentation. See Duff and Murray, *Bioresource Technol.,* 855: 1-33 (1996); Galbe and Zacchi, *Appl. Microbiol. Biotechnol.,* 59: 618-628 (2002); U.S. Patent Application No. 2002/0164730.

During steam pretreatment, acetyl groups in hemicellulose can be cleaved, and the resulting acid can autocatalyze the partial hydrolysis of the hemicellulose to monosaccharides and/or oligosaccharides. One of skill in the art would recognize, however, that lignin (when present in the cellulosic material) is removed to only a limited extent. Thus, in certain embodiments, a catalyst such as sulfuric acid (typically 0.3% to 3% w/w) may be added prior to steam pretreatment, to decrease the time and temperature, increase the recovery, and improve enzymatic hydrolysis. See Ballesteros et al., *Appl. Biochem. Biotechnol.,* 129-132: 496-508 (2006); Varga et al., *Appl. Biochem. Biotechnol.,* 113-116: 509-523 (2004); Sassner et al., *Enzyme Microb. Technol.,* 39: 756-762 (2006).

Chemical Pretreatment

Chemical pretreatment of cellulosic materials can promote the separation and/or release of cellulose, hemicellulose, and/or lignin by chemical processes. Examples of suitable chemical pretreatment processes include, for example, dilute acid pretreatment, lime pretreatment, wet oxidation, ammonia fiber/freeze explosion (AFEX), ammonia percolation (APR), and organosolvent pretreatments.

In one embodiment, dilute or mild acid pretreatment is employed. Cellulosic material may be mixed with a dilute acid and water to form a slurry, heated by steam to the desired temperature, and after a residence time flashed to atmospheric pressure. Suitable acids for this pretreatment method may include, for example, sulfuric acid, acetic acid, citric acid, nitric acid, phosphoric acid, tartaric acid, succinic acid, hydrogen chloride, or mixtures thereof. In one preferred variation, sulfuric acid is used. The dilute acid treatment may be conducted in a pH range of 1-5, a pH range of 1-4, or a pH range of 1-3. The acid concentration may be in the range from 0.01 to 20 wt % acid, 0.05 to 10 wt % acid, 0.1 to 5 wt % acid, or 0.2 to 2.0 wt % acid. The acid is contacted with cellulosic material, and may be held at a temperature in the range of 160-220° C., or 165-195° C., for a period of time ranging from seconds to minutes (e.g., 1 second to 60 minutes). The dilute acid pretreatment can be performed with a number of reactor designs, including for example plug-flow reactors, counter-current reactors, and continuous counter-current shrinking bed reactors. See Duff and Murray (1996), supra; Schell et al., *Bioresource Technol.,* 91: 179-188 (2004); Lee et al., *Adv. Biochem. Eng. Biotechnol.,* 65: 93-115 (1999).

In another embodiment, an alkaline pretreatment may be employed. Examples of suitable alkaline pretreatments include, for example, lime pretreatment, wet oxidation, ammonia percolation (APR), and ammonia fiber/freeze explosion (AFEX). Lime pretreatment may be performed with calcium carbonate, sodium hydroxide, or ammonia at temperatures of 85° C. to 150° C., and at residence times from 1 hour to several days. See Wyman et al., *Bioresource Technol.,* 96: 1959-1966 (2005); Mosier et al., *Bioresource Technol.,* 96: 673-686 (2005).

In yet another embodiment, wet oxidation may be employed. Wet oxidation is a thermal pretreatment that may be performed, for example, at 180° C. to 200° C. for 5-15 minutes with addition of an oxidative agent such as hydrogen peroxide or over-pressure of oxygen. See Schmidt and Thomsen, *Bioresource Technol.,* 64: 139-151 (1998); Palonen et al., *Appl. Biochem. Biotechnol.,* 117: 1-17 (2004); Varga et al., *Biotechnol. Bioeng.,* 88: 567-574 (2004); Martin et al., *J. Chem. Technol. Biotechnol.,* 81: 1669-1677 (2006). Wet oxidation may be performed, for example, at 1-40% dry matter, 2-30% dry matter, or 5-20% dry matter, and the initial pH may also be increased by the addition of alkali (e.g., sodium carbonate). A modification of the wet oxidation pretreatment method, known as wet explosion—a combination of wet oxidation and steam explosion, can handle dry matter up to 30%. In wet explosion, the oxidizing agent may be introduced during pretreatment after a certain residence time, and the pretreatment may end by flashing to atmospheric pressure. See WO 2006/032282.

In yet another embodiment, pretreatment methods using ammonia may be employed. See e.g., WO 2006/110891; WO 2006/11899; WO 2006/11900; and WO 2006/110901. For example, ammonia fiber explosion (AFEX) involves treating cellulosic material with liquid or gaseous ammonia at moderate temperatures (e.g., 90-100° C.) and at high pressure (e.g., 17-20 bar) for a given duration (e.g., 5-10 minutes), where the dry matter content can be in some instances as high as 60%. See Gollapalli et al., *Appl. Biochem. Biotechnol.,* 98: 23-35 (2002); Chundawat et al., *Biotechnol. Bioeng.,* 96: 219-231 (2007); Alizadeh et al., *Appl. Biochem. Biotechnol.,* 121: 1133-1141 (2005); Teymouri et al., *Bioresource Technol.,* 96: 2014-2018 (2005). AFEX pretreatment may depolymerize cellulose, partial hydrolyze hemicellulose, and, in some instances, cleave some lignin-carbohydrate complexes.

Organosolvent Pretreatment

An organosolvent solution may be used to delignify cellulosic material. In one embodiment, an organosolvent pretreatment involves extraction using aqueous ethanol (e.g., 40-60% ethanol) at an elevated temperature (e.g., 160-200° C.) for a period of time (e.g., 30-60 minutes). See Pan et al., *Biotechnol. Bioeng.,* 90: 473-481 (2005); Pan et al., *Biotechnol. Bioeng.,* 94: 851-861 (2006); Kurabi et al., *Appl. Biochem. Biotechnol.,* 121: 219-230 (2005). In one variation, sulfuric acid is added to the organosolvent solution as a catalyst to delignify the cellulosic material. One of skill in the art would recognize that an organosolvent pretreatment can typically breakdown the majority of hemicellulose.

Physical Pretreatment

Physical pretreatment of cellulosic materials can promote the separation and/or release of cellulose, hemicellulose, and/or lignin by physical processes. Examples of suitable physical pretreatment processes may involve irradiation (e.g., microwave irradiation), steaming/steam explosion, hydrothermolysis, and combinations thereof.

Physical pretreatment can involve high pressure and/or high temperature. In one embodiment, the physical pretreatment is steam explosion. In some variations, high pressure refers to a pressure in the range of 300-600 psi, 350-550 psi, or 400-500 psi, or about 450 psi. In some variations, high temperature refers to temperatures in the range of 100-300° C., or 140-235° C.

In another embodiment, the physical pretreatment is a mechanical pretreatment. Suitable examples of mechanical pretreatment may include various types of grinding or milling (e.g., dry milling, wet milling, or vibratory ball milling). In some variations, mechanical pretreatment is performed in a batch-process, such as in a steam gun hydrolyzer system that uses high pressure and high temperature (e.g., a Sunds Hydrolyzer available from Sunds Defibrator AB, Sweden).

Combined Physical and Chemical Pretreatment

In some embodiments, cellulosic material can be pretreated both physically and chemically. For instance, in one variation, the pretreatment step can involve dilute or mild acid treatment and high temperature and/or pressure treatment. It should be understood that the physical and chemical pretreatments can be carried out sequentially or simultaneously. In other variation, the pretreatment may also include a mechanical pretreatment, in addition to chemical pretreatment.

Biological Pretreatment

Biological pretreatment techniques can involve applying lignin-solubilizing microorganisms. See, e.g., Hsu, T.-A., Pretreatment of Biomass, in Handbook on Bioethanol: Production and Utilization, Wyman, C. E., ed., Taylor & Francis, Washington, D.C., 179-212 (1996); Ghosh and Singh, Physicochemical and biological treatments for enzymatic/microbial conversion of cellulosic biomass, *Adv. Appl. Microbiol.*, 39: 295-333 (1993); McMillan, J. D., Pretreating lignocellulosic biomass: a review, in Enzymatic Conversion of Biomass for Fuels Production, Himmel, M. E., Baker, J. O., and Overend, R. P., eds., ACS Symposium Series 566, American Chemical Society, Washington, D.C., chapter 15 (1994); Gong, C. S., Cao, N. J., Du, J., and Tsao, G. T., Ethanol production from renewable resources, in Advances in Biochemical Engineering/Biotechnology, Scheper, T., ed., Springer-Verlag Berlin Heidelberg, Germany, 65: 207-241 (1999); Olsson and Hahn-Hagerdal, Fermentation of lignocellulosic hydrolysates for ethanol production, *Enz. Microb. Tech.*, 18: 312-331 (1996); and Vallander and Eriksson, Production of ethanol from lignocellulosic materials: State of the art, *Adv. Biochem. Eng./Biotechnol.*, 42: 63-95 (1990). In some embodiments, pretreatment may be performed in an aqueous slurry. In other embodiments, the cellulosic material is present during pretreatment in amounts between 10-80 wt %, between 20-70 wt %, or between 30-60 wt %, or about 50 wt %. Furthermore, after pretreatment, the pretreated cellulosic material can be unwashed or washed using any method known in the art (e.g., washed with water) before hydrolysis to produce one or more sugars or use with the polymeric acid catalyst.

c) Saccharification

Saccharification is typically performed in stirred-tank reactors or vessels under controlled pH, temperature, and mixing conditions. One skilled in the art would recognize that suitable processing time, temperature and pH conditions may vary depending on the type and amount of cellulosic material, polymeric acid catalyst, and solvent used. These factors are described in further detail below.

Processing Time, Temperature and pH Conditions

In some embodiments, saccharification can last up to 200 hours. In other embodiments, saccharification can take place from 1 to 96 hours, from 12 to 72 hours, or from 12 to 48 hours.

In some embodiments, saccharification is performed at temperature in the range of about 25° C. to about 150° C. In other embodiments, saccharification is performed at temperature in the range of about 30° C. to about 125° C., or about 80° C. to about 120° C., or about 100° C. to 110° C.

The pH for saccharification is generally affected by the intrinsic properties of the polymeric acid catalyst used. In particular, the acidic moiety of the polymeric acid catalyst may affect the pH of saccharification. For example, the use of sulfuric acid moiety in a polymeric acid catalyst results in saccharification at a pH of about 3. In other embodiments, saccharification is performed at a pH between 0 and 6. The reacted effluent typically has a pH of at least 4, or a pH that is compatible with other processes such as enzymatic treatment. It should be understood, however, that the pH can be modified and controlled by the addition of acids, bases or buffers.

Moreover, the pH may vary within the reactor. For example, high acidity at or near the surface of the catalyst may be observed, whereas regions distal to the catalyst surface may have a substantially neutral pH. Thus, one of skill would recognize that determination of the solution pH should account for such spatial variation.

It should also be understood that, in certain embodiments, the saccharification methods described herein may further include monitoring the pH of the saccharification reaction, and optionally adjusting the pH within the reactor. In some instances, as a low pH in solution may indicate an unstable polymeric acid catalyst, in which the catalyst may be losing at least a portion of its acidic groups to the surrounding environment through leaching. In some embodiments, the pH near the surface of the polymeric acid catalyst is below about 7, below about 6, or below about 5.

Amount of Cellulosic Material Used

The amount of the cellulosic material used in the methods described herein relative to the amount solvent used may affect the rate of reaction and yield. The amount of the cellulosic material used may be characterized by the dry solids content. In certain embodiments, dry solids content refers to the total solids of a slurry as a percentage on a dry weight basis. In some embodiments, the dry solids content of the cellulosic materials is between about 5 wt % to about 95 wt %, between about 10 wt % to about 80 wt %, between about 15 to about 75 wt %, or between about 15 to about 50 wt %.

Amount of Polymeric Acid Catalyst Used

The amount of the polymeric acid catalysts used in the saccharification methods described herein may depend on several factors including, for example, the type of cellulosic material, the concentration of the cellulosic material, the type and number of pretreatment(s) applied to the cellulosic material, and the reaction conditions (e.g., temperature, time, and pH). In one embodiment, the weight ratio of the polymeric acid catalyst to the cellulose material is about 0.1 g/g to about 50 g/g, about 0.1 g/g to about 25 g/g, about 0.1 g/g to about 10 g/g, about 0.1 g/g to about 5 g/g, about 0.1 g/g to about 2 g/g, about 0.1 g/g to about 1 g/g, or about 0.1 to about 1.0 g/g.

Solvent

In certain embodiments, hydrolysis using the polymeric acid catalyst is carried out in an aqueous environment. One suitable aqueous solvent is water, which may be obtained from various sources. Generally, water sources with lower concentrations of ionic species are preferable, as such ionic species may reduce effectiveness of the polymeric acid catalyst. In some embodiments where the aqueous solvent is water, the water has less than 10% of ionic species (e.g., salts of sodium, phosphorous, ammonium, magnesium, or other species found naturally in lignocellulosic biomass).

Moreover, as the cellulosic material is hydrolyzed, water is consumed on a mole-for-mole basis with the sugars produced. In certain embodiments, the saccharification methods described herein may further include monitoring the amount of water present in the saccharification reaction and/or the ratio of water to biomass over a period of time. In other embodiments, the saccharification methods described herein may further include supplying water directly to the reaction, for example, in the form of steam or steam condensate. For example, in some embodiments, the hydration conditions in the reactor is such that the water-to-cellulosic material ratio is 5:1, 4:1, 3:1, 2:1, 1:1, 1:2, 1:3, 1:4, or 1:5, or less than 1:5. It should be understood, however, that the ratio of water to cellulosic material may be adjusted based on the specific polymeric acid catalyst used.

Batch Versus Continuous Processing

Generally, the polymeric acid catalyst and the cellulosic materials are introduced into an interior chamber of a reactor, either concurrently or sequentially. Saccharification can be performed in a batch process or a continuous process. For example, in one embodiment, saccharification is performed in a batch process, where the contents of the reactor are continuously mixed or blended, and all or a substantial amount of the products of the reaction are removed. In one variation, saccharification is performed in a batch process, where the contents of the reactor are initially intermingled or mixed but no further physical mixing is performed. In another variation, saccharification is performed in a batch process, wherein once further mixing of the contents, or periodic mixing of the contents of the reactor, is performed (e.g., at one or more times per hour), all or a substantial amount of the products of the reaction are removed after a certain period of time.

In other embodiments, saccharification is performed in a continuous process, where the contents flow through the reactor with an average continuous flow rate but with no explicit mixing. After introduction of the polymeric acid catalyst and the cellulosic materials into the reactor, the contents of the reactor are continuously or periodically mixed or blended, and after a period of time, less than all of the products of the reaction are removed. In one variation, saccharification is performed in a continuous process, where the mixture containing the catalyst and biomass is not actively mixed. Additionally, mixing of catalyst and biomass may occur as a result of the redistribution of polymeric acid catalysts settling by gravity, or the non-active mixing that occurs as the material flows through a continuous reactor.

Reactors

The reactors used for the saccharification methods described herein may be open or closed reactors suitable for use in containing the chemical reactions described herein. Suitable reactors may include, for example, a fed-batch stirred reactor, a batch stirred reactor, a continuous flow stirred reactor with ultrafiltration, a continuous plug-flow column reactor, an attrition reactor, or a reactor with intensive stirring induced by an electromagnetic field. See e.g., Fernanda de Castilhos Corazza, Flavio Faria de Moraes, Gisella Maria Zanin and Ivo Neitzel, Optimal control in fed-batch reactor for the cellobiose hydrolysis, *Acta Scientiarum. Technology,* 25: 33-38 (2003); Gusakov, A. V., and Sinitsyn, A. P., Kinetics of the enzymatic hydrolysis of cellulose: 1. A mathematical model for a batch reactor process, *Enz. Microb. Technol.,* 7: 346-352 (1985); Ryu, S. K., and Lee, J. M., Bioconversion of waste cellulose by using an attrition bioreactor, Biotechnol. Bioeng. 25: 53-65 (1983); Gusakov, A. V., Sinitsyn, A. P., Davydkin, I. Y., Davydkin, V. Y., Protas, O. V., Enhancement of enzymatic cellulose hydrolysis using a novel type of bioreactor with intensive stirring induced by electromagnetic field, *Appl. Biochem. Biotechnol.,* 56: 141-153 (1996). Other suitable reactor types may include, for example, fluidized bed, upflow blanket, immobilized, and extruder type reactors for hydrolysis and/or fermentation.

In certain embodiments where saccharification is performed as a continuous process, the reactor may include a continuous mixer, such as a screw mixer. The reactors may be generally fabricated from materials that are capable of withstanding the physical and chemical forces exerted during the processes described herein. In some embodiments, such materials used for the reactor are capable of tolerating high concentrations of strong liquid acids; however, in other embodiments, such materials may not be resistant to strong acids.

Further, the reactor typically contains an outlet means for removal of contents (e.g., a sugar-containing solution) from the reactor. Optionally, such outlet means is connected to a device capable of processing the contents removed from the reactor. Alternatively, the removed contents are stored. In some embodiments, the outlet means of the reactor is linked to a continuous incubator into which the reacted contents are introduced. The reactor may be filled with biomass by a top-load feeder containing a hopper capable of holding biomass. Further, the outlet means provides for removal of residual biomass by, e.g., a screw feeder, by gravity, or a low shear screw.

It should also be understood that additional cellulosic material and/or catalyst may be added to the reactor, either at the same time or one after the other.

Rate and Yield of Saccharification

The use of the polymeric acid catalysts described herein can increase the rate and/or yield of saccharification. The ability of the polymeric acid catalyst to hydrolyze the cellulose and hemicellulose components of biomass to soluble sugars can be measured by determining the effective first-order rate constant, $$k_1(\text{species } i) = -\frac{\ln(1-X_i)}{\Delta t},$$

where $\Delta t$ is the duration of the reaction and $X_i$ is the extent of reaction for species i (e.g., glucan, xylan, arabinan). In some embodiments, the polymeric acid catalysts described herein are capable of degrading biomass into one or more sugars at a first-order rate constant of at least 0.001 per hour, at least 0.01 per hour, at least 0.1 per hour, at least 0.2 per hour, at least 0.3 per hour, at least 0.4 per hour, at least 0.5 per hour, or at least 0.6 per hour.

The hydrolysis yield of the cellulose and hemicellulose components of biomass to soluble sugars by the polymeric acid catalyst can be measured by determining the degree of polymerization of the residual biomass. The lower the degree of polymerization of the residual biomass, the greater the hydrolysis yield. In some embodiments, the polymeric acid catalysts described herein are capable of converting biomass into one or more sugars and residual biomass, wherein the residual biomass has a degree of polymerization of less than 300, less than 250, less than 200, less than 150, less than 100, less than 90, less than 80, less than 70, less than 60, or less than 50.

d) Separation and Purification of the Sugars

In some embodiments, the method for degrading cellulosic material using the polymeric acid catalysts described herein further includes recovering the sugars that are produced from the hydrolysis of the cellulosic material. In another embodiment, the method for degrading cellulosic material using the polymeric catalyst described herein further includes recovering the degraded or converted cellulosic material.

The sugars, which are typically soluble, can be separated from the insoluble residual cellulosic material using technology well known in the art such as, for example, centrifugation, filtration, and gravity settling.

Separation of the sugars may be performed in the hydrolysis reactor or in a separator vessel. In an exemplary embodiment, the method for degrading cellulosic material is performed in a system with a hydrolysis reactor and a separator vessel. Reactor effluent containing the monosaccharides and/or oligosaccharides is transferred into a separator vessel and is washed with a solvent (e.g., water), by adding the solvent into the separator vessel and then separating the solvent in a continuous centrifuge. Alternatively, in another exemplary embodiment, a reactor effluent containing residual solids (e.g., residual cellulosic materials) is removed from the reactor vessel and washed, for example, by conveying the solids on a porous base (e.g., a mesh belt) through a solvent (e.g., water) wash stream. Following contact of the stream with the reacted solids, a liquid phase containing the monosaccharides and/or oligosaccharides is generated. Optionally, residual solids may be separated by a cyclone. Suitable types of cyclones used for the separation may include, for example, tangential cyclones, spark and rotary separators, and axial and multi-cyclone units.

In another embodiment, separation of the sugars is performed by batch or continuous differential sedimentation. Reactor effluent is transferred to a separation vessel, optionally combined with water and/or enzymes for further treatment of the effluent. Over a period of time, solid biomaterials (e.g., residual treated biomass), the solid catalyst, and the sugar-containing aqueous material can be separated by differential sedimentation into a plurality of phases (or layers). Generally, the catalyst layer may sediment to the bottom, and depending on the density of the residual biomass, the biomass phase may be on top of, or below, the aqueous phase. When the phase separation is performed in a batch mode, the phases are sequentially removed, either from the top of the vessel or an outlet at the bottom of the vessel. When the phase separation is performed in a continuous mode, the separation vessel contains one or more than one outlet means (e.g., two, three, four, or more than four), generally located at different vertical planes on a lateral wall of the separation vessel, such that one, two, or three phases are removed from the vessel. The removed phases are transferred to subsequent vessels or other storage means. By these processes, one of skill in the art would be able to capture (1) the catalyst layer and the aqueous layer or biomass layer separately, or (2) the catalyst, aqueous, and biomass layers separately, allowing efficient catalyst recycling, retreatment of biomass, and separation of sugars. Moreover, controlling rate of phase removal and other parameters allows for increased efficiency of catalyst recovery. Subsequent to removal of each of the separated phases, the catalyst and/or biomass may be separately washed by the aqueous layer to remove adhered sugar molecules.

The sugars isolated from the vessel may be subjected to further processing steps (e.g., as drying, fermentation) to produce biofuels and other bio-products. In some embodiments, the monosaccharides that are isolated may be at least 1% pure, at least 5% pure, at least 10% pure, at least 20% pure, at least 40% pure, at least 60% pure, at least 80% pure, at least 90% pure, at least 95% pure, at least 99% pure, or greater than 99% pure, as determined by analytical procedures known in the art, such as determination by high performance liquid chromatography (HPLC), functionalization and analysis by gas chromatography, mass spectrometry, spectrophotometric procedures based on chromophore complexation and/or carbohydrate oxidation-reduction chemistry.

The residual biomass isolated from the vessels may be useful as a combustion fuel or as a feed source of non-human animals such as livestock.

Polymeric Acid Catalyst-Containing Compositions

Provided herein are also compositions involving the polymeric acid catalysts that can be used in a variety of methods described herein, including the break-down of cellulosic material.

In one aspect, provided are compositions that include biomass, and the polymeric acid catalysts described herein. In some embodiments, the composition further includes a solvent (e.g., water). In some embodiments, the biomass includes cellulose, hemicellulose, or a combination thereof.

In yet another aspect, provided are compositions that include the polymeric acid catalysts described herein, one or more sugars, and residual biomass. In some embodiments, the one or more sugars are one or more monosaccharides, one or more oligosaccharides, or a mixture thereof. In certain embodiments, the one or more sugars are two or more sugars comprising at least one C4-C6 monosaccharide and at least one oligosaccharide. In one embodiment, the one or more sugars are selected from the group consisting of glucose, galactose, fructose, xylose, and arabinose.

Catalytic Intermediates

When the polymeric acid catalysts are used to degrade cellulosic materials, as described above, a catalytic intermediate is formed. Provided herein are also the catalytic intermediates, where the polymeric acid catalyst coordinates with the cellulosic material. The polymeric acid catalyst may be hydrogen-bonded to the cellulose and/or hemicellulose to break down the cellulosic material to produce monosaccharides and oligosaccharides.

The ionic moiety of the polymeric acid catalysts can help to break down the tertiary structure of the cellulosic materials. In some embodiments, the ionic moiety can disrupt inter- and intra-molecular hydrogen bonding in polysaccharide materials. Disruption of the hydrogen bonding of the tertiary structure can allow the acidic moiety to more readily access the glycosidic bonds of the polysaccharides. In other embodiments, the acidic moiety can disrupt the glycosidic bonds of the polysaccharides. Accordingly, the combination of the two functional moieties on a single polymer can provide for a catalyst that is effective in the break-down of polysaccharides using relatively mild conditions as compared to those methods that employ a more corrosive acid, or methods that employ harsh conditions such as high temperatures or pressure.

Figure 9:
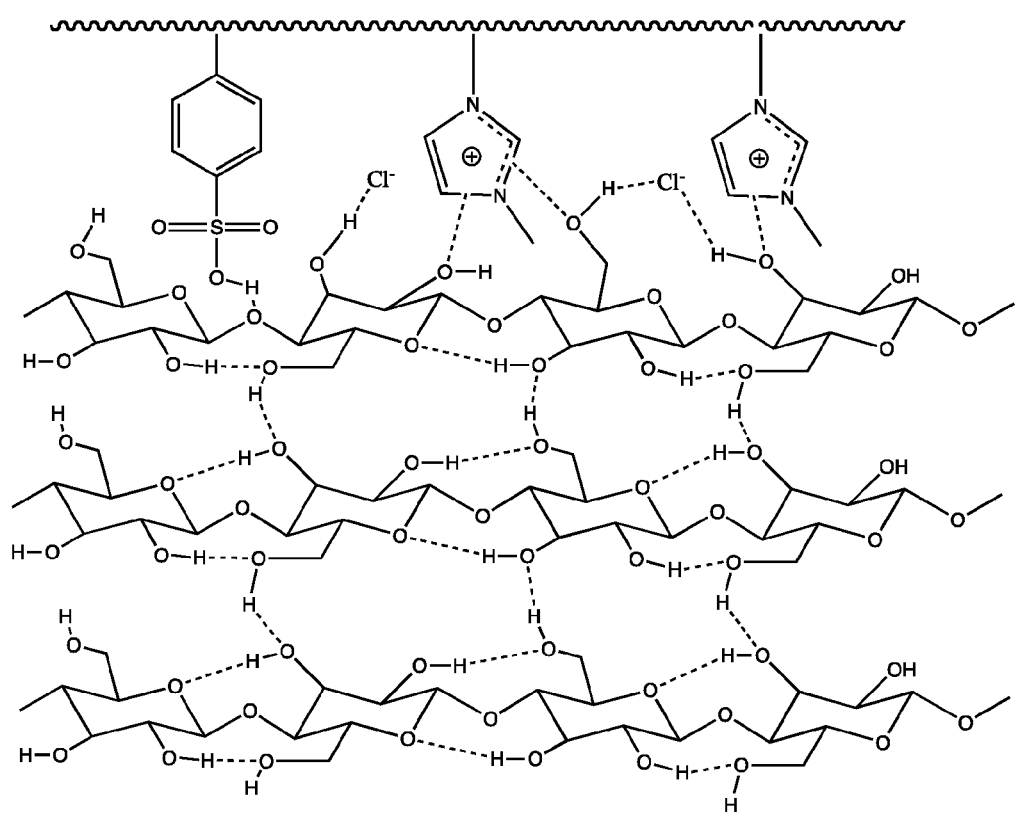
FIG. 9 depicts interactions that may occur during saccharification between an exemplary polymer and the carbohydrate alcohol groups present in biomass containing crystalline cellulose.

In certain embodiments of the saccharification intermediate, the ionic moiety of the polymer is hydrogen-bonded to the carbohydrate alcohol groups present in cellulose, hemicellulose, and other oxygen-containing components of biomass. In certain embodiments of the saccharification intermediate, the acidic moiety of the polymer is hydrogen-bonded to the carbohydrate alcohol groups present in cellulose, hemicellulose, and other oxygen-containing components of lignocellulosic biomass, including the glycosidic linkages between sugar monomers. Without wishing to be bound by any theory, in certain embodiments of the saccharification intermediate, the hydrogen-bonds between an exemplary polymer and the carbohydrate alcohol groups present in the biomass may be as depicted in FIG. 9.

Downstream Products a) Fermentation of Isolated Sugars

The sugars obtained from hydrolysis of cellulosic material may be used in downstream processes to produce biofuels and other bio-based chemicals. In another aspect, the one or more sugars obtained from hydrolysis of cellulosic material using the polymeric acid catalyst described herein may be fermented to produce one or more downstream products (e.g., ethanol and other biofuels, vitamins, lipids, proteins).

In some embodiments, saccharification may be combined with fermentation in a separate or a simultaneous process. The fermentation may use the aqueous sugar phase or, if the sugars are not substantially purified from the reacted biomass, the fermentation may be performed on an impure mixture of sugars and reacted biomass. Such methods include, for example, separate hydrolysis and fermentation (SHF), simultaneous saccharification and fermentation (SSF), simultaneous saccharification and cofermentation (SSCF), hybrid hydrolysis and fermentation (HHF), separate hydrolysis and co-fermentation (SHCF), hybrid hydrolysis and co-fermentation (HHCF), and direct microbial conversion (DMC).

For example, SHF uses separate process steps to first enzymatically hydrolyze cellulosic material to fermentable sugars (e.g., glucose, cellobiose, cellotriose, and pentose sugars), and then ferment the sugars to ethanol.

In SSF, the enzymatic hydrolysis of cellulosic material and the fermentation of sugars to ethanol are combined in one step. See Philippidis, G. P., Cellulose bioconversion technology, in Handbook on Bioethanol: Production and Utilization, Wyman, C. E., ed., Taylor & Francis, Washington, D.C., 179-212 (1996).

SSCF involves the cofermentation of multiple sugars. See Sheehan, J., and Himmel, M., Enzymes, energy and the environment: A strategic perspective on the U.S. Department of Energy's research and development activities for bioethanol, Biotechnol. Prog., 15: 817-827 (1999).

HHF involves a separate hydrolysis step, and in addition a simultaneous saccharification and hydrolysis step, which can be carried out in the same reactor. The steps in an HHF process can be carried out at different temperatures; for example, high temperature enzymatic saccharification followed by SSF at a lower temperature that the fermentation strain can tolerate.

DMC combines all three processes (enzyme production, hydrolysis, and fermentation) in one or more steps where the same organism is used to produce the enzymes for conversion of the cellulosic material to fermentable sugars and to convert the fermentable sugars into a final product. See Lynd, L. R., Weimer, P. J., van Zyl, W. H., and Pretorius, I. S., Microbial cellulose utilization: Fundamentals and biotechnology, Microbiol. Mol. Biol. Reviews, 66: 506-577 (2002).

General Methods of Preparing the Polymeric Acid Catalysts

The polymers described herein can be made using polymerization techniques known in the art, including for example techniques to initiate polymerization of a plurality of monomer units.

In some embodiments, the polymers described herein can be formed by first forming an intermediate polymer functionalized with the ionic group, but is free or substantially free of the acidic group. The intermediate polymer can then be functionalized with the acidic group.

In other embodiments, the polymers described herein can be formed by first forming an intermediate polymer functionalized with the acidic group, but is free or substantially free of the ionic group. The intermediate polymer can then be functionalized with the ionic group.

In yet other embodiments, the polymer described herein can be formed by polymerizing monomers with both acidic and ionic groups.

Provided herein are also such intermediate polymers, including those obtained at different points within a synthetic pathway for producing the fully functionalized polymers described herein. In some embodiments, the polymers described herein can be made, for example, on a scale of at least 100 g, or at least 1 kg, in a batch or continuous process.

EXAMPLES

Preparation of Polymeric Materials

Except where otherwise indicated, commercial reagents were obtained from Sigma-Aldrich, St. Louis, Mo., USA, and were purified prior to use following the guidelines of Penin and Armarego. See Perrin, D. D. & Armarego, W. L. F., Purification of Laboratory Chemicals, 3rd ed.; Pergamon Press, Oxford, 1988. Nitrogen gas for use in chemical reactions was of ultra-pure grade, and was dried by passing it through a drying tube containing phosphorous pentoxide. Unless indicated otherwise, all non-aqueous reagents were transferred under an inert atmosphere via syringe or Schlenk flask. Organic solutions were concentrated under reduced pressure on a Buchi rotary evaporator. Where necessary, chromatographic purification of reactants or products was accomplished using forced-flow chromatography on 60 mesh silica gel according to the method described of Still et al., See Still et al., J. Org. Chem., 43: 2923 (1978). Thin-layer chromatography (TLC) was performed using silica-coated glass plates. Visualization of the developed chromatogram was performed using either Cerium Molybdate (i.e., Hanessian) stain or $KMnO_4$ stain, with gentle heating, as required. Fourier-Transform Infrared (FTIR) spectroscopic analysis of solid samples was performed on a Perkin-Elmer 1600 instrument equipped with a horizontal attenuated total reflectance (ATR) attachment using a Zinc Selenide (ZnSe) crystal.

Example 1

Preparation of poly[styrene-co-vinylbenzylchloride-co-divinylbenzene]

To a 500 mL round bottom flask (RBF) containing a stirred solution of 1.08 g of poly(vinylalcohol) in 250.0 mL of deionized $H_2O$ at 0° C., was gradually added a solution containing 50.04 g (327.9 mmol) of vinylbenzyl chloride (mixture of 3- and 4-isomers), 10.13 g (97.3 mmol) of styrene, 1.08 g (8.306 mmol) of divinylbenzene (DVB, mixture of 3- and 4-isomers) and 1.507 g (9.2 mmol) of azobisisobutyronitrile (AIBN) in 150 mL of a 1:1 (by volume) mixture of benzene/tetrahydrofuran (THF) at 0° C. After 2 hours of stirring at 0° C. to homogenize the mixture, the reaction flask was transferred to an oil bath to increase the reaction temperature to 75° C., and the mixture was stirred vigorously for 28 hours. The resulting polymer beads were vacuum filtered using a fritted-glass funnel to collect the polymer product. The beads were washed repeatedly with 20% (by volume) methanol in water, THF, and MeOH, and dried overnight at 50° C. under reduced pressure to yield 59.84 g of polymer. The polymer beads were separated by size using sieves with mesh sizes 100, 200, and 400.

Example 2

Preparation of poly[styrene-co-3-methyl-1-(4-vinyl-benzyl)-3H-imidazol-1-ium chloride-co-divinylbenzene]

Poly(styrene-co-vinylbenzylchloride-co-divinylbenzene) ($Cl^-$ density=~4.0 mmol/g, 50 g, 200 mmol) was charged into a 500 mL three neck flask (TNF) equipped with a mechanical stirrer, a dry nitrogen line, and purge valve. Dry dimethylformamide (185 ml) was added into the flask (via cannula under $N_2$) and stirred to form a viscous slurry of polymer resin. 1-Methylimidazole (36.5 g, 445 mmol) was then added and stirred at 95° C. for 8 h. After cooling, the reaction mixture was filtered using a fritted glass funnel under vacuum, washed sequentially with de-ionized water and ethanol, and finally air dried.

The chemical functionalization of the polymer material, expressed in millimoles of functional groups per gram of dry polymer resin (mmol/g) was determined by ion exchange titrimetry. For the determination of cation-exchangable acidic protons, a known dry mass of polymer resin was added to a saturated aqueous solution of sodium chloride and titrated against a standard sodium hydroxide solution to the phenolphthalein end point. For the determination of anion-exchangeable ionic chloride content, a known dry mass of polymer resin was added to an aqueous solution of sodium nitrate and neutralized with sodium carbonate. The resulting mixture was titrated against a standardized solution of silver nitrate to the potassium chromate endpoint. For polymeric materials in which the exchangeable anion was not chloride, the polymer was first treated by stirring the material in aqueous hydrochloric acid, followed by washing repeatedly with water until the effluent was neutral (as determined by pH paper). The chemical functionalization of the polymer resin with methylimidazolium chloride groups was determined to be 2.60 mmol/g via gravimetry and 2.61 mmol/g via titrimetry.

Example 3

Preparation of poly[styrene-co-4-vinylbenzene-sulfonic acid-co-3-methyl-1-(4-vinylbenzyl)-3H-imidazol-1-ium bisulfate-co-divinylbenzene]

Poly[styrene-co-3-methyl-1-(4-vinylbenzyl)-3H-imidazol-1-iumchloride-co-divinylbenzene] (63 g) was charged into a 500 mL flask equipped with a magnetic stir bar and condenser. Cold concentrated sulfuric acid (>98% w/w, $H_2SO_4$, 300 mL) was gradually added into the flask under stirring which resulted in formation of dark-red colored slurry of resin. The slurry was stirred at 85° C. for 4 h. After cooling to room temperature, the reaction mixture was filtered using fritted glass funnel under vacuum and then washed repeatedly with de-ionized water until the effluent was neutral, as determined by pH paper. The sulfonated resin beads were finally washed with ethanol and air dried. The chemical functionalization of the polymer resin with sulfonic acid groups was determined to be 1.60 mmol/g, as determined by titrimetry following the procedure of Example 2.

Example 4

Preparation of poly[styrene-co-4-vinylbenzene-sulfonic acid-co-3-methyl-1-(4-vinylbenzyl)-3H-imidazol-1-ium chloride-co-divinylbenzene]

Poly[styrene-co-4-vinylbenzenesulfonic acid-co-3-methyl-1-(4-vinylbenzyl)-3H-imidazol-1-ium bisulfate-co-divinylbenzene] (sample of example 3), contained in fritted glass funnel, was washed repeatedly with 0.1 M HCl solution to ensure complete exchange of $HSO_4^-$ with $Cl^-$. The resin was then washed with de-ionized water until the effluent was neutral, as determined by pH paper. The resin was finally air-dried.

Example 5

Preparation of poly[styrene-co-4-vinylbenzene-sulfonic acid-co-3-methyl-1-(4-vinylbenzyl)-3H-imidazol-1-ium acetate-co-divinylbenzene]

The suspension of poly[styrene-co-4-vinylbenzene-sulfonic acid-co-3-methyl-1-(4-vinylbenzyl)-3H-imidazol-1-ium bisulfate-co-divinylbenzene] (sample of example 3) in 10% aqueous acetic acid solution was stirred for 2 h at 60° C. to ensure complete exchange of $HSO_4^-$ with $AcO^-$. The resin was filtered using fritted glass funnel and then washed multiple times with de-ionized water until the effluent was neutral. The resin was finally air-dried.

Example 6

Preparation of poly[styrene-co-3-ethyl-1-(4-vinyl-benzyl)-3H-imidazol-1-ium chloride-co-divinylbenzene]

Poly(styrene-co-vinylbenzylchloride-co-divinylbenzene) ($Cl^-$ density=~4.0 mmol/g, 10 g, 40 mmol) was charged into a 250 three neck flask (TNF) equipped with a mechanical stirrer, a dry nitrogen line, and purge valve. Dry dimethylformamide (80 ml) was added into the flask (via cannula under $N_2$) and stirred to give viscous resin slurry. 1-Ethylimidazole (4.3 g, 44.8 mmol) was then added to the resin slurry and stirred at 95° C. under 8 h. After cooling, the reaction mixture was filtered using fritted glass funnel under vacuum, washed sequentially with de-ionized water and ethanol, and finally air dried. The chemical functionalization of the polymer resin with ethylimidazolium chloride groups was determined to be 1.80 mmol/g, as determined by titrimetry following the procedure of Example 1.

Example 7

Preparation of poly[styrene-co-4-vinylbenzene-sulfonic acid-co-3-ethyl-1-(4-vinylbenzyl)-3H-imidazol-1-ium bisulfate-co-divinylbenzene]

Poly[styrene-co-3-ethyl-1-(4-vinylbenzyl)-3H-imidazol-1-ium chloride-co-divinylbenzene] (5 g) was charged into a 100 mL flask equipped with a magnetic stir bar and condenser. Cold concentrated sulfuric acid (>98% w/w, $H_2SO_4$, 45 mL) was gradually added into the flask under stirring which resulted in the formation of dark-red colored uniform slurry of resin. The slurry was stirred at 95-100° C. for 6 h. After cooling, the reaction mixture was filtered using fritted glass funnel under vacuum and then washed repeatedly with de-ionized water until the effluent was neutral, as determined by pH paper. The sulfonated beads were finally washed with ethanol and air dried. The chemical functionalization of the polymer with sulfonic acid groups was determined to be 1.97 mmol/g, as determined by titrimetry following the procedure of Example 2.

Example 8

Preparation of poly[styrene-co-4-vinylbenzene-sulfonic acid-co-3-ethyl-1-(4-vinylbenzyl)-3H-imidazol-1-ium chloride-co-divinylbenzene]

Poly[styrene-co-4-vinylbenzenesulfonic acid-co-3-ethyl-1-(4-vinylbenzyl)-3H-imidazol-1-ium bisulfate-co-divinylbenzene] resin beads (sample of example 7) contained in fritted glass funnel was washed multiple times with 0.1 M HCl solution to ensure complete exchange of $HSO_4^-$ with $Cl^-$. The resin was then washed with de-ionized water until the effluent was neutral, as determined by pH paper. The resin was finally washed with ethanol and air dried.

Example 9

Preparation of poly[styrene-co-1-(4-vinylbenzyl)-3H-imidazol-1-ium chloride-co-divinylbenzene]

Poly(styrene-co-vinylbenzylchloride-co-divinylbenzene) ($Cl^-$ density=~4.0 mmol/g, 10 g, 40 mmol) was charged into a 100 mL flask equipped with a magnetic stir bar and condenser. Chloroform (50 ml) was added into the flask and stirred to form slurry of resin. Imidazole (2.8 g, 41.13 mmol) was then added to the resin slurry and stirred at 40° C. for 18 h. After completion of reaction, the reaction mixture was filtered using fritted glass funnel under vacuum, washed sequentially with de-ionized water and ethanol, and finally air dried. The chemical functionalization of the polymer resin with imidazolium chloride groups was determined to be 2.7 mmol/g, as determined by titrimetry following the procedure of Example 2.

Example 10

Preparation of poly[styrene-co-4-vinylbenzene-sulfonic acid-co-1-(4-vinylbenzyl)-3H-imidazol-1-ium bisulfate-co-divinylbenzene]

Poly[styrene-co-1-(4-vinylbenzyl)-3H-imidazol-1-ium chloride-co-divinylbenzene] (5 g) was charged into a 100 mL flask equipped with a magnetic stir bar and condenser. Cold concentrated sulfuric acid (>98% w/w, $H_2SO_4$, 80 mL) was gradually added into the flask and stirred to form dark-red colored slurry of resin. The slurry was stirred at 95° C. for 8 h. After cooling, the reaction mixture was filtered using fritted glass funnel under vacuum and then washed repeatedly with de-ionized water until the effluent was neutral, as determined by pH paper. The sulfonated beads were finally washed with ethanol and air dried. The chemical functionalization of the polymer resin with sulfonic acid groups was determined to be 1.26 mmol/g, as determined by titrimetry following the procedure of Example 2.

Example 11

Preparation of poly[styrene-co-3-methyl-1-(4-vinylbenzyl)-3H-benzoimidazol-1-ium chloride-co-divinylbenzene]

Poly(styrene-co-vinylbenzylchloride-co-divinylbenzene) ($Cl^-$ density=~4.0 mmol/g, 4 g, 16 mmol) was charged into a 100 mL flask equipped with a magnetic stir bar and condenser. Dry dimethylformamide (50 ml) was added into the flask (via cannula under $N_2$) and stirred to form viscous slurry of polymer resin. 1-Methylbenzimidazole (3.2 g, 24.2 mmol) was then added to the resin slurry and the resulting reaction mixture was stirred at 95° C. for 18 h. After cooling, the reaction mixture was filtered using fritted glass funnel under vacuum, washed sequentially with de-ionized water and ethanol, and finally air dried. The chemical functionalization of the polymer with methylbenzimidazolium chloride groups was determined to be 1.63 mmol/g, as determined by titrimetry following the procedure of Example 2.

Example 12

Preparation of poly[styrene-co-4-vinylbenzene-sulfonic acid-co-3-methyl-1-(4-vinylbenzyl)-3H-benzoimidazol-1-ium bisulfate-co-divinylbenzene]

Poly[styrene-co-3-methyl-1-(4-vinylbenzyl)-3H-benzoimidazol-1-ium chloride-co-divinylbenzene] (5.5 g) was charged into a 100 mL flask equipped with a magnetic stir bar and condenser. Cold concentrated sulfuric acid (>98% w/w, $H_2SO_4$, 42 mL) and fuming sulfuric acid (20% free $SO_3$, 8 mL) was gradually added into the flask and stirred to form dark-red colored slurry of resin. The slurry was stirred at 85° C. for 4 h. After cooling, the reaction mixture was filtered using fritted glass funnel under vacuum and then washed repeatedly with de-ionized water until the effluent was neutral, as determined by pH paper. The sulfonated beads were finally washed with ethanol and air dried. The chemical functionalization of the polymer with sulfonic acid groups was determined to be 1.53 mmol/g, as determined by titrimetry following the procedure of Example 2.

Example 13

Preparation of poly[styrene-co-1-(4-vinylbenzyl)-pyridinium chloride-co-divinylbenzene]

Poly(styrene-co-vinylbenzylchloride-co-divinylbenzene) ($Cl^-$ density=~4.0 mmol/g, 5 g, 20 mmol) was charged into a 100 mL flask equipped with a magnetic stir bar and condenser. Dry dimethylformamide (45 ml) was added into the flask (via cannula under $N_2$) while stirring and consequently, the uniform viscous slurry of polymer resin was obtained. Pyridine (3 mL, 37.17 mmol) was then added to the resin slurry and stirred at 85-90° C. for 18 h. After cooling, the reaction mixture was filtered using fritted glass funnel under vacuum, washed sequentially with de-ionized water and ethanol, and finally air dried. The chemical functionalization of the polymer resin with pyridinium chloride groups was determined to be 3.79 mmol/g, as determined by titrimetry following the procedure of Example 2.

Example 14

Preparation of poly[styrene-co-4-vinylbenzene-sulfonic acid-co-1-(4-vinylbenzyl)-pyridinium-bisulfate-co-divinylbenzene]

Poly[styrene-co-1-(4-vinylbenzyl)-pyridinium chloride-co-divinylbenzene] (4 g) resin beads were charged into a 100 mL flask equipped with a magnetic stir bar and condenser. Cold concentrated sulfuric acid (>98% w/w, $H_2SO_4$, 45 mL) was gradually added into the flask under stirring which consequently resulted in the formation of dark-red colored uniform slurry of resin. The slurry was heated at 95-100° C. under continuous stirring for 5 h. After completion of reaction, the cooled reaction mixture was filtered using fritted glass funnel under vacuum and then washed repeatedly with de-ionized water until the effluent was neutral, as determined by pH paper. The resin beads were finally washed with ethanol and air dried. The chemical functionalization of the polymer with sulfonic acid groups was determined to be 0.64 mmol/g, as determined by titrimetry following the procedure of Example 2.

Example 15

Preparation of poly[styrene-co-1-(4-vinylbenzyl)-pyridinium chloride-co-3-methyl-1-(4-vinylbenzyl)-3H-imidazol-1-ium chloride-co-divinylbenzene]

Poly(styrene-co-vinylbenzylchloride-co-divinylbenzene) (Cl$^-$ density=~4.0 mmol/g, 10 g, 40 mmol) was charged into a 100 mL flask equipped with a magnetic stir bar and condenser. Dry dimethylformamide (80 ml) was added into the flask (via cannula under $N_2$) while stirring which resulted in the formation of viscous slurry of polymer resin. Pyridine (1.6 mL, 19.82 mmol) and 1-methylimidazole (1.7 mL, 21.62 mmol) were then added to the resin slurry and the resulting reaction mixture was stirred at 95° C. for 18 h. After completion of reaction, the reaction mixture was cooled, filtered using fritted glass funnel under vacuum, washed sequentially with de-ionized water and ethanol, and finally air dried. The chemical functionalization of the polymer with pyridinium chloride and 1-methylimidazolium chloride groups was determined to be 3.79 mmol/g, as determined by titrimetry following the procedure of Example 2.

Example 16

Preparation of poly[styrene-co-4-vinylbenzenesulfonic acid-co-1-(4-vinylbenzyl)-pyridiniumchloride-co-3-methyl-1-(4-vinylbenzyl)-3H-imidazol-1-ium bisulfate-co-divinylbenzene]

Poly[styrene-co-1-(4-vinylbenzyl)-pyridinium chloride-co-3-methyl-1-(4-vinylbenzyl)-3H-imidazol-1-ium chloride-co-divinylbenzene] (5 g) was charged into a 100 mL flask equipped with a magnetic stir bar and condenser. Cold concentrated sulfuric acid (>98% w/w, $H_2SO_4$, 75 mL) and fuming sulfuric acid (20% free $SO_3$, 2 mL) were then gradually added into the flask under stirring which consequently resulted in the formation of dark-red colored uniform slurry of resin. The slurry was heated at 95-100° C. under continuous stirring for 12 h. After completion of reaction, the cooled reaction mixture was filtered using fritted glass funnel under vacuum and then washed repeatedly with de-ionized water until the effluent was neutral, as determined by pH paper. The sulfonated resin beads were finally washed with ethanol and air dried. The chemical functionalization of the polymer resin with sulfonic acid groups was determined to be 1.16 mmol/g, as determined by titrimetry following the procedure of Example 2.

Example 17

Preparation of poly[styrene-co-4-methyl-4-(4-vinylbenzyl)-morpholin-4-ium chloride-co-divinylbenzene]

Poly(styrene-co-vinylbenzylchloride-co-divinylbenzene) (Cl$^-$ density=~4.0 mmol/g, 10 g, 40 mmol) was charged into a 100 mL flask equipped with a magnetic stir bar and condenser. Dry dimethylformamide (85 ml) was added into the flask (via cannula under $N_2$) while stirring which resulted in the formation of uniform viscous slurry of polymer resin. 1-Methylmorpholine (5.4 mL, 49.12 mmol) were then added to the resin slurry and the resulting reaction mixture was stirred at 95° C. for 18 h. After cooling, the reaction mixture was filtered using fritted glass funnel under vacuum, washed sequentially with de-ionized water and ethanol, and finally air dried. The chemical functionalization of the polymer with methylmorpholinium chloride groups was determined to be 3.33 mmol/g, as determined by titrimetry following the procedure of Example 2.

Example 18

Preparation of poly[styrene-co-4-vinylbenzenesulfonic acid-co-4-methyl-4-(4-vinylbenzyl)-morpholin-4-ium bisulfate-co-divinylbenzene]

Poly[styrene-co-1-4-methyl-4-(4-vinylbenzyl)-morpholin-4-ium chloride-co-divinylbenzene] (8 g) was charged into a 100 mL flask equipped with a magnetic stir bar and condenser. Cold concentrated sulfuric acid (>98% w/w, $H_2SO_4$, 50 mL) was gradually added into the flask under stirring which consequently resulted in the formation of dark-red colored slurry. The slurry was stirred at 90° C. for 8 h. After cooling, the reaction mixture was filtered using fritted glass funnel under vacuum, washed repeatedly with de-ionized water until the effluent was neutral, as determined by pH paper. The sulfonated resin beads were finally washed with ethanol and air dried. The chemical functionalization of the polymer with sulfonic acid groups was determined to be 1.18 mmol/g, as determined by titrimetry following the procedure of Example 2.

Example 19

Preparation of [polystyrene-co-triphenyl-(4-vinylbenzyl)-phosphoniumchloride-co-divinylbenzene]

Poly(styrene-co-vinylbenzylchloride-co-divinylbenzene) (Cl$^-$ density=~4.0 mmol/g, 10 g, 40 mmol) was charged into a 100 mL flask equipped with a magnetic stir bar and condenser. Dry dimethylformamide (80 ml) was added into the flask (via cannula under $N_2$) while stirring and the uniform viscous slurry of polymer resin was obtained. Triphenylphosphine (11.6 g, 44.23 mmol) was then added to the resin slurry and the resulting reaction mixture was stirred at 95° C. for 18 h. After cooling, the reaction mixture was filtered using fritted glass funnel under vacuum, washed sequentially with de-ionized water and ethanol, and finally air dried. The chemical functionalization of the polymer with triphenylphosphonium chloride groups was determined to be 2.07 mmol/g, as determined by titrimetry following the procedure of Example 2.

Example 20

Preparation of poly[styrene-co-4-vinylbenzenesulfonic acid-co-triphenyl-(4-vinylbenzyl)-phosphonium bisulfate-co-divinylbenzene]

Poly(styrene-co-triphenyl-(4-vinylbenzyl)-phosphonium chloride-co-divinylbenzene) (7 g) was charged into a 100 mL flask equipped with a magnetic stir bar and condenser. Cold concentrated sulfuric acid (>98% w/w, $H_2SO_4$, 40 mL) and fuming sulfuric acid (20% free $SO_3$, 15 mL) were gradually added into the flask under stirring which consequently resulted in the formation of dark-red colored slurry. The slurry was stirred at 95° C. for 8 h. After cooling, the reaction mixture was filtered using fritted glass funnel under vacuum, washed repeatedly with de-ionized water until the effluent was neutral, as determined by pH paper. The sulfonated resin beads were finally washed with ethanol and air dried. The chemical functionalization of the polymer with sulfonic acid groups was determined to be 2.12 mmol/g, as determined by titrimetry following the procedure of Example 2.

Example 21

Preparation of poly[styrene-co-1-(4-vinylbenzyl)-piperidine-co-divinylbenzene]

Poly(styrene-co-vinylbenzyl chloride-co-divinylbenzene) ($Cl^-$ density=~4.0 mmol/g, 10 g, 40 mmol) was charged into a 100 mL flask equipped with a magnetic stir bar and condenser. Dry dimethylformamide (50 ml) was added into the flask (via cannula under $N_2$) while stirring which resulted in the formation of uniform viscous slurry of polymer resin. Piperidine (4 g, 46.98 mmol) was then added to the resin slurry and the resulting reaction mixture was stirred at 95° C. for 16 h. After cooling, the reaction mixture was filtered using fritted glass funnel under vacuum, washed sequentially with de-ionized water and ethanol, and finally air dried.

Example 22

Preparation of poly[styrene-co-4-vinylbenzene-sulfonic acid-co-1-(4-vinylbenzyl)-piperidine-co-divinyl benzene]

Poly[styrene-co-1-(4-vinylbenzyl)-piperidine-co-divinyl benzene] (7 g) was charged into a 100 mL flask equipped with a magnetic stir bar and condenser. Cold concentrated sulfuric acid (>98% w/w, $H_2SO_4$, 45 mL) and fuming sulfuric acid (20% free $SO_3$, 12 mL) were gradually added into the flask under stiffing which consequently resulted in the formation of dark-red colored slurry. The slurry was stirred at 95° C. for 8 h. After completion of reaction, the cooled reaction mixture was filtered using fritted glass funnel under vacuum and then washed repeatedly with de-ionized water until the effluent was neutral, as determined by pH paper. The resin beads were finally washed with ethanol and air dried. The chemical functionalization of the polymer with sulfonic acid groups was determined to be 0.72 mmol/g, as determined by titrimetry following the procedure of Example 2.

Example 23

Preparation of poly[styrene-co-4-vinylbenzene-sulfonic acid-co-1-methyl-1-(4-vinylbenzyl)-piperidin-1-ium chloride-co-divinyl benzene]

Poly(styrene-co-4-(1-piperidino)methylstyrene-co-divinylbenzene) (4 g) was charged into a 100 mL flask equipped with a magnetic stir bar and condenser. Dry dimethylformamide (40 ml) was added into the flask (via cannula under $N_2$) under stirring to obtain uniform viscous slurry. Iodomethane (1.2 ml) and potassium iodide (10 mg) were then added into the flask. The reaction mixture was stirred at 95° C. for 24 h. After cooling, the reaction mixture was filtered using fritted glass funnel under vacuum and then washed multiple times with dilute HCl solution to ensure complete exchange of $I^-$ with $Cl^-$. The resin was finally washed with de-ionized water until the effluent was neutral, as determined by pH paper. The resin was finally air-dried.

Example 24

Preparation of poly[styrene-co-4-(4-vinylbenzyl)-morpholine-co-divinyl benzene]

Poly(styrene-co-vinylbenzylchloride-co-divinylbenzene) ($Cl^-$ density=~4.0 mmol/g, 10 g, 40 mmol) was charged into a 100 mL flask equipped with a magnetic stir bar and condenser. Dry dimethylformamide (50 ml) was added into the flask (via cannula under $N_2$) while stirring and consequently, the uniform viscous slurry of polymer resin was obtained. Morpholine (4 g, 45.92 mmol) was then added to the resin slurry and the resulting reaction mixture was heated at 95° C. under continuous stiffing for 16 h. After completion of reaction, the reaction mixture was cooled, filtered using fritted glass funnel under vacuum, washed sequentially with de-ionized water and ethanol, and finally air dried.

Example 25

Preparation of poly[styrene-co-4-vinylbenzene-sulfonic acid-co-4-(4-vinylbenzyl)-morpholine-co-divinyl benzene]

Poly[styrene-co-4-(4-vinylbenzyl)-morpholine-co-divinyl benzene] (10 g) was charged into a 200 mL flask equipped with a magnetic stir bar and condenser. Cold concentrated sulfuric acid (>98% w/w, $H_2SO_4$, 90 mL) and fuming sulfuric acid (20% free $SO_3$, 10 mL) were gradually added into the flask while stirring which consequently resulted in the formation of dark-red colored slurry. The slurry was stirred at 95° C. for 8 h. After cooling, the reaction mixture was filtered using fritted glass funnel under vacuum and then washed repeatedly with de-ionized water until the effluent was neutral, as determined by pH paper. The sulfonated resin beads were finally washed with ethanol and air dried. The chemical functionalization of the polymer with sulfonic acid groups was determined to be 0.34 mmol/g, as determined by titrimetry following the procedure of Example 2.

Example 26

Preparation of poly[styrene-co-4-vinylbenzene-sulfonic acid-co-4-(4-vinylbenzyl)-morpholine-4-oxide-co-divinyl benzene]

Poly[styrene-co-4-vinylbenzenesulfonic acid-co-4-(4-vinylbenzyl)-morpholine-co-divinyl benzene] (6 g) was charged into a 100 mL flask equipped with a magnetic stir bar and condenser. Methanol (60 mL) was then charged into the flask, followed by addition of hydrogen peroxide (30% solution in water, 8.5 mL). The reaction mixture was refluxed under continuous stirring for 8 h. After cooling, the reaction mixture was filtered, washed sequentially with de-ionized water and ethanol, and finally air dried.

Example 27

Preparation of poly[styrene-co-4-vinylbenzyl-triethylammonium chloride-co-divinylbenzene]

Poly(styrene-co-vinylbenzylchloride-co-divinylbenzene) ($Cl^-$ density=~4.0 mmol/g, 10 g, 40 mmol) was charged into a 100 mL flask equipped with a magnetic stir bar and condenser. Dry dimethylformamide (80 ml) was added into the flask (via cannula under $N_2$) while stirring and consequently the uniform viscous slurry of polymer resin was obtained. Triethylamine (5 mL, 49.41 mmol) was then added to the resin slurry and the resulting reaction mixture was stirred at 95° C. for 18 h. After cooling, the reaction mixture was filtered using fritted glass funnel under vacuum, washed sequentially with de-ionized water and ethanol, and finally air dried. The chemical functionalization of the polymer resin with triethylammonium chloride groups was determined to be 2.61 mmol/g, as determined by titrimetry following the procedure of Example 2.

Example 28

Preparation of poly[styrene-co-4-vinylbenzenesulfonic acid-co-triethyl-(4-vinylbenzyl)-ammonium chloride-co-divinylbenzene]

Poly[styrene-co-triethyl-(4-vinylbenzyl)-ammonium chloride-co-divinylbenzene] (6 g) was charged into a 100 mL flask equipped with a magnetic stir bar and condenser. Cold concentrated sulfuric acid (>98% w/w, $H_2SO_4$, 60 mL) was gradually added into the flask under stirring which consequently resulted in the formation of dark-red colored uniform slurry of resin. The slurry was stirred at 95-100° C. for 8 h. After cooling, the reaction mixture was filtered using fritted glass funnel under vacuum and then washed repeatedly with de-ionized water until the effluent was neutral, as determined by pH paper. The sulfonated resin beads were finally washed with ethanol and air dried. The chemical functionalization of the polymer with sulfonic acid groups was determined to be 0.31 mmol/g, as determined by titrimetry following the procedure of Example 2.

Example 29

Preparation of poly[styrene-co-4-vinylbenzenesulfonic acid-co-vinylbenzylchloride-co-divinylbenzene]

Poly(styrene-co-vinylbenzyl chloride-co-divinylbenzene) (6 g) was charged into a 100 mL flask equipped with a magnetic stir bar and condenser. Fuming sulfuric acid (20% free $SO_3$, 25 mL) was gradually added into the flask under stirring which consequently resulted in the formation of dark-red colored slurry. The slurry was stirred at 90° C. for 5 h. After cooling, the reaction mixture was filtered using fritted glass funnel under vacuum, washed sequentially with de-ionized water and ethanol, and finally air dried. The chemical functionalization of the polymer with sulfonic acid groups was determined to be 0.34 mmol/g, as determined by titrimetry following the procedure of Example 2.

Example 30

Preparation of poly[styrene-co-4-vinylbenzenesulfonic acid-co-3-methyl-1-(4-vinylbenzyl)-3H-imidazol-1-ium chloride-co-divinylbenzene]

Poly[styrene-co-4-vinylbenzenesulfonic acid-co-vinylbenzylchloride-co-divinylbenzene] (5 g) was charged into a 100 mL flask equipped with a magnetic stir bar and condenser. Dry dimethylformamide (20 ml) was added into the flask (via cannula under $N_2$) while stirring and the uniform viscous slurry of polymer resin was obtained. 1-Methylimidazole (3 mL, 49.41 mmol) was then added to the resin slurry and the resulting reaction mixture was stirred at 95° C. for 18 h. After cooling, reaction mixture was filtered using fritted glass funnel under vacuum and then washed repeatedly with de-ionized water. The resin beads were finally washed with ethanol and air dried. The chemical functionalization of the polymer with sulfonic acid group and methylimidiazolium chloride groups was determined to be 0.23 mmol/g and 2.63 mmol/g, respectively, as determined by titrimetry following the procedure of Example 2.

Example 31

Preparation of poly[styrene-co-3-methyl-1-(4-vinylbenzyl)-3H-imidazol-1-ium chloride-co-4-boronyl-1-(4-vinylbenzyl)-pyridinium chloride-co-divinylbenzene]

Poly(styrene-co-vinylbenzylchloride-co-divinylbenzene) ($Cl^-$ density=~4.0 mmol/g, 10 g, 40 mmol) was charged into a 100 mL flask equipped with a magnetic stir bar and condenser. Dry dimethylformamide (80 ml) was added into the flask (via cannula under $N_2$) while stirring and consequently the uniform viscous slurry of polymer resin was obtained. 4-Pyridyl-boronic acid (1.8 g, 14.6 mmol) was then added to the resin slurry and the resulting reaction mixture was stirred at 95° C. for 2 days. 1-Methylimidazole (3 mL, 49.41 mmol) was then added to the reaction mixture and stirred further at 95° C. for 1 day. After cooling to room temperature, the reaction mixture was filtered using fritted glass funnel under vacuum, washed sequentially with de-ionized water and ethanol, and finally air dried. The chemical functionalization of the polymer with boronic acid group was determined to be 0.28 mmol/g respectively, as determined by titrimetry following the procedure of Example 2.

Example 32

Preparation of poly[styrene-co-3-methyl-1-(4-vinylbenzyl)-3H-1-imidazol-1-ium chloride-co-1-(4-vinylphenyl)methylphosphonic acid-co-divinylbenzene]

Poly[styrene-co-3-methyl-1-(4-vinylbenzyl)-3H-imidazol-1-ium chloride-co-divinylbenzene] ($Cl^-$ density=~2.73 mmol/g, 5 g) was charged into a 100 mL flask equipped with a magnetic stir bar and condenser. Triethylphosphite (70 ml) was added into the flask and the resulting suspension was stirred at 120° C. for 2 days. The reaction mixture was filtered using fritted glass funnel and the resin beads were washed repeatedly with de-ionized water and ethanol. These resin beads were then suspended in concentrated HCl (80 ml) and refluxed at 115° C. under continuous stirring for 24 h. After cooling to room temperature, the reaction mixture was filtered using fritted glass funnel under vacuum and then washed repeatedly with de-ionized water. The resin beads were finally washed with ethanol and air dried. The chemical functionalization of the polymer with phosphonic acid group and methylimidiazolium chloride groups was determined to be 0.11 mmol/g and 2.81 mmol/g, respectively, as determined by titrimetry following the procedure of Example 2.

Example 33

Preparation of poly[styrene-co-4-vinylbenzenesulfonic acid-co-vinylbenzylchloride-co-vinyl-2-pyridine-co-divinylbenzene]

Poly(styrene-co-vinylbenzylchloride-co-vinyl-2-pyridine-co-divinylbenzene) (5 g) was charged into a 100 mL flask equipped with a magnetic stir bar and condenser. Cold concentrated sulfuric acid (>98% w/w, $H_2SO_4$, 80 mL) was gradually added into the flask under stirring which consequently resulted in the formation of dark-red colored slurry. The slurry was stirred at 95° C. for 8 h. After cooling to room temperature, the reaction mixture was filtered using fritted glass funnel under vacuum, washed repeatedly with de-ionized water until the effluent was neutral, as determined by pH paper. The sulfonated beads were finally washed with ethanol and air dried. The chemical functionalization of the polymer with sulfonic acid groups was determined to be 3.49 mmol/g, as determined by titrimetry following the procedure of Example 2.

Example 34

Preparation of poly[styrene-co-4-vinylbenzene-sulfonic acid-co-vinylbenzylchloride-co-1-methyl-2-vinyl-pyridinium chloride-co-divinylbenzene]

Poly[styrene-co-4-vinylbenzenesulfonic acid-co-vinylbenzylchloride-co-vinyl-2-pyridine-co-divinylbenzene] (4 g) was charged into a 100 mL flask equipped with a magnetic stir bar and condenser. Dry dimethylformamide (80 ml) was added into the flask (via cannula under $N_2$) under stiffing to obtain uniform viscous slurry. Iodomethane (1.9 ml) was then gradually added into the flask followed by addition of potassium iodide (10 mg). The reaction mixture was stirred at 95° C. for 24 h. After cooling to room temperature, the cooled reaction mixture was filtered using fritted glass funnel under vacuum and then washed multiple times with dilute HCl solution to ensure complete exchange of $I^-$ with $Cl^-$. The resin beads were finally washed with de-ionized water until the effluent was neutral, as determined by pH paper and then air-dried.

Example 35

Preparation of poly[styrene-co-4-vinylbenzene-sulfonic acid-co-4-(4-vinylbenzyl)-morpholine-4-oxide-co-divinyl benzene]

Poly[styrene-co-4-(4-vinylbenzyl)-morpholine-4-oxide-co-divinyl benzene] (3 g) was charged into a 100 mL flask equipped with a magnetic stir bar and condenser. Cold concentrated sulfuric acid (>98% w/w, $H_2SO_4$, 45 mL) was gradually added into the flask under stirring which consequently resulted in the formation of dark-red colored slurry. The slurry was stirred at 95° C. for 8 h. After cooling to room temperature, the reaction mixture was filtered using fritted glass funnel under vacuum, washed repeatedly with de-ionized water until the effluent was neutral, as determined by pH paper. The sulfonated beads were finally washed with ethanol and air dried.

Example 36

Preparation of poly[styrene-co-4-vinylphenylphosphonic acid-co-3-methyl-1-(4-vinylbenzyl)-3H-imidazol-1-ium chloride-co-divinylbenzene]

Poly[styrene-co-3-methyl-1-(4-vinylbenzyl)-3H-imidazol-1-iumchloride-co-divinylbenzene] ($Cl^-$ density=~2.73 mmol/g, 5 g) was charged into a 100 mL flask equipped with a magnetic stir bar and condenser. Diethylphosphite (30 ml) and t-butylperoxide (3.2 ml) were added into the flask and the resulting suspension was stirred at 120° C. for 2 days. The reaction mixture was filtered using fritted glass funnel and the resin beads were washed repeatedly with de-ionized water and ethanol. These resin beads were then suspended in concentrated HCl (80 ml) and refluxed at 115° C. under continuous stirring for 2 days. After cooling to room temperature, the reaction mixture was filtered using fritted glass funnel under vacuum and then washed repeatedly with de-ionized water. The resin beads were finally washed with ethanol and air dried. The chemical functionalization of the polymer with aromatic phosphonic acid group was determined to be 0.15 mmol/g, as determined by titrimetry following the procedure of Example 2.

Example 37

Preparation of poly[styrene-co-3-carboxymethyl-1-(4-vinylbenzyl)-3H-imidazol-1-ium chloride-co-divinylbenzene]

Poly(styrene-co-vinylbenzylchloride-co-divinylbenzene) ($Cl^-$ density=~4.0 mmol/g, 10 g, 40 mmol) was charged into a 100 mL flask equipped with a magnetic stir bar and condenser. Dimethylformamide (50 ml) was added into the flask and stirred to form a slurry of resin. Imidazole (2.8 g, 41.13 mmol) was then added to the resin slurry and stirred at 80° C. for 8 h. The reaction mixture was then cooled to 40° C. and t-butoxide (1.8 g) was added into the reaction mixture and stirred for 1 h. Bromoethylacetate (4 ml) was then added to and the reaction mixture was stirred at 80° C. for 6 h. After cooling to room temperature, the reaction mixture was filtered using fritted glass funnel under vacuum and then washed repeatedly with de-ionized water. The washed resin beads were suspended in the ethanolic sodium hydroxide solution and refluxed overnight. The resin beads were filtered and successively washed with deionized water multiple times and ethanol, and finally air dried. The chemical functionalization of the polymer with carboxylic acid group was determined to be 0.09 mmol/g, as determined by titrimetry following the procedure of Example 2.

Example 38

Preparation of poly[styrene-co-5-(4-vinylbenzylamino)-isophthalic acid-co-3-methyl-1-(4-vinylbenzyl)-3H-imidazol-1-ium chloride-co-divinylbenzene]

Poly(styrene-co-vinylbenzylchloride-co-divinylbenzene) ($Cl^-$ density=~4.0 mmol/g, 10 g, 40 mmol) was charged into a 100 mL flask equipped with a magnetic stir bar and condenser. Dry dimethylformamide (80 ml) was added into the flask (via cannula under $N_2$) while stirring and consequently the uniform viscous slurry of polymer resin was obtained. Dimethyl aminoisophthalate (3.0 g, 14.3 mmol) was then added to the resin slurry and the resulting reaction mixture was stirred at 95° C. for 16 h. 1-Methylimidazole (2.3 mL, 28.4 mmol) was then added to the reaction mixture and stirred further at 95° C. for 1 day. After cooling to room temperature, the reaction mixture was filtered using fritted glass funnel under vacuum, washed sequentially with de-ionized water and ethanol. The washed resin beads were suspended in the ethanolic sodium hydroxide solution and refluxed overnight. The resin beads were filtered and successively washed with deionized water multiple times and ethanol, and finally air dried. The chemical functionalization of the polymer with carboxylic acid group was determined to be 0.16 mmol/g, as determined by titrimetry following the procedure of Example 2.

Example 39

Preparation of poly[styrene-co-(4-vinylbenzylamino)-acetic acid-co-3-methyl-1-(4-vinylbenzyl)-3H-imidazol-1-ium chloride-co-divinylbenzene]

Poly(styrene-co-vinylbenzylchloride-co-divinylbenzene) (Cl$^-$ density=~4.0 mmol/g, 10 g, 40 mmol) was charged into a 100 mL flask equipped with a magnetic stir bar and condenser. Dry dimethylformamide (80 ml) was added into the flask (via cannula under $N_2$) while stiffing and consequently the uniform viscous slurry of polymer resin was obtained. Glycine (1.2 g, 15.9 mmol) was then added to the resin slurry and the resulting reaction mixture was stirred at 95° C. for 2 days. 1-Methylimidazole (2.3 mL, 28.4 mmol) was then added to the reaction mixture and stirred further at 95° C. for 12 hours. After cooling to room temperature, the reaction mixture was filtered using fritted glass funnel under vacuum, washed sequentially with de-ionized water and ethanol, and finally air dried. The chemical functionalization of the polymer with carboxylic acid group was determined to be 0.05 mmol/g, as determined by titrimetry following the procedure of Example 2.

Example 40

Preparation of poly[styrene-co-(1-vinyl-1H-imidazole)-co-divinylbenzene]

To a 500 mL round bottom flask (RBF) containing a stirred solution of 1.00 g of poly(vinylalcohol) in 250.0 mL of deionized $H_2O$ at 0° C. is gradually added a solution containing 35 g (371 mmol) of 1-vinylimidazole, 10 g (96 mmol) of styrene, 1 g (7.7 mmol) of divinylbenzene (DVB) and 1.5 g (9.1 mmol) of azobisisobutyronitrile (AIBN) in 150 mL of a 1:1 (by volume) mixture of benzene/tetrahydrofuran (THF) at 0° C. After 2 hours of stirring at 0° C. to homogenize the mixture, the reaction flask is transferred to an oil bath to increase the reaction temperature to 75° C., and the mixture is stirred vigorously for 24 hours. The resulting polymer is vacuum filtered using a fritted-glass funnel, washed repeatedly with 20% (by volume) methanol in water, THF, and MeOH, and then dried overnight at 50° C. under reduced pressure.

Example 41

Preparation of poly(styrene-co-vinylbenzylmethylimidazolium chloride-co-vinylbenzylmethylmorpholinium chloride-co-vinylbenzyltriphenylphosphonium chloride-co-divinylbenzene)

1-methylimidazole (4.61 g, 56.2 mmol), 4-methylmorpholine (5.65 g, 56.2 mmol), and triphenylphosphine (14.65, 55.9 mmol) were charged into a 500 mL flask equipped with a magnetic stir bar and a condenser. Acetone (100 ml) was added into the flask and mixture was stirred at 50° C. for 10 min Poly(styrene-co-vinylbenzylchloride-co-divinylbenzene) (1% DVB, Cl$^-$ density=4.18 mmol/g dry resin, 40.22 g, 168 mmol) was charged into the flask while stirring until a uniform polymer suspension was obtained. The resulting reaction mixture was refluxed for 24 h. After cooling, the reaction mixture was filtered using a fitted glass funnel under vacuum, washed sequentially with acetone and ethyl acetate, and dried overnight at 70° C. The chemical functionalization of the polymer resin with chloride groups was determined to be 2.61 mmol/g dry resin via titrimetry.

Example 42

Preparation of sulfonated poly(styrene-co-vinylbenzylmethylimidazolium bisulfate-co-vinylbenzylmethylmorpholinium bisulfate-co-vinylbenzyltriphenyl phosphonium bisulfate-co-divinylbenzene)

Poly(styrene-co-vinylbenzylmethylimidazolium chloride-co-vinylbenzylmethylmorpholinium chloride-co-vinylbenzyltriphenylphosphonium chloride-co-divinylbenzene) (35.02 g) was charged into a 500 mL flask equipped with a magnetic stir bar and condenser. Fuming sulfuric acid (20% free $SO_3$, 175 mL) was gradually added into the flask and stirred to form dark-red resin suspension. The mixture was stirred overnight at 90° C. After cooling to room temperature, the reaction mixture was filtered using fritted glass funnel under vacuum and then washed repeatedly with de-ionized water until the effluent was neutral, as determined by pH paper. The sulfonated polymer resin was air dried to a final moisture content of 56% g $H_2O$/g wet polymer. The chemical functionalization of the polymer resin with sulfonic acid groups was determined to be 3.65 mmol/g dry resin.

Example 43

Preparation of poly(styrene-co-vinylbenzylmethylimidazolium chloride-co-vinylbenzylmethylmorpholinium chloride-co-vinylbenzyltriphenylphosphonium chloride-co-divinylbenzene)

1-methylimidazole (7.02 g, 85.5 mmol), 4-methylmorpholine (4.37 g, 43.2 mmol) and triphenylphosphine (11.09, 42.3 mmol) were charged into a 500 mL flask equipped with a magnetic stir bar and condenser. Acetone (100 ml) was added into the flask and mixture was stirred at 50° C. for 10 min Poly(styrene-co-vinylbenzylchloride-co-divinylbenzene) (1% DVB, Cl$^-$ density=4.18 mmol/g dry resin, 40.38 g, 169 mmol) was charged into flask while stirring until a uniform suspension was obtained. The resulting reaction mixture was refluxed for 18 h. After cooling, the reaction mixture was filtered using fritted glass funnel under vacuum, washed sequentially with acetone and ethyl acetate, and dried at 70° C. overnight. The chemical functionalization of the polymer resin with chloride groups was determined to be 2.36 mmol/g dry resin dry resin via titrimetry.

Example 44

Preparation of sulfonated poly(styrene-co-vinylbenzylmethylimidazolium bisulfate-co-vinylbenzylmethylmorpholinium bisulfate-co-vinylbenzyltriphenyl phosphonium bisulfate-co-divinylbenzene)

Poly(styrene-co-vinylbenzylmethylimidazolium chloride-co-vinylbenzylmethylmorpholinium chloride-co-vinylbenzyltriphenylphosphonium chloride-co-divinylbenzene) (35.12 g) was charged into a 500 mL flask equipped with a magnetic stir bar and condenser. Fuming sulfuric acid (20% free $SO_3$, 175 mL) was gradually added into the flask and stirred to form dark-red colored slurry of resin. The slurry was stirred at 90° C. overnight. After cooling, the reaction mixture was filtered using fritted glass funnel under vacuum and then washed repeatedly with de-ionized water until the effluent was neutral, as determined by pH paper. The sulfonated beads were finally air dried. The chemical functionalization of the polymer resin with sulfonic acid groups was determined to be 4.38 mmol/g dry resin.

Example 45

Preparation of poly(styrene-co-vinylbenzylmethylmorpholinium chloride-co-vinylbenzyltriphenylphosphonium chloride-co-divinylbenzene)

4-methylmorpholine (8.65 g, 85.5 mmol) and triphenylphosphine (22.41, 85.3 mmol) were charged into a 500 mL flask equipped with a magnetic stir bar and condenser. Acetone (100 ml) was added into the flask and mixture was stirred at 50° C. for 10 min. Poly(styrene-co-vinylbenzylchloride-co-divinylbenzene) (1% DVB, Cl⁻ density=4.18 mmol/g dry resin, 40.12 g, 167 mmol) was charged into flask while stirring until a uniform suspension was obtained. The resulting reaction mixture was refluxed for 24 h. After cooling, the reaction mixture was filtered using fritted glass funnel under vacuum, washed sequentially with acetone and ethyl acetate, and dried at 70° C. overnight. The chemical functionalization of the polymer resin with chloride groups was determined to be 2.22 mmol/g dry resin via titrimetry.

Example 46

Preparation of sulfonated poly(styrene-co-vinylbenzylmethylmorpholinium bisulfate-co-vinylbenzyltriphenylphosphonium bisulfate-co-divinylbenzene)

Poly(styrene-co-vinylbenzylmethylimidazolium chloride-co-vinylbenzylmethylmorpholinium chloride-co-vinylbenzyltriphenylphosphonium chloride-co-divinylbenzene) (35.08 g) was charged into a 500 mL flask equipped with a magnetic stir bar and condenser. Fuming sulfuric acid (20% free SO₃, 175 mL) was gradually added into the flask and stirred to form dark-red colored slurry of resin. The slurry was stirred at 90° C. overnight. After cooling, the reaction mixture was filtered using fritted glass funnel under vacuum and then washed repeatedly with de-ionized water until the effluent was neutral, as determined by pH paper. The sulfonated beads were dried under air to a final moisture content of 52% g H₂O/g wet resin. The chemical functionalization of the polymer resin with sulfonic acid groups was determined to be 4.24 mmol/g dry resin.

Example 47

Preparation of phenol-formaldehyde resin

Phenol (12.87 g, 136.8 mmol) was dispensed into a 100 mL round bottom flask (RBF) equipped with a stir bar and condenser. De-ionized water (10 g) was charged into the flask. 37% Formalin solution (9.24 g, 110 mmol) and oxalic acid (75 mg) were added. The resulting reaction mixture was refluxed for 30 min. Additional oxalic acid (75 mg) was then added and refluxing was continued for another 1 hour. Chunk of solid resin was formed, which was ground to a coarse powder using a mortar and pestle. The resin was repeatedly washed with water and methanol and then dried at 70° C. overnight.

Example 48

Preparation of chloromethylated phenol-formaldehyde resin

Phenol-formaldehyde resin (5.23 g, 44 mmol) was dispensed into a 100 mL three neck round bottom flask (RBF) equipped with a stir bar, condenser and nitrogen line. Anhydrous dichloroethane (DCE, 20 ml) was then charged into the flask. To ice-cooled suspension of resin in DCE, zinc chloride (6.83 g, 50 mmol) was added. Chloromethyl methyl ether (4.0 ml, 51 mmol) was then added dropwise into the reaction. The mixture was warmed to room temperature and stirred at 50° C. for 6 h. The product resin was recovered by vacuum filtration and washed sequentially with water, acetone and dichloromethane. The washed resin was dried at 40° C. overnight.

Example 49

Preparation of triphenylphosphine functionalized phenol-formaldehyde resin

Triphenylphosphine (10.12, 38.61 mmol) were charged into a 100 mL flask equipped with a magnetic stir bar and condenser. Acetone (30 ml) was added into the flask and mixture was stirred at 50° C. for 10 min. Chloromethylated phenol-formaldehyde resin (4.61 g, 38.03 mmol) was charged into flask while stirring. The resulting reaction mixture was refluxed for 24 h. After cooling, the reaction mixture was filtered using fritted glass funnel under vacuum, washed sequentially with acetone and ethyl acetate, and dried at 70° C. overnight.

Example 50

Preparation of sulfonated triphenylphosphine-functionalized phenol-formaldehyde resin Triphenylphosphine-functionalized phenol-formaldehyde resin (5.12 g, 13.4 mmol) was charged into a 100 mL flask equipped with a magnetic stir bar and condenser. Fuming sulfuric acid (20% free SO₃, 25 mL) was gradually added into the flask and stirred to form dark-red colored slurry of resin. The slurry was stirred at 90° C. overnight. After cooling, the reaction mixture was filtered using fritted glass funnel under vacuum and then washed repeatedly with de-ionized water until the effluent was neutral, as determined by pH paper. The sulfonated resin was dried under air to a final moisture content of 49% g H₂O/g wet resin. The chemical functionalization of the polymer resin with sulfonic acid groups was determined to be 3.85 mmol/g dry resin.

Example 51

Preparation of poly(styrene-co-vinylimidazole-co-divinylbenzene)

De-ionized water (75 mL) was charged into flask into a 500 mL three neck round bottom flask equipped with a mechanical stirrer, condenser and N₂ line. Sodium chloride (1.18 g) and carboxymethylcellulose (0.61 g) were charged into the flask and stirred for 5 min. The solution of vinylimidazole (3.9 mL, 42.62 mmol), styrene (4.9 mL, 42.33 mmol) and divinylbenzene (0.9 mL, 4.0 mmol) in iso-octanol (25 mL) was charged into flask. The resulting emulsion was stirred at 500 rpm at room temperature for 1 h. Benzoyl peroxide (75%, 1.205 g) was added, and temperature was raised to 80° C. The reaction mixture was heated for 8 h at 80° C. with stirring rate of 500 rpm. The polymer product was recovered by vacuum filtration and washed with water and acetone multiple times. The isolated polymer was purified by soxhlet extraction with water and acetone. The resin was dried at 40° C. overnight.

Example 52

Preparation of poly(styrene-co-vinylmethylimidazolium iodide-co-divinylbenzene)

Poly(styrene-co-vinylimidazole-co-divinylbenzene) (3.49 g, 39 mmol) was dispensed into a 100 mL three neck round bottom flask (RBF) equipped with a stir bar, condenser and nitrogen line. Anhydrous tetrahydrofuran (20 ml) was then charged into the flask. To ice-cooled suspension of resin in tetrahydrofuran, potassium t-butoxide (5.62 g, 50 mmol) was added and stirred for 30 min. Iodomethane (3.2 ml, 51 mmol) was then added dropwise into the reaction. The mixture was warmed to room temperature and stirred at 50° C. for 6 h. The product resin was recovered by vacuum filtration and washed sequentially with water, acetone and dichloromethane. The washed resin was dried at 40° C. overnight.

Example 53

Preparation of sulfonated poly(styrene-co-vinylmethylimidazolium bisulfate-co-divinylbenzene)

Poly(styrene-co-vinylmethylimidazolium iodide-co-divinylbenzene) (3.89 g, 27.8 mmol) was charged into a 100 mL flask equipped with a magnetic stir bar and condenser. Fuming sulfuric acid (20% free $SO_3$, 20 mL) was gradually added into the flask and stirred to form dark-red colored slurry. The slurry was stirred at 90° C. overnight. After cooling, the reaction mixture was filtered using fritted glass funnel under vacuum and then washed repeatedly with de-ionized water until the effluent was neutral, as determined by pH paper. The sulfonated polymer was dried under air to a final moisture content of 51% g $H_2O$/g wet resin.

Example 54

Preparation of poly(styrene-co-vinylbenzyltriphenylphosphonium chloride-co-divinylbenzene)

To a 250 mL flask equipped with a magnetic stir bar and condenser was charged triphenylphosphine (38.44 g, 145.1 mmol). Acetone (50 mL) was added into the flask and mixture was stirred at 50° C. for 10 min. Poly(styrene-co-vinylbenzylchloride-co-divinylbenzene) (8% DVB, Cl⁻ density=4.0 mmol/g dry resin, 30.12 g, 115.6 mmol) was charged into flask while stirring until a uniform suspension was obtained. The resulting reaction mixture was refluxed for 24 h. After cooling, the reaction mixture was filtered using fritted glass funnel under vacuum, washed sequentially with acetone and ethyl acetate, and dried at 70° C. overnight. The chemical functionalization of the polymer resin with triphenylphosphonium chloride groups was determined to be 1.94 mmol/g dry resin via titrimetry.

Example 55

Preparation of sulfonated poly(styrene-co-vinylbenzyltriphenyl phosphonium bisulfate-co-divinylbenzene)

Poly(styrene-co-vinylbenzyltriphenylphosphonium chloride-co-divinylbenzene) (40.12 g) was charged into a 500 mL flask equipped with a magnetic stir bar and condenser. Fuming sulfuric acid (20% free $SO_3$, 160 mL) was gradually added into the flask and stirred to form dark-red colored slurry of resin. The slurry was stirred at 90° C. overnight. After cooling, the reaction mixture was filtered using fritted glass funnel under vacuum and then washed repeatedly with de-ionized water until the effluent was neutral, as determined by pH paper. The sulfonated beads were dried under air to a final moisture content of 54% g $H_2O$/g wet resin. The chemical functionalization of the polymer resin with sulfonic acid groups was determined to be 4.39 mmol/g dry resin.

Example 56

Preparation of poly(styrene-co-vinylbenzyltriphenylphosphonium chloride-co-divinylbenzene To a 250 mL flask equipped with a magnetic stir bar and condenser was charged triphenylphosphine (50.22 g, 189.6 mmol). Acetone (50 mL) was added into the flask and mixture was stirred at 50° C. for 10 min. Poly(styrene-co-vinylbenzylchloride-co-divinylbenzene) (4% DVB, Cl⁻ density=5.2 mmol/g dry resin, 30.06 g, 152.08 mmol) was charged into flask while stirring until a uniform suspension was obtained. The resulting reaction mixture was refluxed for 24 h. After cooling, the reaction mixture was filtered using fritted glass funnel under vacuum, washed sequentially with acetone and ethyl acetate, and dried at 70° C. overnight. The chemical functionalization of the polymer resin with triphenylphosphonium chloride groups was determined to be 2.00 mmol/g dry resin via titrimetry.

Example 57

Preparation of sulfonated poly(styrene-co-vinylbenzyltriphenyl phosphonium bisulfate-co-divinylbenzene)

Poly(styrene-co-vinylbenzyltriphenylphosphonium chloride-co-divinylbenzene) (40.04 g,) was charged into a 500 mL flask equipped with a magnetic stir bar and condenser. Fuming sulfuric acid (20% free $SO_3$, 160 mL) was gradually added into the flask and stirred to form dark-red colored slurry of resin. The slurry was stirred at 90° C. overnight. After cooling, the reaction mixture was filtered using fritted glass funnel under vacuum and then washed repeatedly with de-ionized water until the effluent was neutral, as determined by pH paper. The sulfonated beads were dried under air to a final moisture content of 47% g $H_2O$/g wet resin. The chemical functionalization of the polymer resin with sulfonic acid groups was determined to be 4.36 mmol/g dry resin.

Example 58

Preparation of poly(styrene-co-vinylbenzylmethylimidazolium chloride-co-divinylbenzene)

To a 250 mL flask equipped with a magnetic stir bar and condenser was charged 1-methylimidazole (18 mL, 223.5 mmol). Acetone (75 mL) was added into the flask and mixture was stirred at 50° C. for 10 min. Poly(styrene-co-vinylbenzylchloride-co-divinylbenzene) (8% DVB, Cl⁻ density=4.0 mmol/g dry resin, 40.06, 153.7 mmol) was charged into flask while stirring until a uniform suspension was obtained. The resulting reaction mixture was refluxed for 24 h. After cooling, the reaction mixture was filtered using fritted glass funnel under vacuum, washed sequentially with acetone and ethyl acetate, and dried at 70° C. overnight. The chemical functionalization of the polymer resin with methylimidazolium chloride groups was determined to be 3.54 mmol/g dry resin via titrimetry.

Example 59

Preparation of sulfonated poly(styrene-co-vinylbenzylmethylimidazolium bisulfate-co-divinylbenzene)

Poly(styrene-co-vinylbenzylmethylimidazolium chloride-co-divinylbenzene) (30.08 g) was charged into a 500 mL flask equipped with a magnetic stir bar and condenser. Fuming sulfuric acid (20% free $SO_3$, 120 mL) was gradually added into the flask and stirred to form dark-red colored slurry of resin. The slurry was stirred at 90° C. overnight. After cooling, the reaction mixture was filtered using fritted glass funnel under vacuum and then washed repeatedly with de-ionized water until the effluent was neutral, as determined by pH paper. The sulfonated beads were dried under air to a final moisture content of 50% g $H_2O$/g wet resin. The chemical functionalization of the polymer resin with sulfonic acid groups was determined to be 2.87 mmol/g dry resin.

Example 60

Preparation of poly(styrene-co-vinylbenzylmethylimidazolium chloride-co-divinylbenzene)

To a 250 mL flask equipped with a magnetic stir bar and condenser was charged 1-methylimidazole (20 mL, 248.4 mmol). Acetone (75 mL) was added into the flask and mixture was stirred at 50° C. for 10 min. Poly(styrene-co-vinylbenzylchloride-co-divinylbenzene) (4% DVB, Cl⁻ density=5.2 mmol/g dry resin, 40.08, 203.8 mmol) was charged into flask while stirring until a uniform suspension was obtained. The resulting reaction mixture was refluxed for 24 h. After cooling, the reaction mixture was filtered using fritted glass funnel under vacuum, washed sequentially with acetone and ethyl acetate, and dried at 70° C. overnight. The chemical functionalization of the polymer resin with methylimidazolium chloride groups was determined to be 3.39 mmol/g dry resin via titrimetry.

Example 61

Preparation of sulfonated poly(styrene-co-vinylbenzylmethylimidazolium bisulfate-co-divinylbenzene)

Poly(styrene-co-vinylbenzylmethylimidazolium chloride-co-divinylbenzene) (30.14 g) was charged into a 500 mL flask equipped with a magnetic stir bar and condenser. Fuming sulfuric acid (20% free $SO_3$, 120 mL) was gradually added into the flask and stirred to form dark-red colored slurry of resin. The slurry was stirred at 90° C. overnight. After cooling, the reaction mixture was filtered using fritted glass funnel under vacuum and then washed repeatedly with de-ionized water until the effluent was neutral, as determined by pH paper. The sulfonated beads were dried under air to a final moisture content of 55% g $H_2O$/g wet resin. The chemical functionalization of the polymer resin with sulfonic acid groups was determined to be 2.78 mmol/g dry resin.

Example 62

Preparation of poly(styrene-co-vinylbenzyltriphenylphosphonium chloride-co-divinylbenzene)

To a 250 mL flask equipped with a magnetic stir bar and condenser was charged triphenylphosphine (44.32 g, 163.9 mmol). Acetone (50 mL) was added into the flask and mixture was stirred at 50° C. for 10 min. Poly(styrene-co-vinylbenzylchloride-co-divinylbenzene) (13% DVB macroporous resin, Cl⁻ density=4.14 mmol/g dry resin, 30.12 g, 115.6 mmol) was charged into flask while stirring until a uniform suspension was obtained. The resulting reaction mixture was refluxed for 24 h. After cooling, the reaction mixture was filtered using fritted glass funnel under vacuum, washed sequentially with acetone and ethyl acetate, and dried at 70° C. overnight.

Example 63

Preparation of sulfonated poly(styrene-co-vinylbenzyltriphenyl phosphonium bisulfate-co-divinylbenzene)

Poly(styrene-co-vinylbenzyltriphenylphosphonium chloride-co-divinylbenzene) (30.22 g) was charged into a 500 mL flask equipped with a magnetic stir bar and condenser. Fuming sulfuric acid (20% free $SO_3$, 90 mL) was gradually added into the flask and stirred to form dark-red colored slurry of resin. The slurry was stirred at 90° C. for 1 hour. After cooling, the reaction mixture was filtered using fritted glass funnel under vacuum and then washed repeatedly with de-ionized water until the effluent was neutral, as determined by pH paper. The sulfonated beads were dried under air to a final moisture content of 46% g $H_2O$/g wet resin. The chemical functionalization of the polymer resin with sulfonic acid groups was determined to be 2.82 mmol/g dry resin.

Example 64

Preparation of poly(styrene-co-vinylbenzyltriphenylphosphonium chloride-co-divinylbenzene)

To a 250 mL flask equipped with a magnetic stir bar and condenser was charged triphenylphosphine (55.02 g, 207.7 mmol). Acetone (50 mL) was added into the flask and mixture was stirred at 50° C. for 10 min. Poly(styrene-co-vinylbenzylchloride-co-divinylbenzene) (6.5% DVB macroporous resin, Cl⁻ density=5.30 mmol/g dry resin, 30.12 g, 157.4 mmol) was charged into flask while stiffing until a uniform suspension was obtained. The resulting reaction mixture was refluxed for 24 h. After cooling, the reaction mixture was filtered using fritted glass funnel under vacuum, washed sequentially with acetone and ethyl acetate, and dried at 70° C. overnight.

Example 65

Preparation of sulfonated poly(styrene-co-vinylbenzyltriphenyl phosphonium bisulfate-co-divinylbenzene)

Poly(styrene-co-vinylbenzyltriphenylphosphonium chloride-co-divinylbenzene) (30.12 g) was charged into a 500 mL flask equipped with a magnetic stir bar and condenser. Fuming sulfuric acid (20% free $SO_3$, 90 mL) was gradually added into the flask and stirred to form dark-red colored slurry of resin. The slurry was stirred at 90° C. for 1 hour. After cooling, the reaction mixture was filtered using fritted glass funnel under vacuum and then washed repeatedly with de-ionized water until the effluent was neutral, as determined by pH paper. The sulfonated beads were dried under air to a final moisture content of 49% g $H_2O$/g wet resin. The chemical functionalization of the polymer resin with sulfonic acid groups was determined to be 2.82 mmol/g dry resin.

Example 66

Preparation of poly(styrene-co-vinylbenzyltriphenylphosphonium chloride-co-divinylbenzene)

To a 250 mL flask equipped with a magnetic stir bar and condenser was charged triphenylphosphine (38.42 g, 145.0 mmol). Acetone (50 mL) was added into the flask and mixture was stirred at 50° C. for 10 min. Poly(styrene-co-vinylbenzylchloride-co-divinylbenzene) (4% DVB, $Cl^-$ density=4.10 mmol/g dry resin, 30.12 g, 115.4 mmol) was charged into flask while stirring until a uniform suspension was obtained. The resulting reaction mixture was refluxed for 24 h. After cooling, the reaction mixture was filtered using fritted glass funnel under vacuum, washed sequentially with acetone and ethyl acetate, and dried at 70° C. overnight.

Example 67

Preparation of sulfonated poly(styrene-co-vinylbenzyltriphenylphosphonium bisulfate-co-divinylbenzene)

Poly(styrene-co-vinylbenzyltriphenylphosphonium chloride-co-divinylbenzene) (30.18 g) was charged into a 500 mL flask equipped with a magnetic stir bar and condenser. Fuming sulfuric acid (20% free $SO_3$, 120 mL) was gradually added into the flask and stirred to form dark-red colored slurry of resin. The slurry was stirred at 90° C. overnight. After cooling, the reaction mixture was filtered using fritted glass funnel under vacuum and then washed repeatedly with de-ionized water until the effluent was neutral, as determined by pH paper. The sulfonated beads were dried under air to a final moisture content of 59% g $H_2O$/g wet resin. The chemical functionalization of the polymer resin with sulfonic acid groups was determined to be 3.03 mmol/g dry resin.

Example 68

Preparation of poly(styrene-co-vinylbenzyltriphenylphosphonium chloride-co-divinylbenzene)

To a 500 mL flask equipped with a magnetic stir bar and condenser was charged triphenylphosphine (44.22 g, 166.9 mmol). Acetone (70 mL) was added into the flask and mixture was stirred at 50° C. for 10 min. Poly(styrene-co-vinylbenzylchloride-co-divinylbenzene) (4% DVB, $Cl^-$ density=3.9 mmol/g dry resin, 35.08 g, 130.4 mmol) was charged into flask while stirring until a uniform suspension was obtained. The resulting reaction mixture was refluxed for 24 h. After cooling, the reaction mixture was filtered using fritted glass funnel under vacuum, washed sequentially with acetone and ethyl acetate, and dried at 70° C. overnight.

Example 69

Preparation of sulfonated poly(styrene-co-vinylbenzyltriphenyl phosphonium bisulfate-co-divinylbenzene)

Poly(styrene-co-vinylbenzyltriphenylphosphonium chloride-co-divinylbenzene) (30.42 g) was charged into a 500 mL flask equipped with a magnetic stir bar and condenser. Fuming sulfuric acid (20% free $SO_3$, 120 mL) was gradually added into the flask and stirred to form dark-red colored slurry of resin. The slurry was stirred at 90° C. overnight. After cooling, the reaction mixture was filtered using fritted glass funnel under vacuum and then washed repeatedly with de-ionized water until the effluent was neutral, as determined by pH paper. The sulfonated beads were dried under air to a final moisture content of 57% g $H_2O$/g wet resin. The chemical functionalization of the polymer resin with sulfonic acid groups was determined to be 3.04 mmol/g dry resin.

Example 70

Preparation of poly(butyl-vinylimidazolium chloride-co-butylimidazolium chloride-co-styrene)

To a 500 mL flask equipped with a mechanical stirrer and reflux condenser is added 250 mL of acetone, 10 g of imidazole, 14 g of vinylimidazole, 15 g of styrene, 30 g of dichlorobutane and 1 g of azobisisobutyronitrile (AIBN). The solution is stirred under reflux conditions for 12 hours to produce a solid mass of polymer. The solid polymer is removed from the flask, washed repeatedly with acetone, and ground to a coarse powder using a mortar and pestle to yield the product.

Example 71

Preparation of sulfonated poly(butyl-vinylimidazolium bisulfate-co-butylimidazolium bisulfate-co-styrene)

Poly(butyl-vinylimidazolium chloride-co-butylimidazolium chloride-co-styrene) 30.42 g) is charged into a 500 mL flask equipped with a mechanical stirrer. Fuming sulfuric acid (20% free $SO_3$, 120 mL) is gradually added into the flask until the polymer is fully suspended. The resulting slurry is stirred at 90° C. for 5 hours. After cooling, the reaction mixture is filtered using fritted glass funnel under vacuum and then washed repeatedly with de-ionized water until the effluent is neutral, as determined by pH paper.

Catalytic Digestion of Lignocellulosic Materials

Example B1

Digestion of Sugarcane Bagasse Using Catalyst Described in Example 3

Sugarcane bagasse (50% g $H_2O$/g wet bagasse, with a dry-matter composition of: 39.0% g glucan/g dry biomass, 17.3% g xylan/g dry biomass, 5.0% g arabinan/g dry biomass, 1.1% g galactan/g dry biomass, 5.5% g acetate/g dry biomass, 5.0% g soluble extractives/g dry biomass, 24.1% g lignin/g dry biomass, and 3.1% g ash/g dry biomass) was cut such that the maximum particle size was no greater than 1 cm. The composition of the lignocellulosic biomass was determined using a method based on the procedures known in the art. See R. Ruiz and T. Ehrman, "Determination of Carbohydrates in Biomass by High Performance Liquid Chromatography," NREL Laboratory Analytical Procedure LAP-002 (1996); D. Tempelton and T. Ehrman, "Determination of Acid-Insoluble Lignin in Biomass," NREL Laboratory Analytical Procedure LAP-003 (1995); T. Erhman, "Determination of Acid-Soluble Lignin in Biomass," NREL Laboratory Analytical Procedure LAP-004 (1996); and T. Ehrman, "Standard Method for Ash in Biomass," NREL Laboratory Analytical Procedure LAP-005 (1994).

To a 15 mL cylindrical glass reaction vial was added: 0.50 g of the cane bagasse sample, 0.30 g of Catalyst as prepared in Example 3 (initial moisture content: 12% g $H_2O$/g dispensed catalyst), and 800 μL of deionized $H_2O$. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 120° C. for four hours.

Example B2

Separation of Catalyst/Product Mixture from the Hydrolysis of Sugarcane Bagasse

The cylindrical glass reactor from Example B1 was cooled to room temperature and unsealed. 5.0 mL of distilled $H_2O$ was added to the vial reactor and the resulting mixture of liquids and solids was agitated for 2 minutes by magnetic stirring. Following agitation, the solids were allowed to sediment for 30 seconds to produce the layered mixture. The solid catalyst formed a layer at the bottom of the vial reactor. Lignin and residual biomass formed a solid layer above the solid catalyst. The short-chained beta-glucans formed a layer of amorphous solids above the lignin and residual biomass. Finally, the soluble sugars formed a liquid layer above the short-chained beta-glucans.

Example B3

Recovery of Sugars and Soluble Carbohydrates from the Hydrolysis of Sugarcane Bagasse The supernatant and residual insoluble materials from Example B2 were separated by decantation. The soluble-sugar content of hydrolysis products was determined by a combination of high performance liquid chromatography (HPLC) and spectrophotometric methods. HPLC determination of soluble sugars and oligosaccharides was performed on a Hewlett-Packard 1050 Series instrument equipped with a refractive index (RI) detector using a 30 cm×7.8 mm Phenomenex HPB column with water as the mobile phase. The sugar column was protected by both a lead-exchanged sulfonated-polystyrene guard column and a tri-alkylammoniumhydroxide anionic-exchange guard column. All HPLC samples were microfiltered using a 0.2 μm syringe filter prior to injection. Sample concentrations were determined by reference to a calibration generated from known standards.

The ability of the catalyst to hydrolyze the cellulose and hemicellulose components of the biomass to soluble sugars was measured by determining the effective first-order rate constant. The extent of reaction for a chemical species (e.g., glucan, xylan, arabinan) was determined by calculating the ratio of moles of the recovered species to the theoretical moles of the species that would be obtained as a result of complete conversion of the input reactant based on the known composition of the input biomass and the known molecular weights of the reactants and products and the known stoichiometries of the reactions under consideration.

For the digestion of sugarcane bagasse using catalyst as described in Example 3, the first-order rate constant for conversion of xylan to xylose was determined to be 0.3/hr. The first-order rate constant for conversion of glucan to soluble monosaccharides and oligosaccharides (including disaccharides) was determined to be 0.08/hr.

Example B4

Recovery of Insoluble Oligo-Glucans from Hydrolyzed Sugarcane Bagasse

An additional 5.0 mL of water was added to the residual solids from Example B3 and the mixture was gently agitated to suspend only the lightest particles. The suspension was decanted to remove the light particles from the residual lignin and residual catalyst, which remained in the solid sediment at the bottom of the reactor. The solid particles were concentrated by centrifugation.

The number average degree of polymerization ($DOP_N$) of residual water-insoluble glucans (including short-chain oligosaccharides) was determined by extracting the glucans into ice-cold phosphoric acid, precipitating the extracted carbohydrates into water, and measuring the ratio of terminal reducing sugars to the number of total sugar monomers the method of Zhang and Lynd. See Y.-H. Percival Zhang and Lee R. Lynd, "Determination of the Number-Average Degree of Polymerization of Cellodextrins and Cellulose with Application to Enzymatic Hydrolysis," *Biomacromolecules*, 6, 1510-1515 (2005). UV-Visible spectrophotometric analysis was performed on a Beckman DU-640 instrument. In cases where the digestion of hemicellulose was complete (as determined by HPLC), DOP determination of the residual cellulose was performed without the need for phosphoric acid extraction. In some cases, the number average degree of polymerization was verified by Gel Permeation Chromatography (GPC) analysis of cellulose was performed using a procedure adapted from the method of Evans et al. See R. Evans, R. Wearne, A. F. A. Wallis, "Molecular Weight Distribution of Cellulose as Its Tricarbanilate by High Performance Size Exclusion Chromatography," *J. Appl. Pol. Sci.*, 37, 3291-3303 (1989).

In a 20 mL reaction vial containing 3 mL of dry DMSO, was suspended an approximately 50 mg sample of cellulose (dried overnight at 50° C. under reduced pressure). The reaction vial was sealed with a PFTE septum, flushed with dry $N_2$, followed by addition of 1.0 mL phenylisocyanate via syringe. The reaction mixture was incubated at 60° C. for 4 hours with periodic mixing, until the majority of cellulose was dissolved. Excess isocyanate was quenched by addition of 1.0 mL of dry MeOH. Residual solids were pelletized by centrifugation, and a 1 mL aliquot of the supernatant was added to 5 mL of 30% v/v MeOH/$dH_2O$ to yield the carbanilated cellulose as an off-white precipitate. The product was recovered by centrifugation, and repeatedly washed with 30% v/v MeOH, followed by drying for 10 hours at 50° C. under reduced pressure. GPC was performed on a Hewlett-Packard 1050 Series HPLC using a series of TSK-Gel (G3000Hhr, G4000Hhr, G5000Hhr) columns and tetrahydrofuran (THF) as the mobile phase with UV/Vis detection. The molecular weight distribution of the cellulose was determined using a calibration based on polystyrene standards of known molecular weight.

For the digestion of sugarcane bagasse using catalyst as shown in Example 3, the number average degree of polymerization of the oligo-glucans was determined to be 19±4 anhydroglucose (AHG) units. The observed reduction of the degree of polymerization of the residual cellulose to a value significantly lower than the degree of polymerization for the crystalline domains of the input cellulose (for which $DOP_N$>200 AHG units) indicates that the catalyst successfully hydrolyzed crystalline cellulose. The first order rate constant for conversion of β-glucan to short-chain oligo-glucans was determined to be 0.2/hr.

Example B5

Separation and Recovery of Lignin, Residual Unreacted Biomass and Catalyst from Hydrolyzed Sugarcane Bagasse An additional 10 mL of water was added to the residual solids in Example B4. The mixture was agitated to suspend the residual lignin (and residual unreacted biomass particles) without suspending the catalyst. The recovered catalyst was washed with water and then dried to constant mass at 110° C. in a gravity oven to yield 99.6% g/g recovery. The functional density of sulfonic acid groups on the recovered catalyst was determined to be 1.59±0.02 mmol/g by titration of the recovered catalyst indicating negligible loss of acid functionalization.

Example B6

Reuse of Recovered Catalyst

Some of the catalyst recovered from Example B5 (0.250 g dry basis) was returned to the 15 mL cylindrical vial reactor. 0.50 g of additional biomass (composition identical to that in Example B5) and 800 μL of deionized $H_2O$ was added to the reactor, and the contents were mixed thoroughly, as described in Example B1. The reactor was sealed and incubated at 115° C. for four hours. Following the reaction, the product mixture was separated following the procedure described in Examples B2-B5. The first-order rate constant for conversion of xylan to xylose was determined to be 0.3/hr. The first-order rate constant for conversion of glucan to soluble monosaccharides and oligosaccharides (including disaccharides) was determined to be 0.1/hr. The number average degree of polymerization of residual cellulose was determined to be $DOP_N$=20±4 AHG units, and the first order rate constant for conversion of β-glucan to short-chain oligo-glucans was determined to be 0.2/hr.

Example B7

Hydrolysis of Corn Stover Using Catalyst as Prepared in Example 34

Corn stover (7.2% g $H_2O$/g wet biomass, with a dry-matter composition of: 33.9% g glucan/g dry biomass, 24.1% g xylan/g dry biomass, 4.8% g arabinan/g dry biomass, 1.5% g galactan/g dry biomass, 4.0% g acetate/g dry biomass, 16.0% g soluble extractives/g dry biomass, 11.4% g lignin/g dry biomass, and 1.4% g ash/g dry biomass) was cut such that the maximum particle size was no greater than 1 cm. To a 15 mL cylindrical glass reaction vial was added: 0.45 g of the cane bagasse sample, 0.22 g of Catalyst as prepared in Example 34 (initial moisture content: 0.8% g $H_2O$/g dispensed catalyst), and 2.3 mL of deionized $H_2O$. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 110° C. for five hours. Following the reaction, the product mixture was separated following the procedure described in Examples B2-B5. The first-order rate constant for conversion of xylan to xylose was determined to be 0.1/hr. The first-order rate constant for conversion of glucan to soluble monosaccharides and oligosaccharides (including disaccharides) was determined to be 0.04/hr. The number average degree of polymerization of residual cellulose was determined to be $DOP_N$=20±4 AHG units, and the first order rate constant for conversion of β-glucan to short-chain oligo-glucans was determined to be 0.06/hr.

Example B8

Hydrolysis of Oil Palm Empty Fruit Bunches Using Catalyst as Prepared in Example 20

Shredded oil palm empty fruit bunches (8.7% g $H_2O$/g wet biomass, with a dry-matter composition of: 35.0% g glucan/g dry biomass, 21.8% g xylan/g dry biomass, 1.8% g arabinan/g dry biomass, 4.8% g acetate/g dry biomass, 9.4% g soluble extractives/g dry biomass, 24.2% g lignin/g dry biomass, and 1.2% g ash/g dry biomass) was cut such that the maximum particle size was no greater than 1 cm. To a 15 mL cylindrical glass reaction vial was added: 0.46 g of the cane bagasse sample, 0.43 g of Catalyst as prepared in Example 20 (initial moisture content: 18.3% g $H_2O$/g dispensed catalyst), and 1.3 mL of deionized $H_2O$. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 110° C. for five hours. Following the reaction, the product mixture was separated following the procedure described in Examples 42-45. The first-order rate constant for conversion of xylan to xylose was determined to be 0.4/hr. The first-order rate constant for conversion of glucan to soluble monosaccharides and oligosaccharides (including disaccharides) was determined to be 0.04/hr. The number average degree of polymerization of residual cellulose was determined to be $DOP_N$=20±4 AHG units, and the first order rate constant for conversion of β-glucan to short-chain oligo-glucans was determined to be 0.06/hr.

Example B9

Hydrolysis of Sugarcane Bagasse Using Catalyst as Prepared in Example 32

Sugarcane bagasse (12.5% g $H_2O$/g wet bagasse, with a dry-matter composition of: 39.0% g glucan/g dry biomass, 17.3% g xylan/g dry biomass, 5.0% g arabinan/g dry biomass, 1.1% g galactan/g dry biomass, 5.5% g acetate/g dry biomass, 5.0% g soluble extractives/g dry biomass, 24.1% g lignin/g dry biomass, and 3.1% g ash/g dry biomass) was cut such that the maximum particle size was no greater than 1 cm. To a 15 mL cylindrical glass reaction vial was added: 0.53 g of the cane bagasse sample, 0.52 g of Catalyst as prepared in Example 32 (initial moisture content: 3.29% g H$_2$O/g dispensed catalyst), and 1.4 mL of deionized H$_2$O. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 115° C. for four hours. Following the reaction, the product mixture was separated following the procedure described in Examples B2-B5. The first-order rate constant for conversion of xylan to xylose was determined to be 0.59/hr. The first-order rate constant for conversion of glucan to soluble monosaccharides and oligosaccharides (including disaccharides) was determined to be 0.05/hr. The number average degree of polymerization of residual cellulose was determined to be $DOP_N$=23±4AHG units, and the first order rate constant for conversion of β-glucan to short-chain oligo-glucans was determined to be 0.07/hr.

Example B10

Hydrolysis of Sugarcane Bagasse Using Catalyst as Prepared in Example 18

Sugarcane bagasse (12.5% g H$_2$O/g wet bagasse, with a dry-matter composition of: 39.0% g glucan/g dry biomass, 17.3% g xylan/g dry biomass, 5.0% g arabinan/g dry biomass, 1.1% g galactan/g dry biomass, 5.5% g acetate/g dry biomass, 5.0% g soluble extractives/g dry biomass, 24.1% g lignin/g dry biomass, and 3.1% g ash/g dry biomass) was cut such that the maximum particle size was no greater than 1 cm. To a 15 mL cylindrical glass reaction vial was added: 0.51 g of the cane bagasse sample, 0.51 g of Catalyst as prepared in Example 18 (initial moisture content: 7.9% g H$_2$O/g dispensed catalyst), and 1.4 mL of deionized H$_2$O. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 115° C. for four hours. Following the reaction, the product mixture was separated following the procedure described in Examples B2-B5. The first-order rate constant for conversion of xylan to xylose was determined to be 0.06/hr. The first-order rate constant for conversion of glucan to soluble oligo-, di-, and mono-saccharides was determined to be 0.05/hr. The number average degree of polymerization of residual cellulose was determined to be 20±4AHG units, and the first order rate constant for conversion of β-glucan to short-chain oligo-glucans was determined to be 0.07/hr.

Example B11

High-Selectivity to Sugars

Shredded oil palm empty fruit bunches (8.7% g H$_2$O/g wet biomass, with a dry-matter composition of: 35.0% g glucan/g dry biomass, 21.8% g xylan/g dry biomass, 1.8% g arabinan/g dry biomass, 4.8% g acetate/g dry biomass, 9.4% g soluble extractives/g dry biomass, 24.2% g lignin/g dry biomass, and 1.2% g ash/g dry biomass) was cut such that the maximum particle size was no greater than 1 cm. To a 15 mL cylindrical glass reaction vial was added: 0.51 g of the cane bagasse sample, 0.51 g of Catalyst as prepared in Example 3 (initial moisture content: 8.9% g H$_2$O/g dispensed catalyst), and 2.6 mL of deionized H$_2$O. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 115° C. for four hours. Following the reaction, 10.0 mL of deionized H$_2$O was added to the product mixture to dissolve the soluble species and the solids were allowed to sediment. HPLC determination of sugar dehydration products and organic acids liberated from biomass samples was performed on an Agilent 1100 Series instrument using a 30 cm×7.8 mm Supelcogel™ H column (or a Phenomenex HOA column in some cases) with 0.005N sulfuric acid in water as the mobile phase. Quantitation of sugar degradation products: formic acid, levulinic acid, 5-hydroxymethylfurfural, and 2-furaldehyde, was performed by reference to a calibration curve generated from high-purity solutions of known concentration. The first order rate constant for the production of degradation products was found to be <0.001/hr, representing >99% mol sugars/mol degradation products.

Example B12

Fermentation of Cellulosic Sugars from Sugarcane Bagasse

Sugarcane bagasse (12.5% g H$_2$O/g wet bagasse, with a dry-matter composition of: 39.0% g glucan/g dry biomass, 17.3% g xylan/g dry biomass, 5.0% g arabinan/g dry biomass, 1.1% g galactan/g dry biomass, 5.5% g acetate/g dry biomass, 5.0% g soluble extractives/g dry biomass, 24.1% g lignin/g dry biomass, and 3.1% g ash/g dry biomass) was cut such that the maximum particle size was no greater than 1 cm. To a 15 mL cylindrical glass reaction vial was added: 1.6 g of the cane bagasse sample, 1.8 g of Catalyst as prepared in Example 3 (initial moisture content: 12.1% g H$_2$O/g dispensed catalyst), and 5.0 mL of deionized H$_2$O. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 110° C. for five hours. After five hours, an additional 1.0 mL of distilled H2O was added to the reaction mixture, which was then incubated at 105° C. for an additional 2 hours. The wet reactant cake was loaded into a syringe equipped with a 0.2 micrometer filter and the hydrolysate was pressed out of the product mixture into a sterile container. To a culture tube was added 2.5 mL of culture media (prepared by diluting 10 g of yeast extract and 20 g peptone to 500 mL in distilled water, followed by purification by sterile filtration), 2.5 mL of the hydrolysate, and 100 mL of yeast slurry (prepared by dissolving 500 mg of Alcotec 24 hour Turbo Super yeast into 5 mL of 30° C. of sterile H$_2$O. The culture was grown at 30° C. in shaking incubator, with 1 mL aliquots removed at 24, 48 and 72 hours. For each aliquot, the optical density of the culture was determined by spectrophotometer aliquot. The aliquot was purified by centrifugation and the supernatant was analyzed by HPLC to determine the concentrations of glucose, xylose, galactose, arabinose, ethanol, and glycerol. After 24 hours, ethanol and glycerol were found in the fermentation supernatant, indicating at least 65% fermentation yield on a molar basis relative to the initial glucose in the hydrolysate.

Example B13

Fermentation of Cellulosic Sugars from Cassava Stem

Cassava stem (2.0% g H$_2$O/g wet cassava stem, with a dry-matter composition of: 53.0% g glucan/g dry biomass, 6.0% g xylan/g dry biomass, 2.5% g arabinan/g dry biomass, 5.5% g acetate/g dry biomass, 5.9% g soluble extractives/g dry biomass, 24.2% g lignin/g dry biomass, and 2.1% g ash/g dry biomass) was shredded in a coffee-grinder such that the maximum particle size was no greater than 2 mm. To a 15 mL cylindrical glass reaction vial was added: 1.9 g of the shredded cassava stem, 2.0 g of Catalyst as prepared in Example 3 (initial moisture content: 12.0% g $H_2O$/g dispensed catalyst), and 8.0 mL of deionized $H_2O$. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 110° C. for five hours. After five hours, an additional 2.0 mL of distilled H2O was added to the reaction mixture, which was then incubated at 105° C. for an additional 2 hours. The wet reactant cake was loaded into a syringe equipped with a 0.2 micrometer filter and the hydrolysate was pressed out of the product mixture into a sterile container. To a culture tube was added 2.5 mL of culture media (prepared by diluting 10 g of yeast extract and 20 g peptone to 500 mL in distilled water, followed by purification by sterile filtration), 2.5 mL of the hydrolysate, and 100 mL of yeast slurry (prepared by dissolving 500 mg of Alcotec 24 hour Turbo Super yeast into 5 mL of 30° C. of sterile $H_2O$. The culture was grown at 30° C. in shaking incubator, with 1 mL aliquots removed at 24, 48 and 72 hours. For each aliquot, the optical density of the culture was determined by spectrophotometer aliquot. The aliquot was purified by centrifugation and the supernatant was analyzed by HPLC to determine the concentrations of glucose, xylose, galactose, arabinose, ethanol, and glycerol. After 24 hours, ethanol and glycerol were found in the fermentation supernatant, indicating at least 70% fermentation yield on a molar basis relative to the initial glucose in the hydrolysate.

Example B14

Fermentation of Glucose Obtained from Insoluble Starch

To 15 mL cylindrical glass reaction vial was added: 4.0 g of corn starch (3% g $H_2O$/g wet starch, with a dry-matter composition of: 98% g glucan/g dry biomass), 3.9 g of Catalyst as prepared in Example 3 (initial moisture content: 12.25% g $H_2O$/g dispensed catalyst), and 12.0 mL of deionized $H_2O$. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 110° C. for five hours. After five hours, an additional 2.0 mL of distilled H2O was added to the reaction mixture, which was then incubated at 105° C. for an additional 2 hours. The wet reactant cake was loaded into a syringe equipped with a 0.2 micrometer filter and the hydrolysate was pressed out of the product mixture into a sterile container. To a culture tube was added 2.5 mL of culture media (prepared by diluting 10 g of yeast extract and 20 g peptone to 500 mL in distilled water, followed by purification by sterile filtration), 2.5 mL of the hydrolysate, and 100 mL of yeast slurry (prepared by dissolving 500 mg of Alcotec 24 hour Turbo Super yeast into 5 mL of 30° C. of sterile $H_2O$. The culture was grown at 30° C. in shaking incubator, with 1 mL aliquots removed at 24, 48 and 72 hours. For each aliquot, the optical density of the culture was determined by spectrophotometer aliquot. The aliquot was purified by centrifugation and the supernatant was analyzed by HPLC to determine the concentrations of glucose, xylose, galactose, arabinose, ethanol, and glycerol. After 24 hours, ethanol and glycerol were found in the fermentation supernatant, indicating at least 88% fermentation yield on a molar basis relative to the initial glucose in the hydrolysate.

Example B15

Enzymatic Saccharification of Oligo-Glucans Obtained from Digestion of Sugarcane Bagasse with Catalyst as Prepared in Example 3

50.0 mg of the oligo-glucans obtained in Example B4 was suspended in 0.4 mL of 0.05 molar acetate buffer solution at pH 4.8 in a culture tube. The suspension was pre-warmed to 40° C., after which, 0.5 FPU of Celluclast® cellulase enzyme from *Trichoderma reesei* and 2 IU of cellobiase enzyme from *Aspergillus niger* (diluted in 0.1 mL of citrate buffer at 40° C.) was added. A 50.0 mL aliquot was sampled from the enzymatic reaction every hour for five hours. For each aliquot, the reaction was terminated by diluting the 50.0 mL sample to 0.7 mL in distilled water and adding 0.3 mL of DNS reagent (prepared by diluting 91 g of potassium sodium tartrate, 3.15 g dinitrosalicylic acid, 131 mL of 2 molar sodium hydroxide 2.5 g phenol and 2.5 g sodium sulfite to 500 mL with distilled $H_2O$). The 1 mL mixture was sealed in a microcentrifuge tube and boiled for exactly 5 minutes in water. The appearance of reducing sugars was measured by comparing the absorbance at 540 nm to a calibration curve generated from glucose samples of known concentration. The first order rate constant for reducing sugar liberation in the saccharification reaction was determined to be 0.15/hr.

Comparative Example B16

Attempted Hydrolysis of Sugarcane Bagasse with Cross-Linked, Sulfonated-Polystyrene (Negative Control 1)

The cellulose digestion capability of the catalysts described herein was compared to that of conventional acidified polymer-resins used for catalysis in organic and industrial chemistry (T. Okuhara, "Water-Tolerant Solid Acid Catalysts," *Chem. Rev.*, 102, 3641-3666 (2002)). Sugarcane bagasse (12.5% g $H_2O$/g wet bagasse, with a dry-matter composition of: 39.0% g glucan/g dry biomass, 17.3% g xylan/g dry biomass, 5.0% g arabinan/g dry biomass, 1.1% g galactan/g dry biomass, 5.5% g acetate/g dry biomass, 5.0% g soluble extractives/g dry biomass, 24.1% g lignin/g dry biomass, and 3.1% g ash/g dry biomass) was cut such that the maximum particle size was no greater than 1 cm. To a 15 mL cylindrical glass reaction vial was added: 0.51 g of the cane bagasse sample, 0.53 g of sulfonated polystyrene (Dowex® 50WX2 resin, acid functionalization: 4.8 mmol/g, initial moisture content: 19.6% g $H_2O$/g dispensed catalyst), and 1.4 mL of deionized $H_2O$. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 115° C. for six hours. Following the reaction, the product mixture was separated following the procedure described in Examples B2-B5. The first-order rate constant for conversion of xylan to xylose was determined to be 0.1/hr. The first-order rate constant for conversion of glucan to soluble oligo-, di-, and mono-saccharides was determined to be <0.01/hr. The number average degree of polymerization of residual cellulose was found to be $DOP_N$>300AHG units, indicating little or no digestion of crystalline cellulose in the biomass sample. Short-chain oligosaccharides were not detected. The residual biomass exhibited little or no structural reduction in particle size.

Comparative Example B17

Attempted Hydrolysis of Sugarcane Bagasse with Sulfonated Polystyrene (Negative Control 2)

Sugarcane bagasse (12.5% g $H_2O$/g wet bagasse, with a dry-matter composition of: 39.0% g glucan/g dry biomass, 17.3% g xylan/g dry biomass, 5.0% g arabinan/g dry biomass, 1.1% g galactan/g dry biomass, 5.5% g acetate/g dry biomass, 5.0% g soluble extractives/g dry biomass, 24.1% g lignin/g dry biomass, and 3.1% g ash/g dry biomass) was cut such that the maximum particle size was no greater than 1 cm. To a 15 mL cylindrical glass reaction vial was added: 0.52 g of the cane bagasse sample, 0.55 g of sulfonated polystyrene (Amberlyst® 15, acid functionalization: 4.6 mmol/g, initial moisture content: 10.8% g $H_2O$/g dispensed catalyst), and 1.8 mL of deionized $H_2O$. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 115° C. for six hours. Following the reaction, the product mixture was separated following the procedure described in Examples B2-B5. The first-order rate constant for conversion of xylan to xylose was determined to be 0.1/hr. The first-order rate constant for conversion of glucan to soluble oligo-, di-, and mono-saccharides was determined to be <0.01/hr. The number average degree of polymerization of residual cellulose was determined to be $DOP_N$>300 AHG units, indicating little or no digestion of crystalline cellulose in the biomass sample. Short-chain oligosaccharides were not detected. The residual biomass exhibited little or no structural reduction in particle size.

Comparative Example B18

Attempted Hydrolysis of Sugarcane Bagasse with Cross-Linked Polyacrylic Acid (Negative Control 3)

Sugarcane bagasse (12.5% g $H_2O$/g wet bagasse, with a dry-matter composition of: 39.0% g glucan/g dry biomass, 17.3% g xylan/g dry biomass, 5.0% g arabinan/g dry biomass, 1.1% g galactan/g dry biomass, 5.5% g acetate/g dry biomass, 5.0% g soluble extractives/g dry biomass, 24.1% g lignin/g dry biomass, and 3.1% g ash/g dry biomass) was cut such that the maximum particle size was no greater than 1 cm. To a 15 mL cylindrical glass reaction vial was added: 0.50 g of the cane bagasse sample, 0.50 g of polyacrylic acid beads (Amberlite® IRC86 resin, acid functionalization: 10.7 mmol/g, initial moisture content: 5.2% g $H_2O$/g dispensed catalyst), and 1.8 mL of deionized $H_2O$. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 115° C. for six hours. Following the reaction, the product mixture was separated following the procedure described in Examples B2-B5. The first-order rate constant for conversion of xylan to xylose was determined to be <0.05/hr. The first-order rate constant for conversion of glucan to soluble oligo-, di-, and mono-saccharides was determined to be <0.001/hr. The number average degree of polymerization of residual cellulose was determined to be $DOP_N$>300 AHG units, indicating little or no digestion of crystalline cellulose in the biomass sample. Short-chain oligosaccharides were not detected. The residual biomass exhibited little or no structural reduction in particle size.

Comparative Example B19

Attempted Hydrolysis of Sugarcane Bagasse with a Non-Acidic Ionomer as Prepared in Example 2 (Negative Control 4)

Sugarcane bagasse (12.5% g $H_2O$/g wet bagasse, with a dry-matter composition of: 39.0% g glucan/g dry biomass, 17.3% g xylan/g dry biomass, 5.0% g arabinan/g dry biomass, 1.1% g galactan/g dry biomass, 5.5% g acetate/g dry biomass, 5.0% g soluble extractives/g dry biomass, 24.1% g lignin/g dry biomass, and 3.1% g ash/g dry biomass) was cut such that the maximum particle size was no greater than 1 cm. To a 15 mL cylindrical glass reaction vial was added: 0.50 g of the cane bagasse sample, 0.50 g of poly[styrene-co-3-methyl-1-(4-vinyl-benzyl)-3H-imidazol-1-ium chloride-co-divinyl-benzene] (Catalyst as described in Example 2, Acid functionalization: 0.0 mmol/g, initial moisture content: 4.0% g $H_2O$/g dispensed polymer), and 1.8 mL of deionized $H_2O$. The reactants were mixed thoroughly with a glass stir rod to distribute the catalyst particles evenly throughout the biomass. The resulting mixture was gently compacted to yield a solid reactant cake. The glass reactor was sealed with a phenolic cap and incubated at 115° C. for six hours. Following the reaction, the product mixture was separated following the procedure described in Examples B2-B5. The first-order rate constant for conversion of xylan to xylose was determined to be <0.001/hr. No detectable amounts of soluble oligo-, di-, and mono-saccharides were observed. It was determined that the number average degree of polymerization of the residual cellulose was $DOP_N$>300 AHG units, indicating little or no digestion of crystalline cellulose in the biomass sample. Short-chain oligosaccharides were not detected. The residual biomass appeared physically unchanged from the input form.

What is claimed is:

1. A polymer comprising acidic monomers and ionic monomers connected to form a polymeric backbone,
   wherein each acidic monomer independently comprises at least one Bronsted-Lowry acid, wherein one or more of the acidic monomers comprises a linker connecting the at least one Bronsted-Lowry acid to the polymeric backbone,
   wherein each ionic monomer independently comprises a nitrogen-containing cationic group or a phosphorous-containing cationic group, and wherein one or more of the ionic monomers comprises a linker connecting the nitrogen-containing cationic group or the phosphorous-containing cationic group to the polymeric backbone,
   wherein the nitrogen-containing cationic group and the linker of an ionic monomer form a nitrogen-containing side chain, wherein each nitrogen-containing side chain is independently selected from the group consisting of:

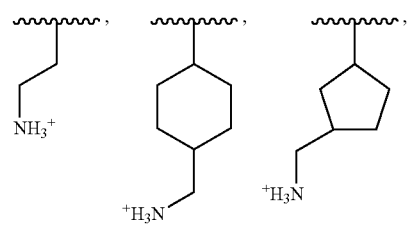

93
-continued
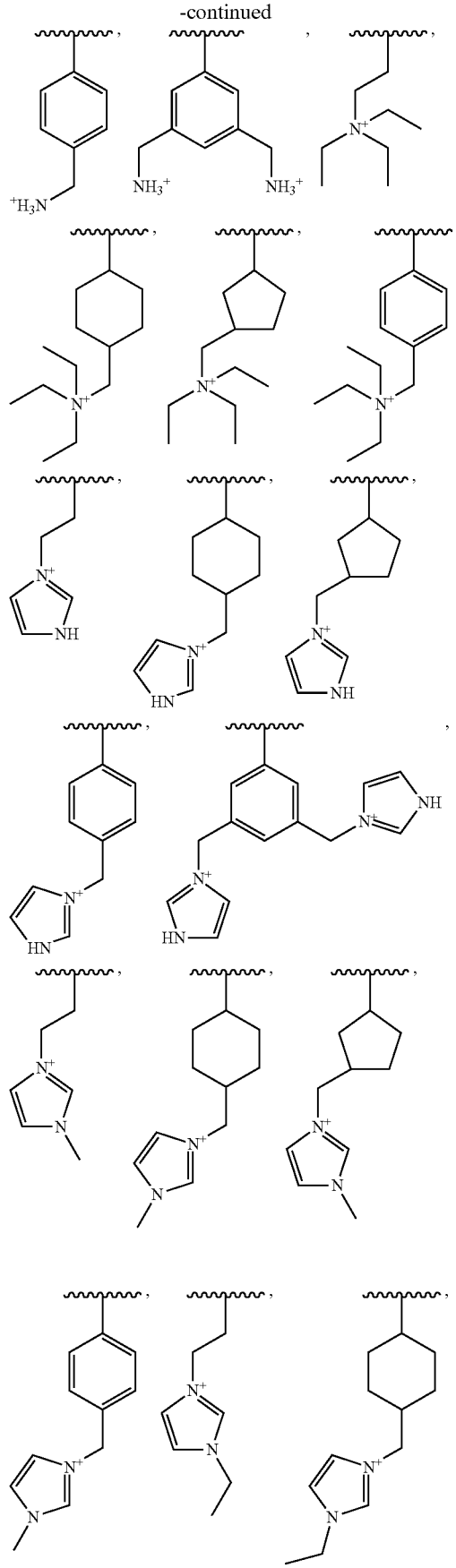
94
-continued
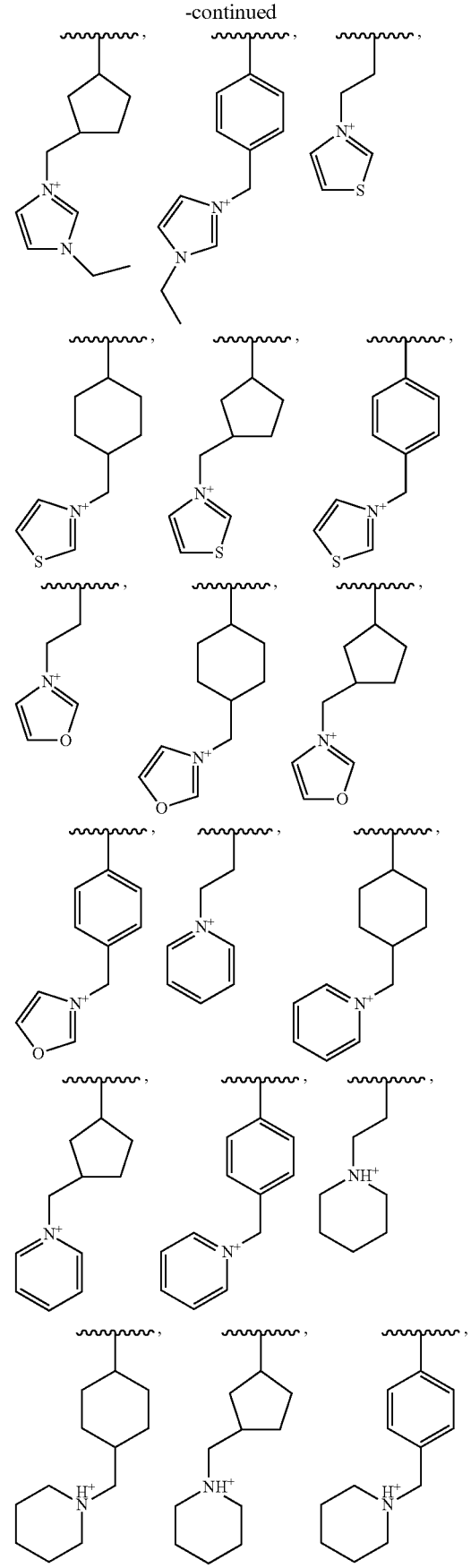

-continued

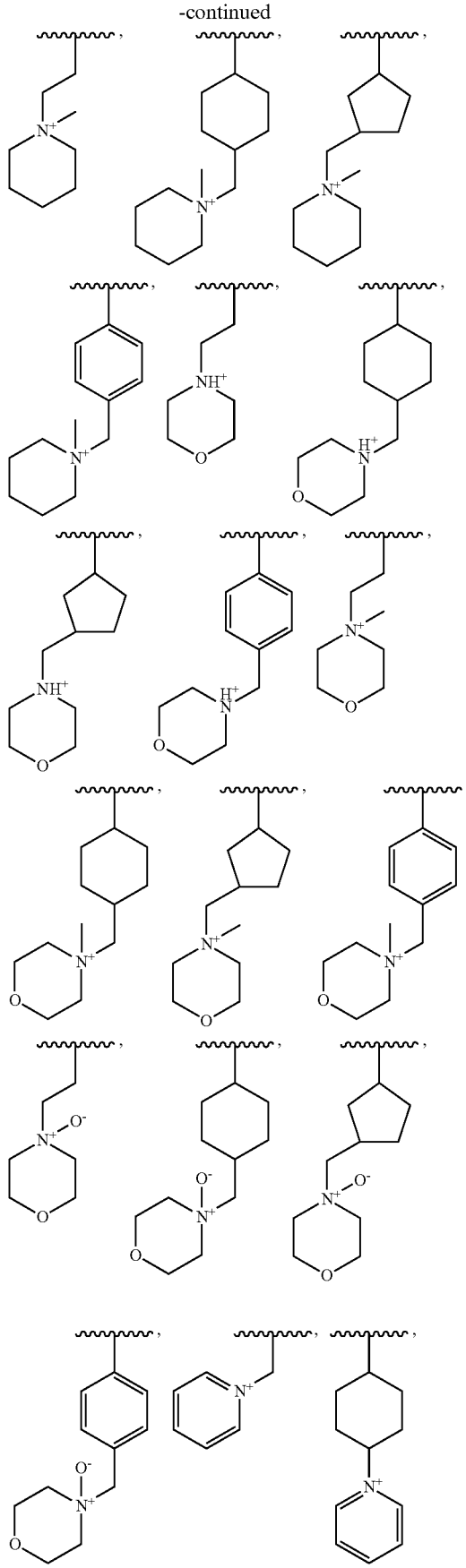

-continued

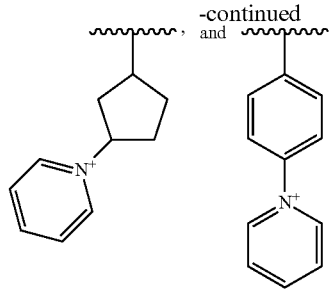

wherein the phosphorous-containing cationic group and the linker of an ionic monomer form a phosphorous-containing side chain, wherein each phosphorous-containing side chain is independently selected from the group consisting of:

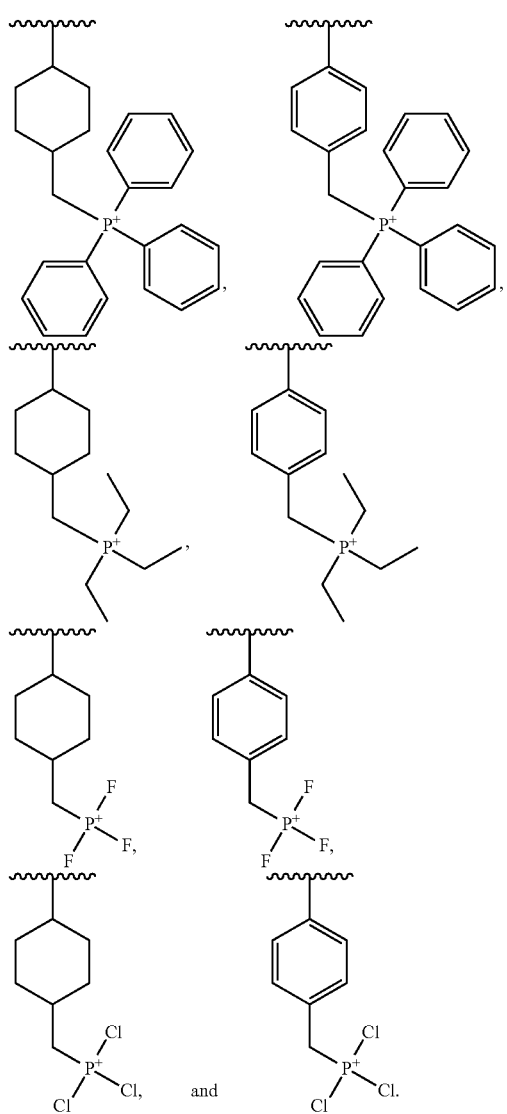

2. The polymer of claim 1, wherein the at least one Bronsted-Lowry acid and the linker form an acidic side chain, wherein each acidic side chain is independently selected from the group consisting of:

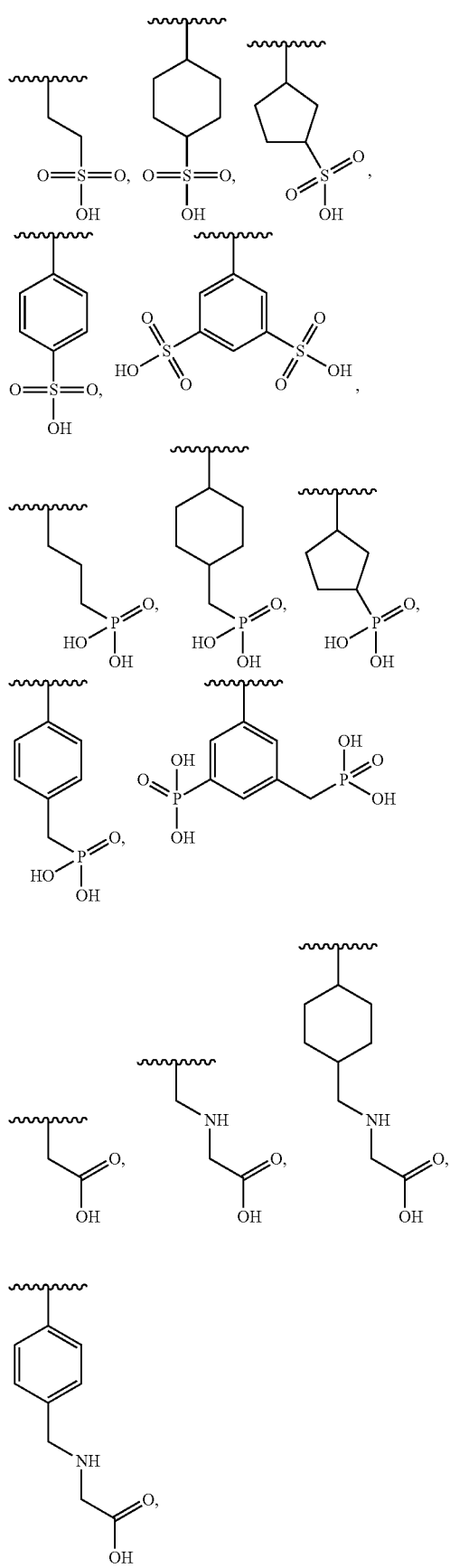
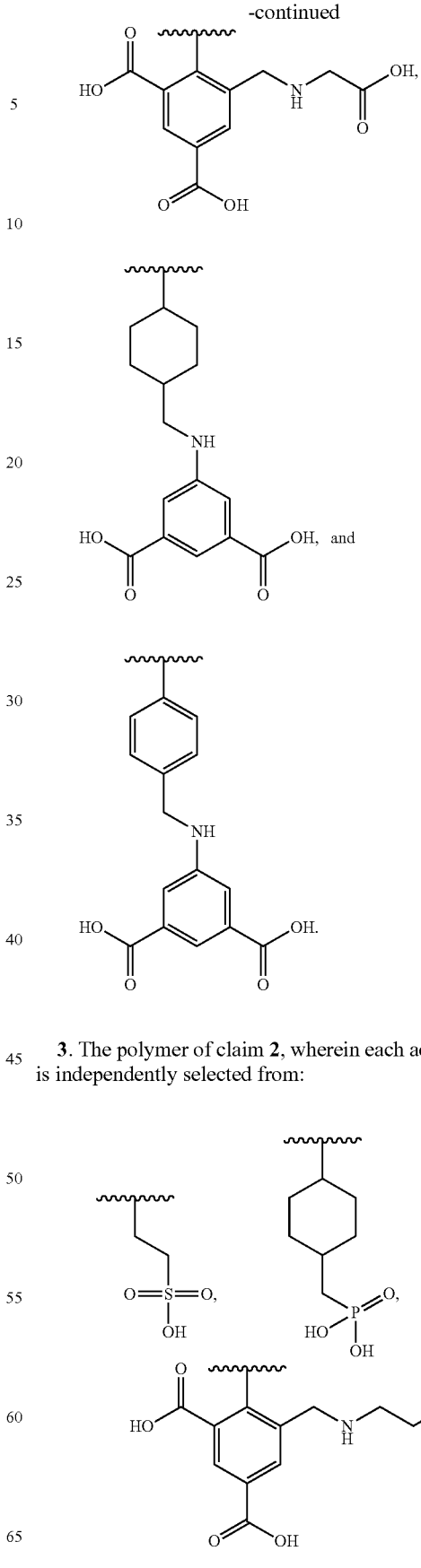
3. The polymer of claim 2, wherein each acidic side chain is independently selected from:

4. The polymer of claim 2, wherein each acidic side chain is independently selected from:

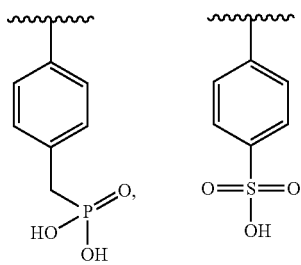

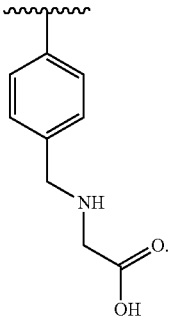

5. The polymer of claim 2, wherein each acidic side chain is independently selected from:

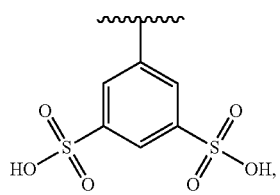

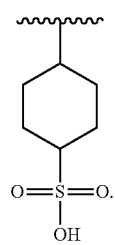

6. The polymer of claim 1, further comprising acidic-ionic monomers connected to form the polymeric backbone, wherein each acidic-ionic monomer independently comprises a Bronsted-Lowry acid and a cationic group, and wherein one or more of the acidic-ionic monomers comprises a linker connecting the Bronsted-Lowry acid or the cationic group to the polymeric backbone.

7. The polymer of claim 6, wherein the linker of each acidic-ionic monomer is independently selected from the group consisting of unsubstituted or substituted alkylene, unsubstituted or substituted cycloalkylene, unsubstituted or substituted alkenylene, unsubstituted or substituted arylene, unsubstituted or substituted heteroarylene, unsubstituted or substituted alkylene ether, unsubstituted or substituted alkylene ester, and unsubstituted or substituted alkylene carbamate.

8. The polymer of claim 6, wherein the Bronsted-Lowry acid, the cationic group and the linker form an acidic-ionic side chain, wherein each acidic-ionic side chain is independently selected from the group consisting of:

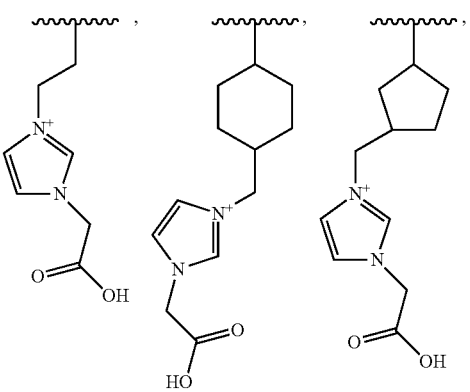

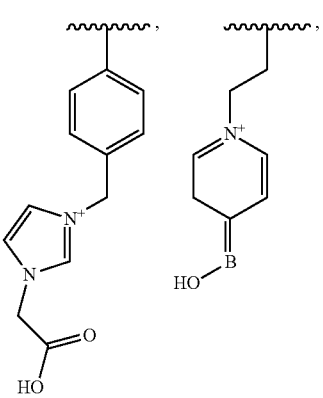

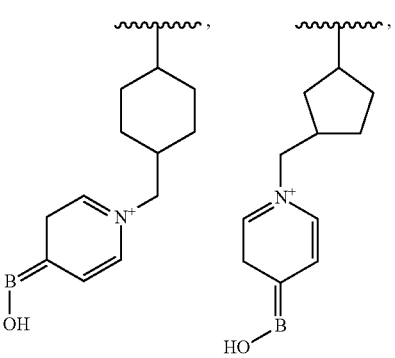

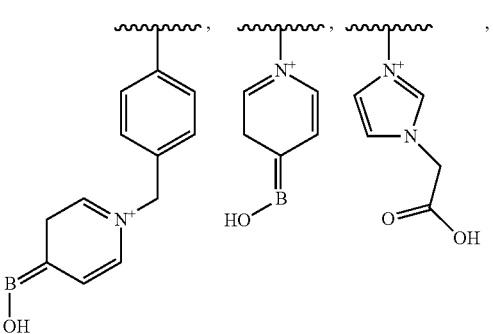

-continued

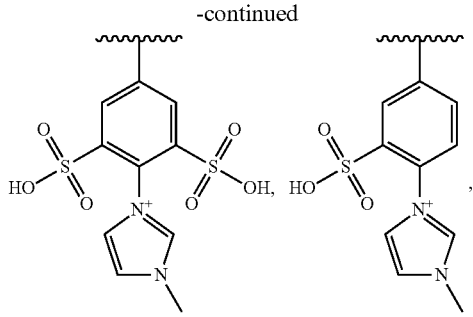

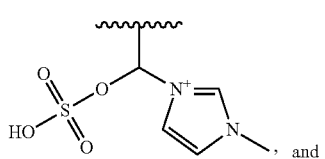

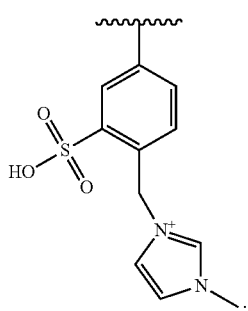

9. The polymer of claim 8, wherein each acidic-ionic side chain is independently selected from:

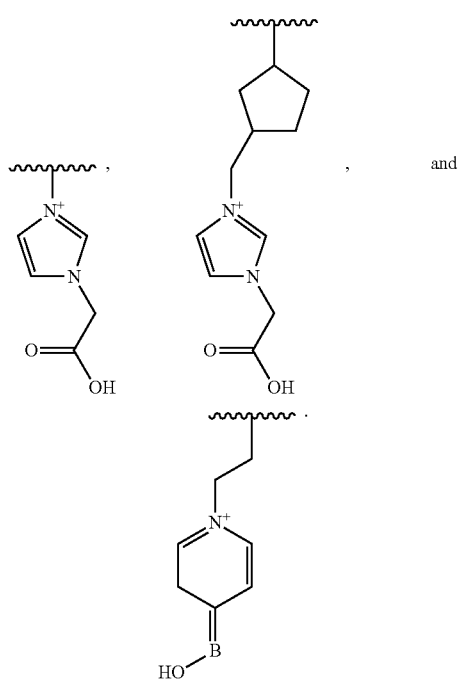

10. The polymer of claim 8, wherein each acidic-ionic side chain is independently selected from:

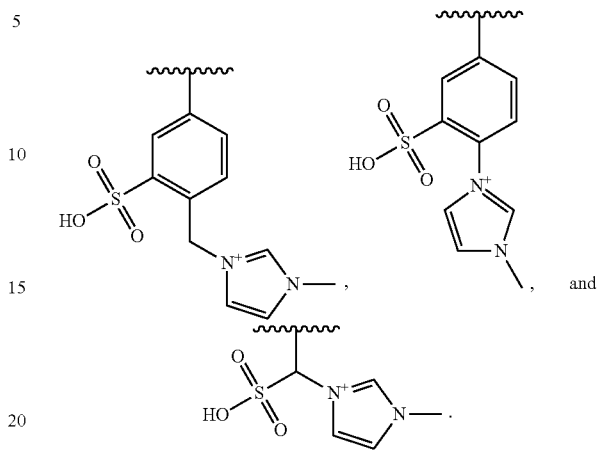

11. The polymer of claim 1, wherein each ionic monomer further independently comprises a counterion for a nitrogen-containing cationic group or a phosphorous-containing cationic group present in the polymer.

12. The polymer of claim 11, wherein the counterion at each occurrence is independently selected from the group consisting of halide, nitrate, sulfate, formate, acetate, or organosulfonate.

13. The polymer of claim 1, wherein the polymer is selected from the group consisting of:
poly[styrene-co-4-vinylbenzenesulfonic acid-co-3-methyl-1-(4-vinylbenzyl)-3H-imidazol-1-ium chloride-co-divinylbenzene];
poly[styrene-co-4-vinylbenzenesulfonic acid-co-3-methyl-1-(4-vinylbenzyl)-3H-imidazol-1-ium bisulfate-co-divinylbenzene];
poly[styrene-co-4-vinylbenzenesulfonic acid-co-3-methyl-1-(4-vinylbenzyl)-3H-imidazol-1-ium acetate-co-divinylbenzene];
poly[styrene-co-4-vinylbenzenesulfonic acid-co-3-ethyl-1-(4-vinylbenzyl)-3H-imidazol-1-ium chloride-co-divinylbenzene];
poly[styrene-co-4-vinylbenzenesulfonic acid-co-3-ethyl-1-(4-vinylbenzyl)-3H-imidazol-1-ium bisulfate-co-divinylbenzene];
poly[styrene-co-4-vinylbenzenesulfonic acid-co-3-ethyl-1-(4-vinylbenzyl)-3H-imidazol-1-ium acetate-co-divinylbenzene];
poly[styrene-co-4-vinylbenzenesulfonic acid-co-1-(4-vinylbenzyl)-3H-imidazol-1-ium chloride-co-divinylbenzene];
poly[styrene-co-4-vinylbenzenesulfonic acid-co-1-(4-vinylbenzyl)-3H-imidazol-1-ium bisulfate-co-divinylbenzene];
poly[styrene-co-4-vinylbenzenesulfonic acid-co-1-(4-vinylbenzyl)-3H-imidazol-1-ium acetate-co-divinylbenzene];
poly[styrene-co-4-vinylbenzenesulfonic acid-co-3-methyl-1-(4-vinylbenzyl)-3H-benzoimidazol-1-ium chloride-co-divinylbenzene];
poly[styrene-co-4-vinylbenzenesulfonic acid-co-3-methyl-1-(4-vinylbenzyl)-3H-benzoimidazol-1-ium bisulfate-co-divinylbenzene];

poly[styrene-co-4-vinylbenzenesulfonic acid-co-3-methyl-1-(4-vinylbenzyl)-3H-benzoimidazol-1-ium acetate-co-divinylbenzene];
poly[styrene-co-4-vinylbenzenesulfonic acid-co-1-(4-vinylbenzyl)-pyridinium-chloride-co-divinylbenzene];
poly[styrene-co-4-vinylbenzenesulfonic acid-co-1-(4-vinylbenzyl)-pyridinium-bisulfate-co-divinylbenzene];
poly[styrene-co-4-vinylbenzenesulfonic acid-co-1-(4-vinylbenzyl)-pyridinium-acetate-co-divinylbenzene];
poly[styrene-co-4-vinylbenzenesulfonic acid-co-1-(4-vinylbenzyl)-pyridinium-chloride-co-3-methyl-1-(4-vinylbenzyl)-3H-imidazol-1-ium bisulfate-co-divinylbenzene];
poly[styrene-co-4-vinylbenzenesulfonic acid-co-1-(4-vinylbenzyl)-pyridinium-bisulfate-co-3-methyl-1-(4-vinylbenzyl)-3H-imidazol-1-ium bisulfate-co-divinylbenzene];
poly[styrene-co-4-vinylbenzenesulfonic acid-co-1-(4-vinylbenzyl)-pyridinium-acetate-co-3-methyl-1-(4-vinylbenzyl)-3H-imidazol-1-ium bisulfate-co-divinylbenzene];
poly[styrene-co-4-vinylbenzenesulfonic acid-co-4-methyl-4-(4-vinylbenzyl)-morpholin-4-ium chloride-co-divinylbenzene];
poly[styrene-co-4-vinylbenzenesulfonic acid-co-4-methyl-4-(4-vinylbenzyl)-morpholin-4-ium bisulfate-co-divinylbenzene];
poly[styrene-co-4-vinylbenzenesulfonic acid-co-4-methyl-4-(4-vinylbenzyl)-morpholin-4-ium acetate-co-divinylbenzene];
poly[styrene-co-4-vinylbenzenesulfonic acid-co-triphenyl-(4-vinylbenzyl)-phosphonium chloride-co-divinylbenzene];
poly[styrene-co-4-vinylbenzenesulfonic acid-co-triphenyl-(4-vinylbenzyl)-phosphonium bisulfate-co-divinylbenzene];
poly[styrene-co-4-vinylbenzenesulfonic acid-co-triphenyl-(4-vinylbenzyl)-phosphonium acetate-co-divinylbenzene];
poly[styrene-co-4-vinylbenzenesulfonic acid-co-1-methyl-1-(4-vinylbenzyl)-piperidin-1-ium chloride-co-divinylbenzene];
poly[styrene-co-4-vinylbenzenesulfonic acid-co-1-methyl-1-(4-vinylbenzyl)-piperidin-1-ium bisulfate-co-divinylbenzene];
poly[styrene-co-4-vinylbenzenesulfonic acid-co-1-methyl-1-(4-vinylbenzyl)-piperidin-1-ium acetate-co-divinylbenzene];
poly[styrene-co-4-vinylbenzenesulfonic acid-co-4-(4-vinylbenzyl)-morpholine-4-oxide-co-divinyl benzene];
poly[styrene-co-4-vinylbenzenesulfonic acid-co-triethyl-(4-vinylbenzyl)-ammonium chloride-co-divinylbenzene];
poly[styrene-co-4-vinylbenzenesulfonic acid-co-triethyl-(4-vinylbenzyl)-ammonium bisulfate-co-divinylbenzene];
poly[styrene-co-4-vinylbenzenesulfonic acid-co-triethyl-(4-vinylbenzyl)-ammonium acetate-co-divinylbenzene];
poly[styrene-co-3-methyl-1-(4-vinylbenzyl)-3H-imidazol-1-ium chloride-co-4-boronyl-1-(4-vinylbenzyl)-pyridinium chloride-co-divinylbenzene];
poly[styrene-co-3-methyl-1-(4-vinylbenzyl)-3H-imidazol-1-ium chloride-co-1-(4-vinylphenyl)methylphosphonic acid-co-divinylbenzene];
poly[styrene-co-3-methyl-1-(4-vinylbenzyl)-3H-imidazol-1-ium bisulfate-co-1-(4-vinylphenyl)methylphosphonic acid-co-divinylbenzene];
poly[styrene-co-3-methyl-1-(4-vinylbenzyl)-3H-imidazol-1-ium acetate-co-1-(4-vinylphenyl)methylphosphonic acid-co-divinylbenzene];
poly[styrene-co-4-vinylbenzenesulfonic acid-co-vinylbenzylchloride-co-1-methyl-2-vinyl-pyridinium chloride-co-divinylbenzene];
poly[styrene-co-4-vinylbenzenesulfonic acid-co-vinylbenzylchloride-co-1-methyl-2-vinyl-pyridinium bisulfate-co-divinylbenzene];
poly[styrene-co-4-vinylbenzenesulfonic acid-co-vinylbenzylchloride-co-1-methyl-2-vinyl-pyridinium acetate-co-divinylbenzene];
poly[styrene-co-4-vinylbenzenesulfonic acid-co-4-(4-vinylbenzyl)-morpholine-4-oxide-co-divinyl benzene];
poly[styrene-co-4-vinylphenylphosphonic acid-co-3-methyl-1-(4-vinylbenzyl)-3H-imidazol-1-ium chloride-co-divinylbenzene];
poly[styrene-co-4-vinylphenylphosphonic acid-co-3-methyl-1-(4-vinylbenzyl)-3H-imidazol-1-ium bisulfate-co-divinylbenzene];
poly[styrene-co-4-vinylphenylphosphonic acid-co-3-methyl-1-(4-vinylbenzyl)-3H-imidazol-1-ium acetate-co-divinylbenzene];
poly[styrene-co-3-carboxymethyl-1-(4-vinylbenzyl)-3H-imidazol-1-ium chloride-co-divinylbenzene];
poly[styrene-co-3-carboxymethyl-1-(4-vinylbenzyl)-3H-imidazol-1-ium bisulfate-co-divinylbenzene];
poly[styrene-co-3-carboxymethyl-1-(4-vinylbenzyl)-3H-imidazol-1-ium acetate-co-divinylbenzene];
poly[styrene-co-5-(4-vinylbenzylamino)-isophthalic acid-co-3-methyl-1-(4-vinylbenzyl)-3H-imidazol-1-ium chloride-co-divinylbenzene];
poly[styrene-co-5-(4-vinylbenzylamino)-isophthalic acid-co-3-methyl-1-(4-vinylbenzyl)-3H-imidazol-1-ium bisulfate-co-divinylbenzene];
poly[styrene-co-5-(4-vinylbenzylamino)-isophthalic acid-co-3-methyl-1-(4-vinylbenzyl)-3H-imidazol-1-ium acetate-co-divinylbenzene];
poly[styrene-co-(4-vinylbenzylamino)-acetic acid-co-3-methyl-1-(4-vinylbenzyl)-3H-imidazol-1-ium chloride-co-divinylbenzene];
poly[styrene-co-(4-vinylbenzylamino)-acetic acid-co-3-methyl-1-(4-vinylbenzyl)-3H-imidazol-1-ium bisulfate-co-divinylbenzene];
poly[styrene-co-(4-vinylbenzylamino)-acetic acid-co-3-methyl-1-(4-vinylbenzyl)-3H-imidazol-1-ium acetate-co-divinylbenzene];
poly(styrene-co-4-vinylbenzenesulfonic acid-co-vinylbenzylmethylimidazolium chloride-co-vinylbenzylmethylmorpholinium chloride-co-vinylbenzyltriphenyl phosphonium chloride-co-divinylbenzene);
poly(styrene-co-4-vinylbenzenephosphonic acid-co-vinylbenzylmethylimidazolium chloride-co-vinylbenzylmethylmorpholinium chloride-co-vinylbenzyltriphenyl phosphonium chloride-co-divinylbenzene);
poly(styrene-co-4-vinylbenzenesulfonic acid-co-vinylbenzylmethylimidazolium bisulfate-co-vinylbenzylmethylmorpholinium bisulfate-co-vinylbenzyltriphenyl phosphonium bisulfate-co-divinylbenzene);
poly(styrene-co-4-vinylbenzenephosphonic acid-co-vinylbenzylmethylimidazolium bisulfate-co-vinylbenzylmethylmorpholinium bisulfate-co-vinylbenzyltriphenyl phosphonium bisulfate-co-divinylbenzene);

poly(styrene-co-4-vinylbenzenesulfonic acid-co-vinyl-benzylmethylimidazolium acetate-co-vinylbenzylm-ethylmorpholinium acetate-co-vinylbenzyltriphenyl phosphonium acetate-co-divinylbenzene);

poly(styrene-co-4-vinylbenzenephosphonic acid-co-vinylbenzylmethylimidazolium acetate-co-vinylbenzylmethylmorpholinium acetate-co-vinylbenzyltriphenyl phosphonium acetate-co-divinylbenzene);

poly(styrene-co-4-vinylbenzenesulfonic acid-co-vinyl-benzylmethylmorpholinium chloride-co-vinylbenzylt-riphenylphosphonium chloride-co-divinylbenzene);

poly(styrene-co-4-vinylbenzenephosphonic acid-co-vinylbenzylmethylmorpholinium chloride-co-vinylbenzyltriphenylphosphonium chloride-co-divinylbenzene);

poly(styrene-co-4-vinylbenzenesulfonic acid-co-vinyl-benzylmethylmorpholinium bisulfate-co-vinylbenzylt-riphenylphosphonium bisulfate-co-divinylbenzene);

poly(styrene-co-4-vinylbenzenephosphonic acid-co-vinylbenzylmethylmorpholinium bisulfate-co-vinylben-zyltriphenylphosphonium bisulfate-co-divinylbenzene);

poly(styrene-co-4-vinylbenzenesulfonic acid-co-vinyl-benzylmethylmorpholinium acetate-co-vinylbenzylt-riphenylphosphonium bisulfate-co-divinylbenzene);

poly(styrene-co-4-vinylbenzenephosphonic acid-co-vinylbenzylmethylmorpholinium acetate-co-vinylbenzyl-triphenylphosphonium bisulfate-co-divinylbenzene)

poly(styrene-co-4-vinylbenzenesulfonic acid-co-vinylm-ethylimidazolium chloride-co-divinylbenzene);

poly(styrene-co-4-vinylbenzenesulfonic acid-co-vinylm-ethylimidazolium bisulfate-co-divinylbenzene);

poly(styrene-co-4-vinylbenzenesulfonic acid-co-vinylm-ethylimidazolium acetate-co-divinylbenzene);

poly(styrene-co-4-vinylbenzenephosphonic acid-co-vi-nylmethylimidazolium chloride-co-divinylbenzene);

poly(styrene-co-4-vinylbenzenephosphonic acid-co-vi-nylmethylimidazolium bisulfate-co-divinylbenzene);

poly(styrene-co-4-vinylbenzenephosphonic acid-co-vi-nylmethylimidazolium acetate-co-divinylbenzene);

poly(styrene-co-4-vinylbenzenesulfonic acid-co-vinyl-benzyltriphenylphosphonium chloride-co-divinylbenzene);

poly(styrene-co-4-vinylbenzenesulfonic acid-co-vinyl-benzyltriphenylphosphonium bisulfate-co-divinylbenzene);

poly(styrene-co-4-vinylbenzenesulfonic acid-co-vinyl-benzyltriphenylphosphonium acetate-co-divinylbenzene);

poly(styrene-co-4-vinylbenzenephosphonic acid-co-vi-nylbenzyltriphenylphosphonium chloride-co-divinylbenzene);

poly(styrene-co-4-vinylbenzenephosphonic acid-co-vi-nylbenzyltriphenylphosphonium bisulfate-co-divinylbenzene);

poly(styrene-co-4-vinylbenzenephosphonic acid-co-vi-nylbenzyltriphenylphosphonium acetate-co-divinylbenzene);

poly(styrene-co-4-vinylbenzenesulfonic acid-co-vinyl-benzylmethylimidazolium chloride-co-divinylbenzene);

poly(styrene-co-4-vinylbenzenesulfonic acid-co-vinyl-benzylmethylimidazolium bisulfate-co-divinylbenzene);

poly(styrene-co-4-vinylbenzenesulfonic acid-co-vinyl-benzylmethylimidazolium acetate-co-divinylbenzene);

poly(styrene-co-4-vinylbenzenephosphonic acid-co-vi-nylbenzylmethylimidazolium chloride-co-divinylbenzene);

poly(styrene-co-4-vinylbenzenephosphonic acid-co-vi-nylbenzylmethylimidazolium bisulfate-co-divinylbenzene);

poly(styrene-co-4-vinylbenzenephosphonic acid-co-vi-nylbenzylmethylimidazolium acetate-co-divinylbenzene);

poly(styrene-co-4-vinylbenzenesulfonic acid-co-vinyl-benzyltriphenylphosphonium chloride-co-divinylbenzene);

poly(styrene-co-4-vinylbenzenesulfonic acid-co-vinyl-benzyltriphenylphosphonium bisulfate-co-divinylbenzene);

poly(styrene-co-4-vinylbenzenesulfonic acid-co-vinyl-benzyltriphenylphosphonium acetate-co-divinylbenzene);

poly(styrene-co-4-vinylbenzenephosphonic acid-co-vi-nylbenzyltriphenylphosphonium chloride-co-divinylbenzene);

poly(styrene-co-4-vinylbenzenephosphonic acid-co-vi-nylbenzyltriphenylphosphonium bisulfate-co-divinylbenzene);

poly(styrene-co-4-vinylbenzenephosphonic acid-co-vi-nylbenzyltriphenylphosphonium acetate-co-divinylbenzene).

14. The polymer of claim 13, wherein the polymer is selected from:

poly[styrene-co-4-vinylbenzenesulfonic acid-co-1-(4-vi-nylbenzyl)-pyridinium-chloride-co-3-methyl-1-(4-vi-nylbenzyl)-3H-imidazol-1-ium bisulfate-co-divinylbenzene];

poly[styrene-co-4-vinylbenzenesulfonic acid-co-vinyl-benzylchloride-co-1-methyl-2-vinyl-pyridinium bisulfate-co-divinylbenzene];

poly(styrene-co-4-vinylbenzenephosphonic acid-co-vi-nylbenzyltriphenylphosphonium chloride-co-divinylbenzene);

poly[styrene-co-4-vinylbenzenesulfonic acid-co-1-(4-vi-nylbenzyl)-3H-imidazol-1-ium bisulfate-co-divinylbenzene]; and poly(styrene-co-4-vinylbenzenesulfonic acid-co-vinylm-ethylimidazolium acetate-co-divinylbenzene).

15. The polymer of claim 13, wherein the polymer is selected from:

poly[styrene-co-4-vinylbenzenesulfonic acid-co-3-me-thyl-1-(4-vinylbenzyl)-3H-benzoimidazol-1-ium chloride-co-divinylbenzene];

poly[styrene-co-4-vinylbenzenesulfonic acid-co-3-me-thyl-1-(4-vinylbenzyl)-3H-imidazol-1-ium bisulfate-co-divinylbenzene];

poly[styrene-co-4-vinylbenzenesulfonic acid-co-1-(4-vi-nylbenzyl)-pyridinium-bisulfate-co-divinylbenzene];

poly(styrene-co-4-vinylbenzenesulfonic acid-co-vinyl-benzylmethylimidazolium chloride-co-vinylbenzylm-ethylmorpholinium chloride-co-vinylbenzyltriphenyl phosphonium chloride-co-divinylbenzene); and poly[styrene-co-4-vinylbenzenesulfonic acid-co-4-(4-vi-nylbenzyl)-morpholine-4-oxide-co-divinyl benzene].

16. The polymer of claim 13, wherein the polymer is selected from:

poly[styrene-co-4-vinylbenzenesulfonic acid-co-4-(4-vi-nylbenzyl)-morpholine-4-oxide-co-divinyl benzene];

poly(styrene-co-4-vinylbenzenesulfonic acid-co-vinyl-benzyltriphenylphosphonium chloride-co-divinylbenzene);

poly[styrene-co-4-vinylbenzenesulfonic acid-co-1-(4-vinylbenzyl)-3H-imidazol-1-ium iodide-co-divinylbenzene];

poly[styrene-co-4-vinylbenzenesulfonic acid-co-triphenyl-(4-vinylbenzyl)-phosphonium bisulfate-co-divinylbenzene]; and poly[styrene-co-3-methyl-1-(4-vinylbenzyl)-3H-imidazol-1-ium bisulfate-co-1-(4-vinylphenyl)methylphosphonic acid-co-divinylbenzene].

17. The polymer of claim 1, wherein the polymer has one or more catalytic properties.

18. The polymer of claim 17, wherein the one or more catalytic properties are selected from the group consisting of:
   a) disruption of a hydrogen bond in cellulosic materials;
   b) intercalation of the polymer into crystalline domains of cellulosic materials; and
   c) cleavage of a glycosidic bond in cellulosic materials.

19. The polymer of claim 1, wherein the linker of each acidic monomer is independently selected from the group consisting of unsubstituted or substituted alkylene, unsubstituted or substituted cycloalkylene, unsubstituted or substituted alkenylene, unsubstituted or substituted arylene, unsubstituted or substituted heteroarylene, unsubstituted or substituted alkylene ether, unsubstituted or substituted alkylene ester, and unsubstituted or substituted alkylene carbamate.

20. The polymer of claim 1, wherein the polymeric backbone is selected from the group consisting of polyethylene, polypropylene, polyvinyl alcohol, polystyrene, polyurethane, polyvinyl chloride, polyphenol-aldehyde, polytetrafluoroethylene, polybutylene terephthalate, polycaprolactam, poly(acrylonitrile butadiene styrene), polyalkenylammonium, polyalkenylpyrrolium, polyalkenylimidazolium, polyalkenylpyrazolium, polyalkenyloxazolium, polyalkenylthiazolium, polyalkenylpyridinium, polyalkenylpyrimidinium, polyalkenylpyrazinium, polyalkenylpyradizimium, polyalkenylthiazinium, polyalkenylmorpholinium, polyalkenylpiperidinium, polyalkenylpiperizinium, polyalkenylpyrollizinium, polyalkenyltriphenylphosphonium, polyalkenyltrimethylphosphonium, polyalkenyltriethylphosphonium, polyalkenyltripropylphosphonium, polyalkenyltributylphosphonium, polyalkenyltrichlorophosphonium, and polyalkenyltrifluorophosphonium.

21. The polymer of claim 1, wherein the polymer is cross-linked.

22. The polymer of claim 1, wherein the polymer is selected from:
   poly[styrene-co-4-vinylbenzenesulfonic acid-co-3-methyl-1-(4-vinylbenzyl)-3H-imidazol-1-ium nitrate-co-divinylbenzene];
   poly[styrene-co-4-vinylbenzenesulfonic acid-co-1-(4-vinylbenzyl)-3H-imidazol-1-ium iodide-co-divinylbenzene];
   poly[styrene-co-4-vinylbenzenesulfonic acid-co-3-methyl-1-(4-vinylbenzyl)-3H-benzoimidazol-1-ium chloride-co-divinylbenzene];
   poly[styrene-co-4-vinylbenzenesulfonic acid-co-3-methyl-1-(4-vinylbenzyl)-3H-imidazol-1-ium bisulfate-co-divinylbenzene];
   poly[styrene-co-4-vinylbenzenesulfonic acid-co-1-(4-vinylbenzyl)-pyridinium-bisulfate-co-divinylbenzene];
   poly[styrene-co-4-vinylbenzenesulfonic acid-co-1-(4-vinylbenzyl)-pyridinium-chloride-co-3-methyl-1-(4-vinylbenzyl)-3H-imidazol-1-ium bisulfate-co-divinylbenzene];
   poly[styrene-co-4-vinylbenzenesulfonic acid-co-4-methyl-4-(4-vinylbenzyl)-morpholin-4-ium chloride-co-divinylbenzene];
   poly[styrene-co-4-vinylbenzenesulfonic acid-co-1-(4-vinylbenzyl)-3H-imidazol-1-ium bisulfate-co-divinylbenzene];
   poly[styrene-co-4-vinylbenzenesulfonic acid-co-4-(4-vinylbenzyl)-morpholine-4-oxide-co-divinyl benzene];
   poly[styrene-co-3-methyl-1-(4-vinylbenzyl)-3H-imidazol-1-ium bisulfate-co-1-(4-vinylphenyl)methylphosphonic acid-co-divinylbenzene];
   poly[styrene-co-4-vinylbenzenesulfonic acid-co-vinylbenzylchloride-co-1-methyl-2-vinyl-pyridinium bisulfate-co-divinylbenzene];
   poly[styrene-co-4-vinylbenzenesulfonic acid-co-4-(4-vinylbenzyl)-morpholine-4-oxide-co-divinyl benzene];
   poly[styrene-co-4-vinylbenzenesulfonic acid-co-triphenyl-(4-vinylbenzyl)-phosphonium bisulfate-co-divinylbenzene];
   poly[styrene-co-5-(4-vinylbenzylamino)-isophthalic acid-co-3-methyl-1-(4-vinylbenzyl)-3H-imidazol-1-ium chloride-co-divinylbenzene];
   poly(styrene-co-4-vinylbenzenesulfonic acid-co-vinylbenzylmethylimidazolium chloride-co-vinylbenzylmethylmorpholinium chloride-co-vinylbenzyltriphenyl phosphonium chloride-co-divinylbenzene);
   poly(styrene-co-4-vinylbenzenesulfonic acid-co-vinylmethylimidazolium acetate-co-divinylbenzene);
   poly(styrene-co-4-vinylbenzenesulfonic acid-co-vinylbenzyltriphenylphosphonium chloride-co-divinylbenzene);
   poly(styrene-co-4-vinylbenzenephosphonic acid-co-vinylbenzyltriphenylphosphonium chloride-co-divinylbenzene);
   poly(styrene-co-4-vinylbenzenephosphonic acid-co-vinylbenzyltriphenylphosphonium bisulfate-co-divinylbenzene); and
   poly(styrene-co-4-vinylbenzenesulfonic acid-co-vinylbenzyltriphenylphosphonium chloride-co-divinylbenzene).

23. The polymer of claim 1, wherein each nitrogen-containing side chain is independently selected from:

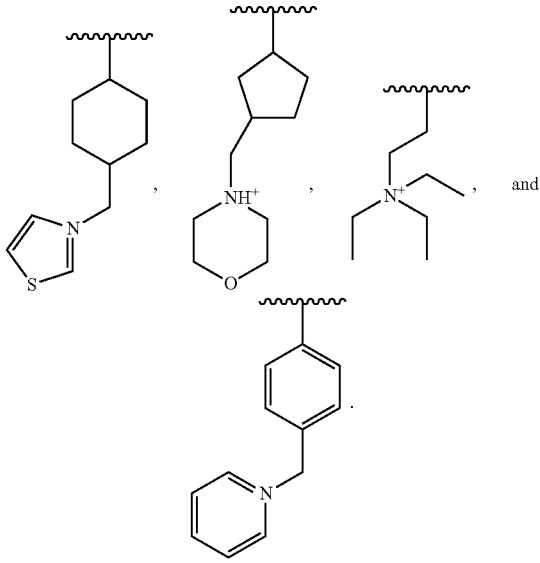

24. The polymer of claim 1, wherein each nitrogen-containing side chain is independently selected from:

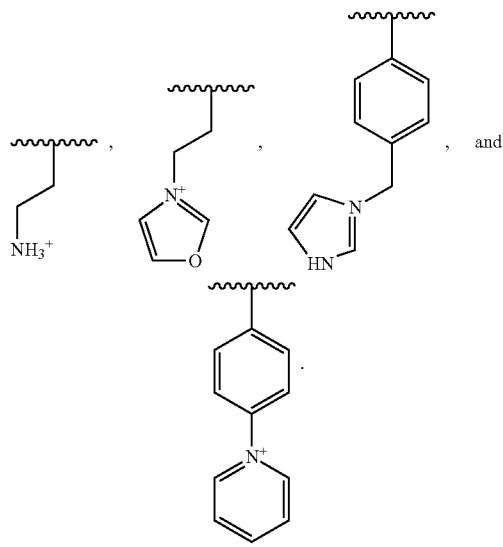

25. The polymer of claim 1, wherein each nitrogen-containing side chain is independently selected from:

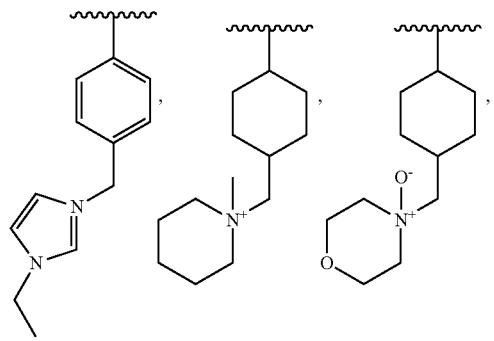

26. The polymer of claim 1, wherein each nitrogen-containing side chain is independently selected from:

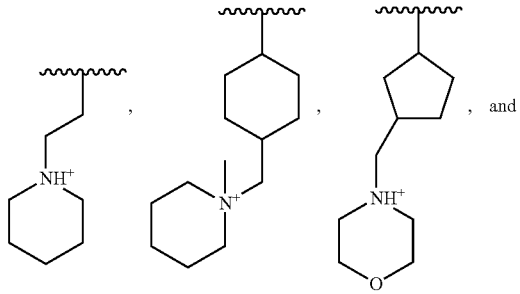

-continued

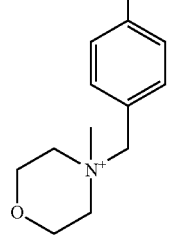

27. The polymer of claim 1, wherein each nitrogen-containing side chain is independently selected from:

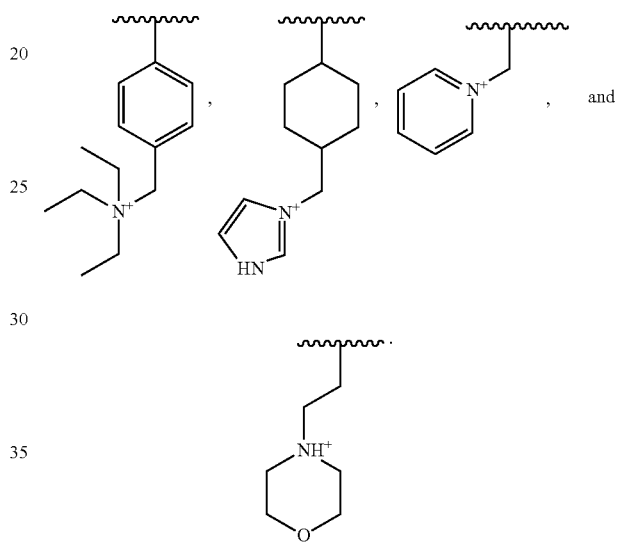

28. The polymer of claim 1, wherein each nitrogen-containing side chain is independently selected from:

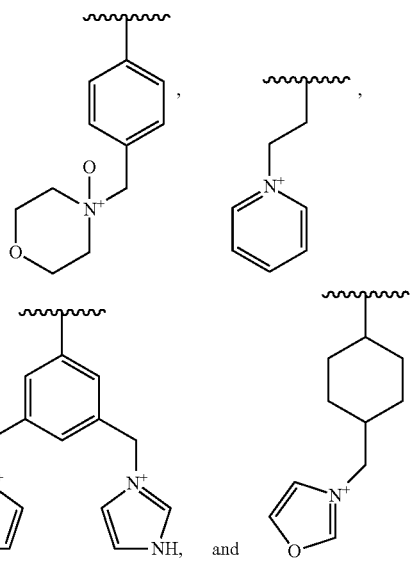

29. The polymer of claim 1, wherein each phosphorous-containing side chain is independently selected from:
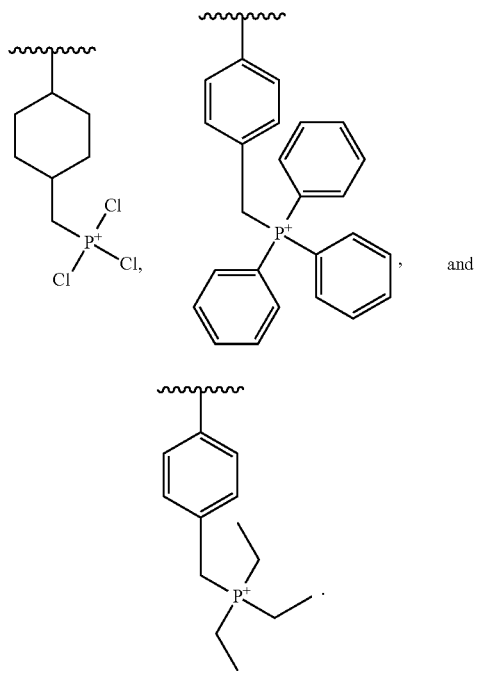
30. The polymer of claim 1, wherein each phosphorous-containing side chain is independently selected from:
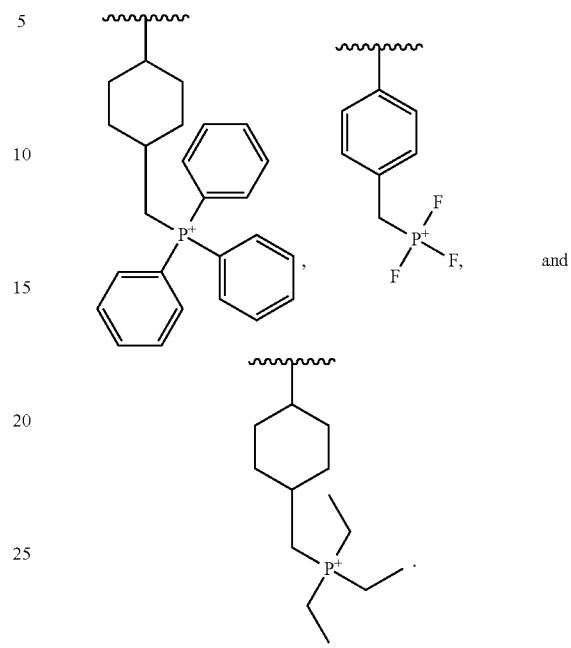
* * * * *